US012763862B2

(12) United States Patent
Garcia et al.

(10) Patent No.: US 12,763,862 B2
(45) **Date of Patent: *Oct. 13, 2026**

(54) SYSTEMS AND METHODS FOR SPECTRUM ANALYSIS UTILIZING SIGNAL DEGRADATION DATA

(71) Applicant: Digital Global Systems, Inc., Tysons Corner, VA (US)

(72) Inventors: Gabriel R. Garcia, Severna Park, MD (US); Daniel Carbajal, Severna Park, MD (US)

(73) Assignee: Digital Global Systems, Inc., Tysons Corner, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/566,316

(22) Filed: Mar. 13, 2026

(65) Prior Publication Data

US 2026/0230199 A1 Aug. 6, 2026

Related U.S. Application Data

(63) Continuation of application No. 19/391,459, filed on Nov. 17, 2025, now Pat. No. 12,615,098, which is a (Continued)

(51) Int. Cl.
*H04B 17/27* (2015.01)
*H04B 17/23* (2015.01)
(Continued)

(52) U.S. Cl.
CPC ............. *H04B 17/27* (2015.01); *H04B 17/23* (2015.01); *H04B 17/309* (2015.01); (Continued)

(58) Field of Classification Search
CPC ...... H04B 17/27; H04B 17/23; H04B 17/309; H04B 17/318; H04B 17/3911; (Continued)

(56) References Cited

U.S. PATENT DOCUMENTS 4,215,345 A 7/1980 Robert et al.
4,400,700 A 8/1983 Rittenbach
(Continued)

FOREIGN PATENT DOCUMENTS

CN 110035440 A 7/2019
CN 115482071 A 12/2022
(Continued)

OTHER PUBLICATIONS

"A Hardware Design for Time Delay Estimation of TDOA"; Li et al.; 2013 IEEE International Conference on Signal Processing, Communication and Computing (ICSPCC 2013); Aug. 2013 (Year: 2013).

(Continued)

*Primary Examiner* — Steven S Kelley
(74) *Attorney, Agent, or Firm* — Neo IP

(57) ABSTRACT

Methods for tracking a signal origin by a spectrum analysis and management device are disclosed. Signal characteristics of other known emitters are used for obtaining a position of an emitter of a signal of interest. In one embodiment, frequency difference of arrival technique is implemented. In another embodiment, time difference of arrival technique is implemented.

18 Claims, 21 Drawing Sheets

Related U.S. Application Data continuation of application No. 19/286,910, filed on Jul. 31, 2025, now Pat. No. 12,506,549, which is a continuation of application No. 19/077,675, filed on Mar. 12, 2025, now Pat. No. 12,401,433, which is a continuation of application No. 18/955,234, filed on Nov. 21, 2024, now Pat. No. 12,278,669, which is a continuation of application No. 18/792,113, filed on Aug. 1, 2024, now Pat. No. 12,191,925, which is a continuation of application No. 18/434,178, filed on Feb. 6, 2024, now Pat. No. 12,095,518, which is a continuation of application No. 18/374,385, filed on Sep. 28, 2023, now Pat. No. 11,901,963, which is a continuation of application No. 18/137,785, filed on Apr. 21, 2023, now Pat. No. 11,791,913, which is a continuation of application No. 18/082,210, filed on Dec. 15, 2022, now Pat. No. 11,637,641, which is a continuation of application No. 17/569,984, filed on Jan. 6, 2022, now Pat. No. 11,588,562, which is a continuation of application No. 16/751,887, filed on Jan. 24, 2020, now Pat. No. 11,223,431, which is a continuation of application No. 16/395,987, filed on Apr. 26, 2019, now Pat. No. 10,554,317, which is a continuation of application No. 16/002,751, filed on Jun. 7, 2018, now Pat. No. 10,284,309, which is a continuation of application No. 15/228,325, filed on Aug. 4, 2016, now Pat. No. 9,998,243, which is a continuation of application No. 14/743,011, filed on Jun. 18, 2015, now Pat. No. 9,414,237, which is a continuation of application No. 13/912,893, filed on Jun. 7, 2013, now Pat. No. 9,078,162.

(60) Provisional application No. 61/789,758, filed on Mar. 15, 2013.

(51) Int. Cl.

| | |
|---|---|
| ***H04B 17/309*** | (2015.01) |
| ***H04B 17/318*** | (2015.01) |
| ***H04B 17/391*** | (2015.01) |
| ***H04W 4/029*** | (2018.01) |
| ***H04W 16/14*** | (2009.01) |
| ***H04W 24/08*** | (2009.01) |
| ***H04W 24/10*** | (2009.01) |
| ***H04W 64/00*** | (2009.01) |
| ***H04W 72/0446*** | (2023.01) |
| ***H04W 72/0453*** | (2023.01) |
| ***H04W 72/51*** | (2023.01) |
| ***H04W 72/541*** | (2023.01) |

(52) U.S. Cl.

CPC .......... *H04B 17/318* (2015.01); *H04W 4/029* (2018.02); *H04W 16/14* (2013.01); *H04W 24/08* (2013.01); *H04W 24/10* (2013.01); *H04W 64/006* (2013.01); *H04W 72/0446* (2013.01); *H04W 72/0453* (2013.01); *H04W 72/51* (2023.01); *H04W 72/541* (2023.01); *H04B 17/3911* (2015.01)

(58) Field of Classification Search

CPC ..... H04W 4/029; H04W 16/14; H04W 24/08; H04W 24/10; H04W 64/006; H04W 72/0446; H04W 72/0453; H04W 72/51; H04W 72/541

See application file for complete search history.

(56) References Cited

U.S. PATENT DOCUMENTS

| | | | | |
|---|---|---|---|---|
| 4,453,137 | A | 6/1984 | Rittenbach | |
| 4,501,020 | A | 2/1985 | Wakeman | |
| 4,581,769 | A | 4/1986 | Grimsley et al. | |
| 4,638,493 | A | 1/1987 | Bishop et al. | |
| 4,676,641 | A | 6/1987 | Bott | |
| 4,781,460 | A | 11/1988 | Bott | |
| 4,794,325 | A | 12/1988 | Britton et al. | |
| 4,928,106 | A | 5/1990 | Ashjaee et al. | |
| 5,103,402 | A | 4/1992 | Morton et al. | |
| 5,126,654 | A | 6/1992 | Murphy et al. | |
| 5,134,407 | A | 7/1992 | Lorenz et al. | |
| 5,144,642 | A | 9/1992 | Weinberg et al. | |
| 5,166,664 | A | 11/1992 | Fish | |
| 5,230,087 | A | 7/1993 | Meyer et al. | |
| 5,293,170 | A | 3/1994 | Lorenz et al. | |
| 5,343,212 | A | 8/1994 | Rose et al. | |
| 5,393,713 | A | 2/1995 | Schwob | |
| 5,416,593 | A | 5/1995 | Vercruysse | |
| 5,448,309 | A | 9/1995 | Won | |
| 5,506,864 | A | 4/1996 | Schilling | |
| 5,513,385 | A | 4/1996 | Tanaka | |
| 5,548,809 | A | 8/1996 | Lemson | |
| 5,570,099 | A | 10/1996 | DesJardins | |
| 5,589,835 | A | 12/1996 | Gildea et al. | |
| 5,612,703 | A | 3/1997 | Mallinckrodt | |
| 5,642,732 | A | 7/1997 | Wang | |
| 5,831,874 | A | 11/1998 | Boone et al. | |
| 5,835,857 | A | 11/1998 | Otten | |
| 5,838,906 | A | 11/1998 | Doyle et al. | |
| 5,846,208 | A | 12/1998 | Pichlmayr et al. | |
| 5,856,803 | A | 1/1999 | Pevler | |
| 5,936,575 | A | 8/1999 | Azzarelli et al. | |
| 6,018,312 | A | 1/2000 | Haworth | |
| 6,039,692 | A | 3/2000 | Kristoffersen | |
| 6,081,223 | A | 6/2000 | Kitahara et al. | |
| 6,085,090 | A | 7/2000 | Yee et al. | |
| 6,115,580 | A | 9/2000 | Chuprun et al. | |
| 6,134,445 | A | 10/2000 | Gould et al. | |
| 6,144,336 | A | 11/2000 | Preston et al. | |
| 6,157,619 | A | 12/2000 | Ozluturk et al. | |
| 6,160,511 | A | 12/2000 | Pfeil et al. | |
| 6,167,277 | A | 12/2000 | Kawamoto | |
| 6,167,359 | A | 12/2000 | Demir et al. | |
| 6,185,309 | B1 | 2/2001 | Attias | |
| 6,188,715 | B1 | 2/2001 | Partyka | |
| 6,191,731 | B1 | 2/2001 | McBurney et al. | |
| 6,198,414 | B1 | 3/2001 | McPherson et al. | |
| 6,243,576 | B1 | 6/2001 | Seike et al. | |
| 6,249,252 | B1 | 6/2001 | Dupray | |
| 6,286,021 | B1 | 9/2001 | Tran et al. | |
| 6,296,612 | B1 | 10/2001 | Mo et al. | |
| 6,304,760 | B1 | 10/2001 | Thomson et al. | |
| 6,314,366 | B1 | 11/2001 | Farmakis et al. | |
| 6,339,396 | B1 | 1/2002 | Mayersak | |
| 6,384,776 | B1 | 5/2002 | Martin | |
| 6,385,434 | B1 * | 5/2002 | Chuprun | H04W 16/10 455/430 |
| 6,400,647 | B1 | 6/2002 | Huntress | |
| 6,418,131 | B1 | 7/2002 | Snelling et al. | |
| 6,430,418 | B1 | 8/2002 | Nivens et al. | |
| 6,433,671 | B1 | 8/2002 | Nysen | |
| 6,490,318 | B1 | 12/2002 | Larsson et al. | |
| 6,492,945 | B2 | 12/2002 | Counselman, III et al. | |
| 6,512,788 | B1 | 1/2003 | Kuhn et al. | |
| 6,608,559 | B1 | 8/2003 | Lemelson et al. | |
| 6,628,231 | B2 | 9/2003 | Mayersak | |
| 6,677,895 | B1 | 1/2004 | Holt | |
| 6,697,439 | B1 | 2/2004 | Trivedi et al. | |
| 6,707,910 | B1 | 3/2004 | Valve et al. | |
| 6,711,404 | B1 | 3/2004 | Arpee et al. | |
| 6,741,595 | B2 | 5/2004 | Maher et al. | |
| 6,771,957 | B2 | 8/2004 | Chitrapu | |
| 6,785,321 | B1 | 8/2004 | Yang et al. | |
| 6,834,180 | B1 | 12/2004 | Marshall | |
| 6,850,557 | B1 | 2/2005 | Gronemeyer | |

(56) References Cited

U.S. PATENT DOCUMENTS 6,850,735 B2 * 2/2005 Sugar .................. H04B 17/309
455/67.11
6,859,831 B1 2/2005 Gelvin et al.
6,861,982 B2 3/2005 Forstrom et al.
6,876,326 B2 4/2005 Martorana
6,898,197 B1 5/2005 Lavean
6,898,235 B1 5/2005 Carlin et al.
6,904,269 B1 6/2005 Deshpande et al.
6,985,437 B1 1/2006 Vogel
6,991,514 B1 1/2006 Meloni et al.
7,035,593 B2 4/2006 Miller et al.
7,043,207 B2 5/2006 Miyazaki
7,049,965 B2 5/2006 Kelliher et al.
7,110,756 B2 9/2006 Diener
7,116,943 B2 10/2006 Sugar et al.
7,146,176 B2 12/2006 Mchenry
7,151,790 B1 12/2006 Patenaude et al.
7,151,938 B2 12/2006 Weigand
7,152,025 B2 12/2006 Lusky et al.
7,162,207 B2 1/2007 Kursula et al.
7,171,161 B2 1/2007 Miller
7,187,326 B2 3/2007 Beadle et al.
7,206,350 B2 4/2007 Korobkov et al.
7,215,716 B1 5/2007 Smith
7,254,191 B2 8/2007 Sugar et al.
7,259,868 B2 8/2007 Ozcan et al.
7,269,151 B2 9/2007 Diener et al.
7,289,733 B1 10/2007 He
7,292,656 B2 11/2007 Kloper et al.
7,298,327 B2 11/2007 Dupray et al.
7,340,375 B1 3/2008 Patenaud et al.
7,366,463 B1 4/2008 Archer et al.
7,408,907 B2 8/2008 Diener
7,424,268 B2 9/2008 Diener et al.
7,428,270 B1 9/2008 Dubuc et al.
7,430,254 B1 9/2008 Anderson
7,459,898 B1 12/2008 Woodings
7,466,960 B2 12/2008 Sugar
7,471,683 B2 12/2008 Maher, III et al.
7,522,917 B1 4/2009 Purdy, Jr. et al.
7,555,262 B2 6/2009 Brenner
7,564,816 B2 7/2009 Mchenry et al.
7,595,754 B2 9/2009 Mehta
7,606,335 B2 10/2009 Kloper et al.
7,606,597 B2 10/2009 Weigand
7,620,396 B2 11/2009 Floam et al.
7,653,020 B2 1/2010 Roberts
7,676,192 B1 3/2010 Wilson
7,692,532 B2 4/2010 Fischer et al.
7,692,573 B1 4/2010 Funk
7,702,044 B2 4/2010 Nallapureddy et al.
7,725,110 B2 5/2010 Weigand
7,728,755 B1 6/2010 Jocic
7,801,490 B1 9/2010 Scherzer
7,813,742 B1 10/2010 Mitchell
7,835,319 B2 11/2010 Sugar
7,865,140 B2 1/2011 Levien et al.
7,893,875 B1 2/2011 Smith
7,929,508 B1 4/2011 Yucek et al.
7,933,344 B2 4/2011 Hassan et al.
7,945,215 B2 5/2011 Tang
7,953,549 B2 5/2011 Graham et al.
7,965,641 B2 6/2011 Ben Letaief et al.
8,001,901 B2 8/2011 Bass
8,006,195 B1 8/2011 Woodings et al.
8,023,957 B2 9/2011 Weigand
8,026,846 B2 9/2011 Mcfadden et al.
8,027,249 B2 9/2011 Mchenry et al.
8,027,690 B2 9/2011 Shellhammer
8,045,654 B1 10/2011 Anderson
8,045,660 B1 10/2011 Gupta
8,055,204 B2 11/2011 Livsics et al.
8,059,694 B2 11/2011 Junell et al.
8,060,017 B2 11/2011 Schlicht et al.
8,060,035 B2 11/2011 Haykin
8,060,104 B2 11/2011 Chaudhri et al.
8,064,840 B2 11/2011 McHenry et al.
8,077,662 B2 12/2011 Srinivasan et al.
8,086,187 B1 12/2011 Davis et al.
RE43,066 E 1/2012 McHenry
8,094,610 B2 1/2012 Wang et al.
8,107,391 B2 1/2012 Wu et al.
8,125,213 B2 2/2012 Goguillon et al.
8,131,239 B1 3/2012 Walker et al.
8,134,493 B2 3/2012 Noble et al.
8,151,311 B2 4/2012 Huffman et al.
8,155,039 B2 4/2012 Wu et al.
8,155,649 B2 4/2012 McHenry et al.
8,160,839 B1 4/2012 Woodings et al.
8,170,577 B2 5/2012 Singh
8,175,539 B2 5/2012 Diener et al.
8,184,653 B2 5/2012 Dain et al.
8,193,981 B1 6/2012 Hwang et al.
8,213,868 B2 7/2012 Du et al.
8,224,254 B2 7/2012 Haykin
8,229,368 B1 7/2012 Immendorf et al.
8,233,928 B2 7/2012 Stanforth et al.
8,238,247 B2 8/2012 Wu et al.
8,249,028 B2 8/2012 Porras et al.
8,249,631 B2 8/2012 Sawai
8,260,207 B2 9/2012 Srinivasan et al.
8,265,684 B2 9/2012 Sawai
8,279,786 B1 10/2012 Smith et al.
8,280,433 B2 10/2012 Quinn et al.
8,289,907 B2 10/2012 Seidel et al.
8,290,503 B2 10/2012 Sadek et al.
8,295,859 B1 10/2012 Yarkan et al.
8,295,877 B2 10/2012 Hui et al.
8,301,075 B2 10/2012 Sherman et al.
8,305,215 B2 11/2012 Markhovsky et al.
8,311,483 B2 11/2012 Tillman et al.
8,311,509 B2 11/2012 Feher
8,315,571 B2 11/2012 Lindoff et al.
8,320,910 B2 11/2012 Bobier
8,326,240 B1 12/2012 Kadambe et al.
8,326,309 B2 12/2012 Mody et al.
8,326,313 B2 12/2012 McHenry et al.
8,335,204 B2 12/2012 Samarasooriya et al.
8,346,273 B2 1/2013 Weigand
8,346,578 B1 1/2013 Hopkins, III et al.
8,350,970 B2 1/2013 Birkett et al.
8,352,223 B1 1/2013 Anthony et al.
8,358,723 B1 1/2013 Hamkins et al.
8,364,188 B2 1/2013 Srinivasan et al.
8,369,305 B2 2/2013 Diener et al.
8,373,759 B2 2/2013 Samarasooriya et al.
8,391,794 B2 3/2013 Sawai et al.
8,391,796 B2 3/2013 Srinivasan et al.
8,401,564 B2 3/2013 Singh
8,406,776 B2 3/2013 Jallon
8,406,780 B2 3/2013 Mueck
RE44,142 E 4/2013 Wilson
8,421,676 B2 4/2013 Moshfeghi
8,422,453 B2 4/2013 Abedi
8,422,958 B2 4/2013 Du et al.
RE44,237 E 5/2013 Mchenry
8,437,700 B2 5/2013 Mody et al.
8,442,445 B2 5/2013 Mody et al.
8,447,237 B2 5/2013 Reial et al.
8,451,751 B2 5/2013 Challapali et al.
8,463,195 B2 6/2013 Shellhammer
8,467,353 B2 6/2013 Proctor
8,467,996 B2 6/2013 Perez et al.
8,483,155 B1 7/2013 Banerjea et al.
8,494,464 B1 7/2013 Kadambe et al.
8,503,955 B2 8/2013 Kang et al.
8,504,087 B2 8/2013 Stanforth et al.
8,514,729 B2 8/2013 Blackwell
8,515,473 B2 8/2013 Mody et al.
8,520,606 B2 8/2013 Cleveland
RE44,492 E 9/2013 Mchenry
8,526,974 B2 9/2013 Olsson et al.
8,532,686 B2 9/2013 Schmidt et al.
8,538,339 B2 9/2013 Hu et al.

(56) References Cited

U.S. PATENT DOCUMENTS 8,548,521 B2 10/2013 Hui et al.
8,554,264 B1 10/2013 Gibbons et al.
8,559,301 B2 10/2013 Mchenry et al.
8,565,811 B2 10/2013 Tan et al.
8,599,024 B2 12/2013 Bloy
8,718,838 B2 5/2014 Kokkeby et al.
8,761,051 B2 6/2014 Brisebois et al.
8,773,966 B1 7/2014 Petrovic et al.
8,780,968 B1 7/2014 Garcia et al.
8,792,901 B2 7/2014 Schmidt
8,798,548 B1 8/2014 Carbajal
8,805,291 B1 8/2014 Garcia et al.
8,805,292 B1 8/2014 Carbajal
8,818,283 B2 8/2014 McHenry et al.
8,824,536 B1 9/2014 Garcia et al.
8,843,155 B2 9/2014 Burton et al.
8,886,210 B1 11/2014 Sugar
8,941,491 B2 1/2015 Polk et al.
8,958,602 B1 2/2015 Lane et al.
8,977,212 B2 3/2015 Carbajal
9,007,262 B1 4/2015 Witzgall
9,008,587 B2 4/2015 Carbajal
9,078,162 B2 7/2015 Garcia et al.
9,143,968 B1 9/2015 Manku et al.
9,185,591 B2 11/2015 Carbajal
9,229,102 B1 1/2016 Wright et al.
9,245,378 B1 1/2016 Villagomez et al.
9,288,683 B2 3/2016 Garcia et al.
9,356,727 B2 5/2016 Immendorf et al.
9,397,619 B2 7/2016 Lozhkin
9,406,237 B2 8/2016 Downey et al.
9,412,278 B1 8/2016 Gong et al.
9,413,574 B1 8/2016 Timofeev et al.
9,414,237 B2 8/2016 Garcia et al.
9,439,078 B2 9/2016 Menon et al.
9,466,881 B1 10/2016 Berry et al.
9,529,360 B1 12/2016 Melamed et al.
9,537,586 B2 1/2017 Carbajal
9,538,040 B2 1/2017 Goergen et al.
9,572,055 B2 2/2017 Immendorf et al.
9,635,669 B2 4/2017 Gormley et al.
9,658,341 B2 5/2017 Mathews et al.
9,674,684 B1 6/2017 Mendelson
9,674,836 B2 6/2017 Gormley et al.
9,686,789 B2 6/2017 Gormley et al.
9,715,009 B1 7/2017 Parker et al.
9,749,069 B2 8/2017 Garcia et al.
9,755,972 B1 9/2017 Mao et al.
9,767,699 B1 9/2017 Borghese et al.
9,769,834 B2 9/2017 Immendorf et al.
9,805,273 B1 10/2017 Seeber et al.
9,819,441 B2 11/2017 Immendorf et al.
9,858,947 B2 1/2018 Hearing et al.
9,862,489 B1 1/2018 Weinstein et al.
9,923,700 B2 3/2018 Gormley et al.
9,942,775 B2 4/2018 Yun et al.
9,973,278 B2 5/2018 Wang et al.
9,989,633 B1 6/2018 Pandey et al.
9,998,243 B2 6/2018 Garcia et al.
10,027,429 B1 7/2018 Kiannejad
10,104,559 B2 10/2018 Immendorf et al.
10,157,548 B2 12/2018 Priest
10,194,324 B2 1/2019 Yun et al.
10,198,955 B1 2/2019 Boyd et al.
10,227,429 B2 3/2019 Watanabe et al.
10,234,857 B1 3/2019 Melamed et al.
10,235,523 B1 3/2019 Keller, III et al.
10,241,140 B2 3/2019 Moinuddin
10,251,242 B1 4/2019 Rosen et al.
10,281,570 B2 5/2019 Parker et al.
10,338,191 B2 7/2019 Baxley et al.
10,389,616 B2 8/2019 Ryan et al.
10,393,784 B2 8/2019 Logan et al.
10,408,936 B2 9/2019 Van Voorst
10,459,020 B2 10/2019 Dzierwa et al.
10,540,905 B2 1/2020 Bohanan et al.
10,552,738 B2 2/2020 Holt et al.
10,587,352 B2 3/2020 Kiannejad
10,594,034 B1 3/2020 Tran et al.
10,613,209 B2 4/2020 Emami et al.
10,642,813 B1 5/2020 Lazier et al.
10,698,076 B2 6/2020 Jones et al.
10,700,721 B2 6/2020 Ayala et al.
10,701,574 B2 6/2020 Gormley et al.
10,764,718 B1 9/2020 Boettcher et al.
10,784,974 B2 9/2020 Menon
10,811,771 B1 10/2020 Tran et al.
10,873,830 B2 12/2020 Markhovsky et al.
10,880,903 B1 12/2020 Tsai et al.
10,907,940 B1 2/2021 Parker et al.
10,916,845 B2 2/2021 Tran et al.
10,917,797 B2 2/2021 Menon et al.
11,012,340 B2 5/2021 Ryan et al.
11,035,929 B2 6/2021 Parker et al.
11,063,653 B2 7/2021 Ottersten et al.
11,190,233 B2 11/2021 Lo et al.
11,223,431 B2 1/2022 Garcia et al.
11,265,652 B2 3/2022 Kallai et al.
11,321,282 B2 5/2022 Tran
11,334,807 B1 5/2022 O'Shea et al.
11,336,011 B2 5/2022 Tran et al.
11,516,071 B2 11/2022 Karapantelakis et al.
11,637,641 B1 4/2023 Garcia et al.
11,663,992 B2 5/2023 Canberk et al.
11,671,839 B2 6/2023 Guo et al.
11,700,304 B2 7/2023 Brown, Jr. et al.
11,757,185 B2 9/2023 Tran et al.
11,777,783 B2 10/2023 Meirosu et al.
11,791,913 B2 10/2023 Garcia et al.
11,871,103 B2 1/2024 Kleinbeck
11,874,674 B2 1/2024 Groden et al.
11,880,888 B1 1/2024 Gold et al.
11,889,351 B2 1/2024 Tagg
11,910,305 B2 2/2024 Buyukdura
11,994,880 B2 5/2024 Vallelonga et al.
12,095,518 B2 9/2024 Garcia et al.
12,156,037 B2 11/2024 Montalvo
12,183,213 B1 12/2024 Kleinbeck et al.
12,184,963 B2 12/2024 Kleinbeck
12,243,431 B2 3/2025 Kleinbeck et al.
12,301,976 B2 5/2025 Kleinbeck
12,307,905 B2 5/2025 Kleinbeck et al.
12,309,483 B1 5/2025 Kleinbeck
12,387,608 B1 8/2025 Kleinbeck et al.
12,456,380 B1 10/2025 Kleinbeck et al.
12,506,549 B2 12/2025 Garcia et al.
12,615,098 B2 * 4/2026 Garcia .................. H04B 17/27
2001/0000959 A1 5/2001 Campana et al.
2001/0005423 A1 6/2001 Rhoads
2001/0016503 A1 8/2001 Kang
2001/0019541 A1 9/2001 Jou et al.
2001/0020220 A1 9/2001 Kurosawa
2002/0044082 A1 4/2002 Woodington et al.
2002/0070889 A1 6/2002 Griffin et al.
2002/0072331 A1 6/2002 Fischer et al.
2002/0097184 A1 7/2002 Mayersak
2002/0119754 A1 8/2002 Wakutsu et al.
2002/0161775 A1 10/2002 Lasensky et al.
2002/0167417 A1 11/2002 Welles, II et al.
2002/0173341 A1 11/2002 Abdelmonem et al.
2003/0013454 A1 1/2003 Hunzinger
2003/0040277 A1 2/2003 Deats
2003/0083091 A1 5/2003 Nuutinen et al.
2003/0087648 A1 5/2003 Mezhvinsky et al.
2003/0104831 A1 6/2003 Razavilar et al.
2003/0144601 A1 7/2003 Prichep
2003/0145008 A1 7/2003 Burrell
2003/0145328 A1 7/2003 Rabinowitz et al.
2003/0198304 A1 10/2003 Sugar et al.
2003/0206640 A1 11/2003 Malvar et al.
2003/0224801 A1 12/2003 Lovberg et al.
2003/0232612 A1 12/2003 Richards et al.
2004/0001688 A1 1/2004 Shen
2004/0023674 A1 2/2004 Miller

(56) References Cited

U.S. PATENT DOCUMENTS

| | | | | |
|---|---|---|---|---|
| 2004/0041725 | A1 | 3/2004 | Matsuda et al. | |
| 2004/0127214 | A1 | 7/2004 | Reddy et al. | |
| 2004/0137915 | A1 | 7/2004 | Diener et al. | |
| 2004/0147254 | A1 | 7/2004 | Reddy et al. | |
| 2004/0171390 | A1 | 9/2004 | Chitrapu | |
| 2004/0203725 | A1 | 10/2004 | Lahav et al. | |
| 2004/0203826 | A1 | 10/2004 | Sugar et al. | |
| 2004/0208238 | A1 | 10/2004 | Thomas et al. | |
| 2004/0219885 | A1 | 11/2004 | Sugar et al. | |
| 2004/0233100 | A1 | 11/2004 | Dibble et al. | |
| 2005/0003828 | A1 | 1/2005 | Sugar et al. | |
| 2005/0096026 | A1 | 5/2005 | Chitrapu et al. | |
| 2005/0107102 | A1 | 5/2005 | Yoon et al. | |
| 2005/0114023 | A1 | 5/2005 | Williamson et al. | |
| 2005/0140354 | A1* | 6/2005 | Meir | H04N 17/00 324/76.22 |
| 2005/0152317 | A1 | 7/2005 | Awater et al. | |
| 2005/0159928 | A1 | 7/2005 | Moser | |
| 2005/0176401 | A1 | 8/2005 | Nanda et al. | |
| 2005/0185618 | A1 | 8/2005 | Friday et al. | |
| 2005/0192727 | A1 | 9/2005 | Shostak et al. | |
| 2005/0227625 | A1 | 10/2005 | Diener | |
| 2005/0261563 | A1 | 11/2005 | Zhou et al. | |
| 2005/0285792 | A1 | 12/2005 | Sugar et al. | |
| 2006/0025118 | A1 | 2/2006 | Chitrapu et al. | |
| 2006/0047704 | A1 | 3/2006 | Gopalakrishnan | |
| 2006/0074558 | A1 | 4/2006 | Williamson et al. | |
| 2006/0080040 | A1 | 4/2006 | Garczarek et al. | |
| 2006/0100530 | A1 | 5/2006 | Kliot et al. | |
| 2006/0111899 | A1 | 5/2006 | Padhi et al. | |
| 2006/0128311 | A1 | 6/2006 | Tesfai | |
| 2006/0133263 | A1 | 6/2006 | Bernard et al. | |
| 2006/0199546 | A1 | 9/2006 | Durgin | |
| 2006/0235574 | A1 | 10/2006 | Lapinski et al. | |
| 2006/0238417 | A1 | 10/2006 | Jendbro et al. | |
| 2006/0258347 | A1 | 11/2006 | Chitrapu | |
| 2007/0003059 | A1 | 1/2007 | Langelaar | |
| 2007/0016412 | A1 | 1/2007 | Mehrotra et al. | |
| 2007/0041481 | A1 | 2/2007 | Malkemes et al. | |
| 2007/0049823 | A1 | 3/2007 | Li | |
| 2007/0076657 | A1 | 4/2007 | Woodings et al. | |
| 2007/0098089 | A1 | 5/2007 | Li et al. | |
| 2007/0111746 | A1 | 5/2007 | Anderson | |
| 2007/0126636 | A1 | 6/2007 | Zhang et al. | |
| 2007/0149216 | A1 | 6/2007 | Misikangas | |
| 2007/0168580 | A1 | 7/2007 | Schumacher | |
| 2007/0171889 | A1 | 7/2007 | Kwon et al. | |
| 2007/0174021 | A1 | 7/2007 | Bernard et al. | |
| 2007/0203645 | A1 | 8/2007 | Dees et al. | |
| 2007/0223419 | A1 | 9/2007 | Ji et al. | |
| 2007/0233336 | A1 | 10/2007 | Serguei et al. | |
| 2007/0233409 | A1 | 10/2007 | Boyan et al. | |
| 2007/0273581 | A1 | 11/2007 | Garrison et al. | |
| 2007/0293171 | A1 | 12/2007 | Li et al. | |
| 2007/0296591 | A1 | 12/2007 | Frederick et al. | |
| 2007/0297541 | A1 | 12/2007 | Mcgehee | |
| 2008/0001735 | A1 | 1/2008 | Tran | |
| 2008/0010040 | A1 | 1/2008 | Mcgehee | |
| 2008/0090563 | A1 | 4/2008 | Chitrapu | |
| 2008/0108365 | A1 | 5/2008 | Buddhikot et al. | |
| 2008/0113634 | A1 | 5/2008 | Gates et al. | |
| 2008/0123731 | A1 | 5/2008 | Wegener | |
| 2008/0129367 | A1 | 6/2008 | Murata et al. | |
| 2008/0130519 | A1 | 6/2008 | Bahl et al. | |
| 2008/0133190 | A1 | 6/2008 | Peretz et al. | |
| 2008/0180325 | A1 | 7/2008 | Chung et al. | |
| 2008/0186235 | A1 | 8/2008 | Struckman et al. | |
| 2008/0195584 | A1 | 8/2008 | Nath et al. | |
| 2008/0198948 | A1 | 8/2008 | Tang | |
| 2008/0209117 | A1 | 8/2008 | Kajigaya | |
| 2008/0211481 | A1 | 9/2008 | Chen | |
| 2008/0214903 | A1 | 9/2008 | Orbach | |
| 2008/0252516 | A1 | 10/2008 | Ho et al. | |
| 2008/0261509 | A1 | 10/2008 | Sen | |
| 2008/0293353 | A1 | 11/2008 | Mody et al. | |
| 2009/0006103 | A1 | 1/2009 | Koishida et al. | |
| 2009/0011713 | A1 | 1/2009 | Abusubaih et al. | |
| 2009/0013210 | A1 | 1/2009 | McIntosh et al. | |
| 2009/0018422 | A1 | 1/2009 | Banet et al. | |
| 2009/0021420 | A1 | 1/2009 | Sahinoglu | |
| 2009/0034508 | A1* | 2/2009 | Gurney | H04W 16/14 370/351 |
| 2009/0046003 | A1 | 2/2009 | Tung et al. | |
| 2009/0046625 | A1 | 2/2009 | Diener et al. | |
| 2009/0066578 | A1 | 3/2009 | Beadle et al. | |
| 2009/0086993 | A1 | 4/2009 | Kawaguchi et al. | |
| 2009/0102705 | A1 | 4/2009 | Obermeyer | |
| 2009/0103094 | A1 | 4/2009 | Hilfiker et al. | |
| 2009/0111463 | A1 | 4/2009 | Simms et al. | |
| 2009/0131067 | A1 | 5/2009 | Aaron | |
| 2009/0135046 | A1 | 5/2009 | Steele et al. | |
| 2009/0136052 | A1 | 5/2009 | Hohlfeld et al. | |
| 2009/0143019 | A1 | 6/2009 | Shellhammer | |
| 2009/0146881 | A1 | 6/2009 | Mesecher | |
| 2009/0149202 | A1 | 6/2009 | Hill et al. | |
| 2009/0190511 | A1 | 7/2009 | Li et al. | |
| 2009/0207950 | A1 | 8/2009 | Tsuruta et al. | |
| 2009/0224957 | A1 | 9/2009 | Chung et al. | |
| 2009/0245327 | A1 | 10/2009 | Michaels | |
| 2009/0273517 | A1 | 11/2009 | Thiesen et al. | |
| 2009/0278733 | A1 | 11/2009 | Haworth | |
| 2009/0280748 | A1 | 11/2009 | Shan et al. | |
| 2009/0282130 | A1 | 11/2009 | Antoniou et al. | |
| 2009/0285173 | A1 | 11/2009 | Koorapaty et al. | |
| 2009/0286563 | A1 | 11/2009 | Ji et al. | |
| 2009/0322510 | A1 | 12/2009 | Berger et al. | |
| 2010/0020707 | A1 | 1/2010 | Woodings | |
| 2010/0044122 | A1 | 2/2010 | Sleeman et al. | |
| 2010/0056200 | A1 | 3/2010 | Tolonen | |
| 2010/0075704 | A1 | 3/2010 | Mchenry et al. | |
| 2010/0109936 | A1 | 5/2010 | Levy | |
| 2010/0142454 | A1 | 6/2010 | Chang | |
| 2010/0150122 | A1 | 6/2010 | Berger et al. | |
| 2010/0172443 | A1 | 7/2010 | Shim et al. | |
| 2010/0173586 | A1 | 7/2010 | Mchenry et al. | |
| 2010/0176988 | A1 | 7/2010 | Maezawa et al. | |
| 2010/0177710 | A1 | 7/2010 | Gutkin et al. | |
| 2010/0220011 | A1 | 9/2010 | Heuser | |
| 2010/0253512 | A1 | 10/2010 | Wagner et al. | |
| 2010/0255794 | A1 | 10/2010 | Agnew | |
| 2010/0255801 | A1 | 10/2010 | Gunasekara et al. | |
| 2010/0259998 | A1 | 10/2010 | Kwon et al. | |
| 2010/0279680 | A1 | 11/2010 | Reudink | |
| 2010/0292930 | A1 | 11/2010 | Koster et al. | |
| 2010/0306249 | A1 | 12/2010 | Hill et al. | |
| 2010/0309317 | A1 | 12/2010 | Wu et al. | |
| 2010/0325621 | A1 | 12/2010 | Andrade et al. | |
| 2011/0022342 | A1 | 1/2011 | Pandharipande et al. | |
| 2011/0045781 | A1 | 2/2011 | Shellhammer et al. | |
| 2011/0053604 | A1 | 3/2011 | Kim et al. | |
| 2011/0059747 | A1 | 3/2011 | Lindoff et al. | |
| 2011/0070885 | A1 | 3/2011 | Ruuska et al. | |
| 2011/0074631 | A1 | 3/2011 | Parker | |
| 2011/0077017 | A1 | 3/2011 | Yu et al. | |
| 2011/0087639 | A1 | 4/2011 | Gurney | |
| 2011/0090939 | A1 | 4/2011 | Diener et al. | |
| 2011/0096770 | A1 | 4/2011 | Henry | |
| 2011/0102258 | A1 | 5/2011 | Underbrink et al. | |
| 2011/0111751 | A1 | 5/2011 | Markhovsky et al. | |
| 2011/0116484 | A1 | 5/2011 | Henry | |
| 2011/0117869 | A1 | 5/2011 | Woodings | |
| 2011/0122855 | A1 | 5/2011 | Henry | |
| 2011/0129006 | A1 | 6/2011 | Jung et al. | |
| 2011/0131260 | A1 | 6/2011 | Mody | |
| 2011/0134878 | A1 | 6/2011 | Geiger et al. | |
| 2011/0136478 | A1 | 6/2011 | Trigui | |
| 2011/0151876 | A1 | 6/2011 | Ishii et al. | |
| 2011/0183621 | A1 | 7/2011 | Quan et al. | |
| 2011/0183685 | A1 | 7/2011 | Burton et al. | |
| 2011/0185059 | A1 | 7/2011 | Adnani et al. | |
| 2011/0188544 | A1 | 8/2011 | Ponnuswamy | |
| 2011/0235728 | A1 | 9/2011 | Karabinis | |
| 2011/0237243 | A1 | 9/2011 | Guvenc et al. | |
| 2011/0241923 | A1 | 10/2011 | Chernukhin | |

(56) References Cited

U.S. PATENT DOCUMENTS

| | | | |
|---|---|---|---|
| 2011/0273328 | A1 | 11/2011 | Parker |
| 2011/0286555 | A1 | 11/2011 | Cho et al. |
| 2011/0286604 | A1 | 11/2011 | Matsuo |
| 2011/0287779 | A1 | 11/2011 | Harper |
| 2011/0299481 | A1 | 12/2011 | Kim et al. |
| 2011/0300849 | A1 | 12/2011 | Chan |
| 2011/0319120 | A1 | 12/2011 | Chen et al. |
| 2012/0014332 | A1 | 1/2012 | Smith et al. |
| 2012/0032854 | A1 | 2/2012 | Bull et al. |
| 2012/0039284 | A1 | 2/2012 | Barbieri et al. |
| 2012/0040602 | A1 | 2/2012 | Charland |
| 2012/0047544 | A1 | 2/2012 | Bouchard |
| 2012/0052811 | A1 | 3/2012 | Watson et al. |
| 2012/0052869 | A1 | 3/2012 | Lindoff et al. |
| 2012/0058775 | A1 | 3/2012 | Dupray et al. |
| 2012/0063302 | A1 | 3/2012 | Damnjanovic et al. |
| 2012/0071188 | A1 | 3/2012 | Wang et al. |
| 2012/0072986 | A1 | 3/2012 | Livsics et al. |
| 2012/0077510 | A1 | 3/2012 | Chen et al. |
| 2012/0078071 | A1 | 3/2012 | Bohm et al. |
| 2012/0081248 | A1 | 4/2012 | Kennedy et al. |
| 2012/0094681 | A1 | 4/2012 | Freda et al. |
| 2012/0100810 | A1 | 4/2012 | Oksanen et al. |
| 2012/0105066 | A1 | 5/2012 | Marvin et al. |
| 2012/0115522 | A1 | 5/2012 | Nama et al. |
| 2012/0115525 | A1 | 5/2012 | Kang et al. |
| 2012/0120892 | A1 | 5/2012 | Freda et al. |
| 2012/0129522 | A1 | 5/2012 | Kim et al. |
| 2012/0135767 | A1 | 5/2012 | Singh |
| 2012/0140236 | A1 | 6/2012 | Babbitt et al. |
| 2012/0142386 | A1 | 6/2012 | Mody et al. |
| 2012/0148068 | A1 | 6/2012 | Chandra et al. |
| 2012/0148069 | A1 | 6/2012 | Bai et al. |
| 2012/0155217 | A1 | 6/2012 | Dellinger et al. |
| 2012/0169424 | A1 | 7/2012 | Pinarello et al. |
| 2012/0179415 | A1 | 7/2012 | Nara |
| 2012/0182430 | A1 | 7/2012 | Birkett et al. |
| 2012/0195269 | A1 | 8/2012 | Kang et al. |
| 2012/0212628 | A1 | 8/2012 | Wu et al. |
| 2012/0214511 | A1 | 8/2012 | Vartanian et al. |
| 2012/0230214 | A1 | 9/2012 | Kozisek et al. |
| 2012/0246392 | A1 | 9/2012 | Cheon |
| 2012/0252371 | A1 | 10/2012 | Pintilei |
| 2012/0264388 | A1 | 10/2012 | Guo et al. |
| 2012/0264445 | A1 | 10/2012 | Lee et al. |
| 2012/0275354 | A1 | 11/2012 | Villain |
| 2012/0281000 | A1 | 11/2012 | Woodings |
| 2012/0282942 | A1 | 11/2012 | Uusitalo et al. |
| 2012/0295575 | A1 | 11/2012 | Nam |
| 2012/0302190 | A1 | 11/2012 | Mchenry |
| 2012/0302263 | A1 | 11/2012 | Tinnakornsrisuphap et al. |
| 2012/0309288 | A1 | 12/2012 | Lu |
| 2012/0321024 | A1 | 12/2012 | Wasiewicz et al. |
| 2012/0322487 | A1 | 12/2012 | Stanforth |
| 2013/0005240 | A1 | 1/2013 | Novak et al. |
| 2013/0005374 | A1 | 1/2013 | Uusitalo et al. |
| 2013/0012134 | A1 | 1/2013 | Jin et al. |
| 2013/0017794 | A1 | 1/2013 | Kloper et al. |
| 2013/0023285 | A1 | 1/2013 | Markhovsky et al. |
| 2013/0028111 | A1 | 1/2013 | Dain et al. |
| 2013/0035108 | A1 | 2/2013 | Joslyn et al. |
| 2013/0035128 | A1 | 2/2013 | Chan et al. |
| 2013/0045754 | A1 | 2/2013 | Markhovsky et al. |
| 2013/0052939 | A1 | 2/2013 | Anniballi et al. |
| 2013/0053054 | A1 | 2/2013 | Lovitt et al. |
| 2013/0062334 | A1 | 3/2013 | Bilchinsky et al. |
| 2013/0064197 | A1 | 3/2013 | Novak et al. |
| 2013/0064328 | A1 | 3/2013 | Adnani et al. |
| 2013/0070639 | A1 | 3/2013 | Demura et al. |
| 2013/0090071 | A1 | 4/2013 | Abraham et al. |
| 2013/0095843 | A1 | 4/2013 | Smith et al. |
| 2013/0100154 | A1 | 4/2013 | Woodings et al. |
| 2013/0103684 | A1 | 4/2013 | Yee et al. |
| 2013/0113659 | A1 | 5/2013 | Morgan |
| 2013/0165051 | A9 | 6/2013 | Li et al. |
| 2013/0165134 | A1 | 6/2013 | Touag et al. |
| 2013/0165170 | A1 | 6/2013 | Kang |
| 2013/0183989 | A1 | 7/2013 | Hasegawa et al. |
| 2013/0183994 | A1 | 7/2013 | Ringstroem et al. |
| 2013/0184022 | A1 | 7/2013 | Schmidt |
| 2013/0190003 | A1 | 7/2013 | Smith et al. |
| 2013/0190028 | A1 | 7/2013 | Wang et al. |
| 2013/0196677 | A1 | 8/2013 | Smith et al. |
| 2013/0208587 | A1 | 8/2013 | Bala et al. |
| 2013/0210457 | A1 | 8/2013 | Kummetz |
| 2013/0210473 | A1 | 8/2013 | Weigand |
| 2013/0217406 | A1 | 8/2013 | Villardi et al. |
| 2013/0217408 | A1 | 8/2013 | Difazio et al. |
| 2013/0217450 | A1 | 8/2013 | Kanj et al. |
| 2013/0231121 | A1 | 9/2013 | Kwak et al. |
| 2013/0237212 | A1 | 9/2013 | Khayrallah et al. |
| 2013/0242792 | A1 | 9/2013 | Woodings |
| 2013/0242934 | A1 | 9/2013 | Ueda et al. |
| 2013/0260703 | A1 | 10/2013 | Actis et al. |
| 2013/0265198 | A1 | 10/2013 | Stroud |
| 2013/0272436 | A1 | 10/2013 | Makhlouf et al. |
| 2013/0275346 | A1 | 10/2013 | Srikanteswara et al. |
| 2013/0279556 | A1 | 10/2013 | Seller |
| 2013/0288734 | A1 | 10/2013 | Mody et al. |
| 2013/0309975 | A1 | 11/2013 | Kpodzo et al. |
| 2013/0315112 | A1 | 11/2013 | Gormley et al. |
| 2013/0329690 | A1 | 12/2013 | Kim et al. |
| 2013/0331114 | A1 | 12/2013 | Gormley et al. |
| 2014/0003547 | A1 | 1/2014 | Williams et al. |
| 2014/0015796 | A1 | 1/2014 | Philipp |
| 2014/0018683 | A1 | 1/2014 | Park et al. |
| 2014/0018979 | A1 | 1/2014 | Goossen et al. |
| 2014/0024405 | A1 | 1/2014 | Qiu |
| 2014/0064723 | A1 | 3/2014 | Adles et al. |
| 2014/0066060 | A1 | 3/2014 | Ngai |
| 2014/0073261 | A1 | 3/2014 | Hassan et al. |
| 2014/0086212 | A1 | 3/2014 | Kafle et al. |
| 2014/0112281 | A1 | 4/2014 | Lau et al. |
| 2014/0128032 | A1 | 5/2014 | Muthukumar et al. |
| 2014/0139374 | A1 | 5/2014 | Wellman et al. |
| 2014/0163309 | A1 | 6/2014 | Bernhard et al. |
| 2014/0199993 | A1 | 7/2014 | Dhanda et al. |
| 2014/0201367 | A1 | 7/2014 | Trummer et al. |
| 2014/0204766 | A1 | 7/2014 | Immendorf et al. |
| 2014/0206279 | A1 | 7/2014 | Immendorf et al. |
| 2014/0206307 | A1 | 7/2014 | Maurer et al. |
| 2014/0206343 | A1 | 7/2014 | Immendorf et al. |
| 2014/0207414 | A1 | 7/2014 | Bordow |
| 2014/0225590 | A1 | 8/2014 | Jacobs |
| 2014/0256268 | A1 | 9/2014 | Olgaard |
| 2014/0256370 | A9 | 9/2014 | Gautier et al. |
| 2014/0269374 | A1 | 9/2014 | Abdelmonem et al. |
| 2014/0269376 | A1 | 9/2014 | Garcia et al. |
| 2014/0274103 | A1 | 9/2014 | Steer et al. |
| 2014/0274132 | A1 | 9/2014 | Abdelmonem et al. |
| 2014/0287100 | A1 | 9/2014 | Libman |
| 2014/0288811 | A1 | 9/2014 | Oura |
| 2014/0301216 | A1 | 10/2014 | Immendorf et al. |
| 2014/0302796 | A1 | 10/2014 | Gormley et al. |
| 2014/0335879 | A1 | 11/2014 | Immendorf et al. |
| 2014/0340684 | A1 | 11/2014 | Edler et al. |
| 2014/0342675 | A1 | 11/2014 | Massarella et al. |
| 2014/0348004 | A1 | 11/2014 | Ponnuswamy |
| 2014/0362934 | A1 | 12/2014 | Kumar |
| 2015/0016429 | A1 | 1/2015 | Menon et al. |
| 2015/0023329 | A1 | 1/2015 | Jiang et al. |
| 2015/0068296 | A1 | 3/2015 | Lanza di Scalea |
| 2015/0072633 | A1 | 3/2015 | Massarella et al. |
| 2015/0126181 | A1 | 5/2015 | Breuer et al. |
| 2015/0133058 | A1 | 5/2015 | Livis et al. |
| 2015/0150753 | A1 | 6/2015 | Racette |
| 2015/0156827 | A1 | 6/2015 | Ibragimov et al. |
| 2015/0170145 | A1 | 6/2015 | Patel et al. |
| 2015/0201385 | A1 | 7/2015 | Mercer et al. |
| 2015/0208312 | A1 | 7/2015 | Fudaba |
| 2015/0215794 | A1 | 7/2015 | Gormley et al. |
| 2015/0215949 | A1 | 7/2015 | Gormley et al. |
| 2015/0242384 | A1 | 8/2015 | Reiter |
| 2015/0248047 | A1 | 9/2015 | Chakraborty |

(56) References Cited

U.S. PATENT DOCUMENTS

2015/0289254 A1 10/2015 Garcia et al.
2015/0289265 A1 10/2015 Gormley et al.
2015/0296386 A1 10/2015 Menon et al.
2015/0301167 A1 10/2015 Sentelle et al.
2015/0319768 A1 11/2015 Abdelmonem et al.
2015/0326853 A1 11/2015 Grzelka et al.
2015/0365941 A1 12/2015 Liu et al.
2015/0373528 A1 12/2015 Iwai
2016/0014713 A1 1/2016 Kennedy et al.
2016/0037550 A1 2/2016 Barabell et al.
2016/0050690 A1 2/2016 Yun et al.
2016/0061583 A1 3/2016 Ryu et al.
2016/0069994 A1 3/2016 Allen et al.
2016/0072597 A1 3/2016 Carbajal
2016/0073318 A1 3/2016 Aguirre
2016/0080955 A1 3/2016 Carbajal
2016/0086621 A1 3/2016 Hearing et al.
2016/0095188 A1 3/2016 Verberkt et al.
2016/0117853 A1 4/2016 Zhong et al.
2016/0124041 A1 5/2016 Pathak et al.
2016/0124071 A1 5/2016 Baxley et al.
2016/0126988 A1 5/2016 Mester et al.
2016/0127110 A1 5/2016 McMeekin et al.
2016/0127392 A1 5/2016 Baxley et al.
2016/0131743 A1 5/2016 Addison et al.
2016/0154406 A1 6/2016 Im et al.
2016/0161578 A1 6/2016 Weissler et al.
2016/0198471 A1 7/2016 Young et al.
2016/0219506 A1 7/2016 Pratt et al.
2016/0219590 A1 7/2016 Khawer et al.
2016/0225240 A1 8/2016 Voddhi et al.
2016/0241910 A1 8/2016 Rowe
2016/0245921 A1 8/2016 Li et al.
2016/0252342 A1 9/2016 Feldmann et al.
2016/0323920 A1 11/2016 Carbajal
2016/0328983 A1 11/2016 Hutchinson et al.
2016/0334527 A1 11/2016 Xu et al.
2016/0345135 A1 11/2016 Garcia et al.
2016/0364079 A1 12/2016 Qiu et al.
2016/0366685 A1 12/2016 Gormley et al.
2016/0374088 A1 12/2016 Garcia et al.
2017/0024767 A1 1/2017 Johnson, Jr. et al.
2017/0025996 A1 1/2017 Cheung et al.
2017/0039413 A1 2/2017 Nadler
2017/0041895 A1 2/2017 Gan
2017/0048838 A1 2/2017 Chrisikos et al.
2017/0059692 A1 3/2017 Laufer et al.
2017/0061690 A1 3/2017 Laughlin et al.
2017/0064564 A1 3/2017 Yun et al.
2017/0068867 A1 3/2017 Lee et al.
2017/0078792 A1 3/2017 Simons
2017/0079007 A1 3/2017 Carbajal
2017/0094527 A1 3/2017 Shattil et al.
2017/0118049 A1 4/2017 Miao et al.
2017/0134631 A1 5/2017 Zhao et al.
2017/0146462 A1 5/2017 Baker et al.
2017/0148332 A1 5/2017 Ziemba et al.
2017/0148467 A1 5/2017 Franklin et al.
2017/0192089 A1 7/2017 Parker et al.
2017/0208495 A1 7/2017 Kleinbeck et al.
2017/0234979 A1 8/2017 Mathews et al.
2017/0237484 A1 8/2017 Heath et al.
2017/0238201 A1 8/2017 Gormley et al.
2017/0238203 A1 8/2017 Dzierwa et al.
2017/0243138 A1 8/2017 Dzierwa et al.
2017/0243139 A1 8/2017 Dzierwa et al.
2017/0248677 A1 8/2017 Mahmood et al.
2017/0248807 A1 8/2017 Jiang et al.
2017/0250766 A1 8/2017 Dzierwa et al.
2017/0253330 A1 9/2017 Saigh et al.
2017/0261604 A1 9/2017 Van Voorst
2017/0261613 A1 9/2017 Van Voorst
2017/0261615 A1 9/2017 Ying et al.
2017/0274992 A1 9/2017 Chretien
2017/0276763 A1 9/2017 Howard
2017/0289840 A1 10/2017 Sung et al.
2017/0290075 A1 10/2017 Carbajal et al.
2017/0303014 A1 10/2017 Ghessassi
2017/0311307 A1 10/2017 Negus et al.
2017/0358103 A1 12/2017 Shao et al.
2017/0366361 A1 12/2017 Afkhami et al.
2017/0374572 A1 12/2017 Kleinbeck et al.
2017/0374573 A1 12/2017 Kleinbeck et al.
2018/0006730 A1 1/2018 Kuo et al.
2018/0014217 A1 1/2018 Kleinbeck et al.
2018/0024220 A1 1/2018 Massarella et al.
2018/0046869 A1 2/2018 Cordell et al.
2018/0070362 A1 3/2018 Ryan et al.
2018/0074170 A1 3/2018 Ray
2018/0074171 A1 3/2018 Ray et al.
2018/0081355 A1 3/2018 Magy et al.
2018/0083721 A1 3/2018 Wada et al.
2018/0098173 A1 4/2018 van Brandenburg et al.
2018/0115065 A1 4/2018 Valdes Garcia et al.
2018/0124533 A1 5/2018 Messier et al.
2018/0129881 A1 5/2018 Seeber et al.
2018/0131445 A1 5/2018 Esman et al.
2018/0143314 A1 5/2018 Pelletier et al.
2018/0149729 A1 5/2018 Grandin et al.
2018/0167772 A1 6/2018 Bennett et al.
2018/0211179 A1 7/2018 Dzierwa
2018/0260561 A1 9/2018 Mestha et al.
2018/0262525 A1 9/2018 Yan et al.
2018/0284758 A1 10/2018 Cella et al.
2018/0288620 A1 10/2018 Jayawickrama et al.
2018/0288630 A1 10/2018 Guirguis et al.
2018/0294901 A1 10/2018 Garcia et al.
2018/0313877 A1 11/2018 Brant et al.
2018/0313945 A1 11/2018 Parker et al.
2018/0324595 A1 11/2018 Shima
2018/0329020 A1 11/2018 Hafizovic et al.
2018/0331863 A1 11/2018 Carbajal
2019/0004518 A1 1/2019 Zhou et al.
2019/0011534 A1 1/2019 Trotta et al.
2019/0018103 A1 1/2019 Qian et al.
2019/0049943 A1 2/2019 Xue et al.
2019/0064130 A1 2/2019 Kanazawa et al.
2019/0064223 A1 2/2019 Kincaid
2019/0072601 A1 3/2019 Dzierwa et al.
2019/0074802 A1 3/2019 Geha et al.
2019/0077507 A1 3/2019 Ferris et al.
2019/0123428 A1 4/2019 Packer et al.
2019/0180630 A1 6/2019 Kleinbeck
2019/0190553 A1 6/2019 Tsuji et al.
2019/0191313 A1 6/2019 Dzierwa et al.
2019/0199756 A1 6/2019 Correnti et al.
2019/0200303 A1 6/2019 Nakahara
2019/0208112 A1 7/2019 Kleinbeck
2019/0208491 A1 7/2019 Dzierwa et al.
2019/0215709 A1 7/2019 Kleinbeck et al.
2019/0223139 A1 7/2019 Kleinbeck et al.
2019/0230539 A1 7/2019 Dzierwa et al.
2019/0230540 A1 7/2019 Carbajal et al.
2019/0236266 A1 8/2019 Nashimoto et al.
2019/0245722 A1 8/2019 Carbajal
2019/0246304 A1 8/2019 Dzierwa et al.
2019/0253160 A1 8/2019 Garcia et al.
2019/0253905 A1 8/2019 Kleinbeck et al.
2019/0260768 A1 8/2019 Mestha et al.
2019/0274059 A1 9/2019 Kleinbeck et al.
2019/0296910 A1 9/2019 Cheung
2019/0302249 A1 10/2019 High et al.
2019/0302275 A1 10/2019 Tao et al.
2019/0342202 A1 11/2019 Ryan et al.
2019/0346571 A1 11/2019 Furumoto
2019/0359252 A1 11/2019 Yu et al.
2019/0360783 A1 11/2019 Whittaker
2019/0364433 A1 11/2019 Das
2019/0364533 A1 11/2019 Kleinbeck et al.
2020/0034620 A1 1/2020 Lutterodt
2020/0036459 A1 1/2020 Menon
2020/0036487 A1 1/2020 Hammond et al.
2020/0043346 A1 2/2020 Vacek
2020/0059800 A1 2/2020 Menon et al.

(56) References Cited

U.S. PATENT DOCUMENTS

| | | | |
|---|---|---|---|
| 2020/0066132 | A1 | 2/2020 | Kleinbeck |
| 2020/0067752 | A1 | 2/2020 | DelMarco |
| 2020/0068573 | A1 | 2/2020 | Drozd et al. |
| 2020/0096548 | A1 | 3/2020 | Dzierwa et al. |
| 2020/0107207 | A1 | 4/2020 | Kleinbeck et al. |
| 2020/0120266 | A1 | 4/2020 | Kleinbeck |
| 2020/0128418 | A1 | 4/2020 | Dzierwa et al. |
| 2020/0137583 | A1 | 4/2020 | Economy et al. |
| 2020/0142029 | A1 | 5/2020 | Brooker et al. |
| 2020/0145032 | A1 | 5/2020 | Ayala et al. |
| 2020/0151554 | A1 | 5/2020 | Siraj et al. |
| 2020/0162890 | A1 | 5/2020 | Spencer et al. |
| 2020/0167196 | A1 | 5/2020 | Smith et al. |
| 2020/0169892 | A1 | 5/2020 | Dzierwa et al. |
| 2020/0184832 | A1 | 6/2020 | Kleinbeck |
| 2020/0196269 | A1 | 6/2020 | Dzierwa et al. |
| 2020/0196270 | A1 | 6/2020 | Kleinbeck et al. |
| 2020/0242603 | A1 | 7/2020 | Salkintzis |
| 2020/0245167 | A1 | 7/2020 | Kleinbeck et al. |
| 2020/0260306 | A1 | 8/2020 | Kleinbeck et al. |
| 2020/0294032 | A1 | 9/2020 | Cheng et al. |
| 2020/0295855 | A1 | 9/2020 | Kleinbeck et al. |
| 2020/0382961 | A1 | 12/2020 | Shattil et al. |
| 2020/0388036 | A1 | 12/2020 | Skrede et al. |
| 2021/0014696 | A1 | 1/2021 | Brookes |
| 2021/0067974 | A1 | 3/2021 | Guo et al. |
| 2021/0082254 | A1 | 3/2021 | Givant |
| 2021/0084217 | A1 | 3/2021 | Kleinbeck |
| 2021/0211911 | A1 | 7/2021 | Kleinbeck et al. |
| 2021/0250795 | A1 | 8/2021 | Dzierwa et al. |
| 2021/0255356 | A1 | 8/2021 | Vu et al. |
| 2021/0280039 | A1 | 9/2021 | Kleinbeck |
| 2021/0281510 | A1 | 9/2021 | Brown, Jr. et al. |
| 2021/0306022 | A1 | 9/2021 | Fernando et al. |
| 2021/0360423 | A1 | 11/2021 | Dzierwa et al. |
| 2021/0360450 | A1 | 11/2021 | Kleinbeck et al. |
| 2021/0360453 | A1 | 11/2021 | Kleinbeck et al. |
| 2021/0360454 | A1 | 11/2021 | Carbajal et al. |
| 2021/0407305 | A1 | 12/2021 | Jordan et al. |
| 2021/0409591 | A1 | 12/2021 | Kleinbeck |
| 2022/0030541 | A1 | 1/2022 | Dzierwa et al. |
| 2022/0052770 | A1 | 2/2022 | Kleinbeck et al. |
| 2022/0128612 | A1 | 4/2022 | Dzierwa et al. |
| 2022/0131623 | A1 | 4/2022 | Garcia et al. |
| 2022/0150824 | A1 | 5/2022 | Kleinbeck et al. |
| 2022/0174525 | A1 | 6/2022 | Dzierwa et al. |
| 2022/0253407 | A1 | 8/2022 | Tran |
| 2022/0262228 | A1 | 8/2022 | Kleinbeck |
| 2022/0262261 | A1 | 8/2022 | Kleinbeck |
| 2022/0286997 | A1 | 9/2022 | Kleinbeck et al. |
| 2022/0376921 | A1 | 11/2022 | Maria |
| 2023/0018133 | A1 | 1/2023 | Burnette et al. |
| 2023/0045636 | A1 | 2/2023 | Dzierwa et al. |
| 2023/0087729 | A1 | 3/2023 | Goldstein et al. |
| 2023/0098387 | A1 | 3/2023 | Hafeez et al. |
| 2023/0105718 | A1 | 4/2023 | Carbajal |
| 2023/0114804 | A1 | 4/2023 | Kleinbeck |
| 2023/0116761 | A1 | 4/2023 | Barry et al. |
| 2023/0118723 | A1 | 4/2023 | Carbajal et al. |
| 2023/0123375 | A1 | 4/2023 | Dzierwa et al. |
| 2023/0126223 | A1 | 4/2023 | Kleinbeck et al. |
| 2023/0189010 | A1 | 6/2023 | Muhammad et al. |
| 2023/0189382 | A1 | 6/2023 | Haustein et al. |
| 2023/0206216 | A1 | 6/2023 | Lehmann et al. |
| 2023/0209378 | A1 | 6/2023 | Kleinbeck et al. |
| 2023/0232244 | A1 | 7/2023 | Dzierwa et al. |
| 2023/0252744 | A1 | 8/2023 | Miller et al. |
| 2023/0254054 | A1 | 8/2023 | Garcia et al. |
| 2023/0254567 | A1 | 8/2023 | Kleinbeck |
| 2023/0254702 | A1 | 8/2023 | Damnjanovic et al. |
| 2023/0275791 | A1 | 8/2023 | Carbajal |
| 2023/0276280 | A1 | 8/2023 | Kleinbeck et al. |
| 2023/0300256 | A1 | 9/2023 | Zhao et al. |
| 2023/0308789 | A1 | 9/2023 | Tian et al. |
| 2023/0308915 | A1 | 9/2023 | Carbajal et al. |
| 2023/0326323 | A1 | 10/2023 | Kleinbeck |
| 2023/0328679 | A1 | 10/2023 | Kleinbeck et al. |
| 2023/0334472 | A1 | 10/2023 | Pene |
| 2023/0345441 | A1 | 10/2023 | Baxley |
| 2023/0349962 | A1 | 11/2023 | Dzierwa et al. |
| 2023/0378645 | A1 | 11/2023 | Tran |
| 2023/0403564 | A1 | 12/2023 | Dzierwa et al. |
| 2024/0005409 | A1 | 1/2024 | Doney |
| 2024/0007204 | A1 | 1/2024 | Kleinbeck et al. |
| 2024/0007479 | A1 | 1/2024 | Doney |
| 2024/0023054 | A1 | 1/2024 | Dzierwa et al. |
| 2024/0029572 | A1 | 1/2024 | Kleinbeck |
| 2024/0031042 | A1 | 1/2024 | Garcia et al. |
| 2024/0032084 | A1 | 1/2024 | Hellwig |
| 2024/0087460 | A1 | 3/2024 | Zelenka |
| 2024/0089130 | A1 | 3/2024 | Wang et al. |
| 2024/0097951 | A1 | 3/2024 | Carbajal |
| 2024/0103059 | A1 | 3/2024 | Dzierwa et al. |
| 2024/0114370 | A1 | 4/2024 | Kleinbeck et al. |
| 2024/0160791 | A1 | 5/2024 | He et al. |
| 2024/0214968 | A1 | 6/2024 | Dzierwa et al. |
| 2024/0241163 | A1 | 7/2024 | Dzierwa et al. |
| 2024/0242589 | A1 | 7/2024 | Kleinbeck |
| 2024/0244461 | A1 | 7/2024 | Kleinbeck et al. |
| 2024/0267268 | A1 | 8/2024 | Carbajal |
| 2024/0267769 | A1 | 8/2024 | Dzierwa et al. |
| 2024/0275504 | A1 | 8/2024 | Kleinbeck et al. |
| 2024/0276261 | A1 | 8/2024 | Kleinbeck et al. |
| 2024/0276262 | A1 | 8/2024 | Kleinbeck et al. |
| 2024/0284214 | A1 | 8/2024 | Kleinbeck et al. |
| 2024/0292248 | A1 | 8/2024 | Kleinbeck et al. |
| 2024/0306019 | A1 | 9/2024 | Murias et al. |
| 2024/0330927 | A1 | 10/2024 | Abdelrahman et al. |
| 2024/0362631 | A1 | 10/2024 | Agrawal et al. |
| 2024/0373463 | A1 | 11/2024 | Furuichi et al. |
| 2024/0378982 | A1 | 11/2024 | Kleinbeck |
| 2024/0381106 | A1 | 11/2024 | Montalvo et al. |
| 2024/0386800 | A1 | 11/2024 | Kleinbeck et al. |
| 2024/0386801 | A1 | 11/2024 | Kleinbeck et al. |
| 2024/0388935 | A1 | 11/2024 | Carbajal et al. |
| 2024/0388937 | A1 | 11/2024 | Murias et al. |
| 2024/0396648 | A1 | 11/2024 | Kleinbeck et al. |
| 2024/0430142 | A1 | 12/2024 | Carbajal |
| 2025/0007629 | A1 | 1/2025 | Dzierwa et al. |
| 2025/0039711 | A1 | 1/2025 | Dzierwa et al. |
| 2025/0063405 | A1 | 2/2025 | Carbajal et al. |
| 2025/0071584 | A1 | 2/2025 | Kleinbeck et al. |
| 2025/0106660 | A1 | 3/2025 | Kleinbeck et al. |
| 2025/0141722 | A1 | 5/2025 | Carbajal |
| 2025/0150841 | A1 | 5/2025 | Murias et al. |
| 2025/0174104 | A1 | 5/2025 | Kleinbeck |
| 2025/0184017 | A1 | 6/2025 | Kleinbeck et al. |
| 2025/0202602 | A1 | 6/2025 | Dzierwa et al. |
| 2025/0203417 | A1 | 6/2025 | Dzierwa et al. |
| 2025/0211343 | A1 | 6/2025 | Garcia et al. |
| 2025/0212034 | A1 | 6/2025 | Kleinbeck et al. |
| 2025/0225880 | A1 | 7/2025 | Kleinbeck et al. |
| 2025/0234223 | A1 | 7/2025 | Dzierwa et al. |
| 2025/0234224 | A1 | 7/2025 | Kleinbeck et al. |
| 2025/0240654 | A1 | 7/2025 | Carbajal et al. |
| 2025/0253963 | A1 | 8/2025 | Kleinbeck et al. |
| 2025/0321259 | A1 | 10/2025 | Dzierwa et al. |
| 2025/0330253 | A1 | 10/2025 | Dzierwa et al. |
| 2025/0330854 | A1 | 10/2025 | Kleinbeck et al. |
| 2025/0338248 | A1 | 10/2025 | Dzierwa et al. |
| 2026/0018065 | A1 | 1/2026 | Kleinbeck et al. |
| 2026/0019172 | A1 | 1/2026 | Kleinbeck et al. |
| 2026/0046651 | A1 | 2/2026 | Carbajal et al. |
| 2026/0074807 | A1 | 3/2026 | Garcia et al. |

FOREIGN PATENT DOCUMENTS

| | | | |
|---|---|---|---|
| CN | 117196617 | A | 12/2023 |
| CN | 117998368 | A | 5/2024 |
| EP | 2224262 | A | 9/2010 |
| GB | 2268857 | A | 1/1994 |
| KR | 100248671 | B1 | 4/2000 |
| KR | 20140041618 | A | 4/2014 |
| SU | 953557 | A1 | 8/1982 |

(56) References Cited

FOREIGN PATENT DOCUMENTS

| | | | |
|---|---|---|---|
| WO | 2008017617 | A1 | 2/2008 |
| WO | 2012129932 | A1 | 10/2012 |
| WO | 2018184682 | A1 | 10/2018 |
| WO | 2023197982 | A1 | 10/2023 |
| WO | 2023232010 | A1 | 12/2023 |

OTHER PUBLICATIONS

"A Low-Cost, Near-Real-Time Two-LIAS-Based UWB Emitter Monitoring System"; Wang et al.; IEEE A&E Systems Magazine Nov. 2015 (Year: 2015).
"Joint TDOA and FDOA Estimation: A Conditional Bound and Its Use for Optimally Weighted Localization"; Yeredor et al.; IEEE Transactions on Signal Processing, vol. 59, No. 4, Apr. 2011 (Year: 2011).
"Multipath TDOA and FDOA Estimation Using the EM Algorithm"; Belanger; Apr. 27, 1993; 1993 IEEE International Conference on Acoustics, Speech, and Signal Processing (Year: 1993).
"Noise Figure", Wikipedia, located at https://en.wikipedia.org/wiki/Noise_figure (Year: 2022).
"Signal Models for TDOA/FDOA Estimation"; Fowler et al.; IEEE Transactions on Aerospace and Electronic Systems vol. 44, No. 4 Oct. 2008 (Year: 2008).
"Specific attenuation model for rain for use in prediction methods", Recommendation ITU-R P.838-3 (Year: 2005).
Bluetooth vs Zigbee-difference between Bluetooth and Zigbee (located at https://www.rfwireless-world.com/Terminology/Bluetooth-vs-zigbee.html) (Year: 2012).
Boll S.F., Suppression of Acoustic Noise in Speech Using Spectral Subtraction, Apr. 1979, IEEE Transactions on Acoustics, Speech, and Signal Processing, vol. ASSP-27, No. 2, (Year: 1979).
CN110035440A—English translation.
CN115482071A—English translation.
CN117196617A—English translation.
CN117998368A—English translation.
David Eppink and Wolf Kuebler, "TIREM/SEM Handbook", Mar. 1994, IIT Research Institute, p. 1-6, located at http://www.dtic.mil/cgi-bin/GetTRDoc?Location=U2&doc=GetTRDoc.pdf&AD=ADA296913.
English translation of SU-953557-A1 (Year: 2024).
English translation of WO-2008017617 (Year: 2026).
Gabriel Garcia and Daniel Carbajal, U.S. Appl. No. 61/789,758, Provisional Patent Application, filed Mar. 15, 2013.
Gang Wang, Exploring Blockchains Interoperability (Year: 2021).
Gary L. Sugar, System and method for locating wireless devices in an unsynchronized wireless network, U.S. Appl. No. 60/319,737, Provisional Patent Application filed Nov. 27, 2002, Specification including the claims, abstract, and drawings.
IEEE 100 The Authoritative Dictionary of IEEE Standards Terms. Seventh Edition. Published by Standards Information Network IEEE Press. p. 6 (Year: 2000).
International Search Report and Written Opinion dated Jun. 21, 2018 issued by the International Application Division, Korean Intellectual Property Office as International Searching Authority in connection with International Application No. PCT/US2018/014504 (21 pages).
Mehmet Ali Aygul, Ahmed Naeem, Huseyin Arslan. "Blind Signal Analysis—Wireless Communication Signals", located at https://doi.org/10.1002/9781119764441.ch12 (Year: 2021).
Mobile Emitter Geolocation and Tracking Using TDOA and FDOA Measurements; Musicki et al.; IEEE Transactions on Signal Processing, vol. 58, No. 3, Mar. 2010 (Year: 2010).
RF and Digital Signal Processing for Software-Defined Radio, Chapter 4—High-Level Requirements and Link Budget Analysis (Year: 2009).
S. Dörner, S. Cammerer, J. Hoydis and S. t. Brink, "Deep Learning Based Communication Over the Air," in IEEE Journal of Selected Topics in Signal Processing, vol. 12, No. 1, pp. 132-143, Feb. 2018, doi: 10.1109/JSTSP.2017.2784180.
Second derivative by Siyavula, retrieved from https://www.siyavula.com/read/za/mathematics/grade-12/differential-calculus/06-differential-calculus-05#:-:text=The%20second%20derivative%20of%20a,increasing%2C%20decreasing%20or%20remaining% 20constant. (Year: 2026).
Steven W. Smith, The Scientist & Engineer's Guide to Digital Signal Processing, 1999, California Technical Publishing, San Diego, California, 2nd Edition, p. 312 (located at http://www.analog.com/media/en/technical-documentation/dsp-book/dsp_book_ch18.pdf) (Year: 1999).
T. J. O'Shea, K. Karra and T. C. Clancy, "Learning to communicate: Channel auto-encoders, domain specific regularizers, and attention," 2016 IEEE International Symposium on Signal Processing and Information Technology (ISSPIT), Limassol, Cyprus, 2016, pp. 223-228, doi: 10.1109/ISSPIT.2016.7886039.
T. O'Shea and J. Hoydis, "An Introduction to Deep Learning for the Physical Layer," in IEEE Transactions on Cognitive Communications and Networking, vol. 3, No. 4, pp. 563-575, Dec. 2017, doi: 10.1109/TCCN.2017.2758370.

* cited by examiner

SYSTEMS AND METHODS FOR SPECTRUM ANALYSIS UTILIZING SIGNAL DEGRADATION DATA

CROSS REFERENCE TO RELATED APPLICATIONS

This application is related to and claims priority from the following U.S. Patent Applications: this application is a continuation of U.S. application Ser. No. 19/391,459 filed Nov. 17, 2025, which is a continuation of U.S. application Ser. No. 19/286,910 filed Jul. 31, 2025, which is a continuation of U.S. application Ser. No. 19/077,675 filed Mar. 12, 2025, which is a continuation of U.S. application Ser. No. 18/955,234 filed Nov. 21, 2024, which is a continuation of U.S. application Ser. No. 18/792,113 filed Aug. 1, 2024, which is a continuation of U.S. application Ser. No. 18/434,178 filed Feb. 6, 2024, which is a continuation of U.S. application Ser. No. 18/374,385 filed Sep. 28, 2023, which is a continuation of U.S. application Ser. No. 18/137,785 filed Apr. 21, 2023, which is a continuation of U.S. application Ser. No. 18/082,210 filed Dec. 15, 2022, which is a continuation of U.S. application Ser. No. 17/569,984, filed Jan. 6, 2022, which is a continuation of U.S. application Ser. No. 16/751,887 filed Jan. 24, 2020, which is a continuation of U.S. application Ser. No. 16/395,987 filed Apr. 26, 2019, which is a continuation of U.S. application Ser. No. 16/002,751 filed Jun. 7, 2018, which is a continuation of U.S. application Ser. No. 15/228,325 filed Aug. 4, 2016, which is a continuation of U.S. application Ser. No. 14/743,011 filed Jun. 18, 2015, which is a continuation of U.S. patent application Ser. No. 13/912,893 filed Jun. 7, 2013, which claims the benefit of priority to U.S. Provisional Patent Application No. 61/789,758 filed Mar. 15, 2013, each of which is hereby incorporated by reference in its entirety.

BACKGROUND OF THE INVENTION

A problem faced in effective spectrum management is the various numbers of devices emanating wireless signal propagations at different frequencies and across different technological standards. Coupled with the different regulations relating to spectrum usage around the globe effective spectrum management becomes difficult to obtain and at best can only be reached over a long period of time.

Another problem facing effective spectrum management is the growing need for spectrum despite the finite amount of spectrum available. Wireless technologies have exponentially grown in recent years. Consequently, available spectrum has become a valuable resource that must be efficiently utilized. Therefore, systems and methods are needed to effectively manage and optimize the available spectrum that is being used.

Most spectrum management devices may be categorized into two primary types. The first type is a spectral analyzer where a device is specifically fitted to run a 'scanner' type receiver that is tailored to provide spectral information for a narrow window of frequencies related to a specific and limited type of communications standard, such as cellular communication standard. Problems arise with these narrowly tailored devices as cellular standards change and/or spectrum use changes impact the spectrum space of these technologies. Changes to the software and hardware for these narrowly tailored devices become too complicated, thus necessitating the need to purchase a totally different and new device. Unfortunately, this type of device is only for a specific use and cannot be used to alleviate the entire needs of the spectrum management community.

The second type of spectral management device employs a methodology that requires bulky, extremely difficult to use processes, and expensive equipment. In order to attain a broad spectrum management view and complete all the necessary tasks, the device ends up becoming a conglomerate of software and hardware devices that is both hard to use and difficult to maneuver from one location to another.

While there may be several additional problems associated with current spectrum management devices, the problems may be summed up as two major problems: 1) most devices are built to inherently only handle specific spectrum technologies such as 900 MHz cellular spectrum while not being able to mitigate other technologies that may be interfering or competing with that spectrum, and 2) the other spectrum management devices consist of large spectrum analyzers, database systems, and spectrum management software that is expensive, too bulky, and too difficult to manage for a user's basic needs.

SUMMARY OF THE INVENTION

The systems, methods, and devices of the various embodiments enable spectrum management by identifying, classifying, and cataloging signals of interest based on radio frequency measurements. In an embodiment, signals and the parameters of the signals may be identified and indications of available frequencies may be presented to a user. In another embodiment, the protocols of signals may also be identified. In a further embodiment, the modulation of signals, data types carried by the signals, and estimated signal origins may be identified.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION OF THE PRESENT INVENTION

Figure 1:
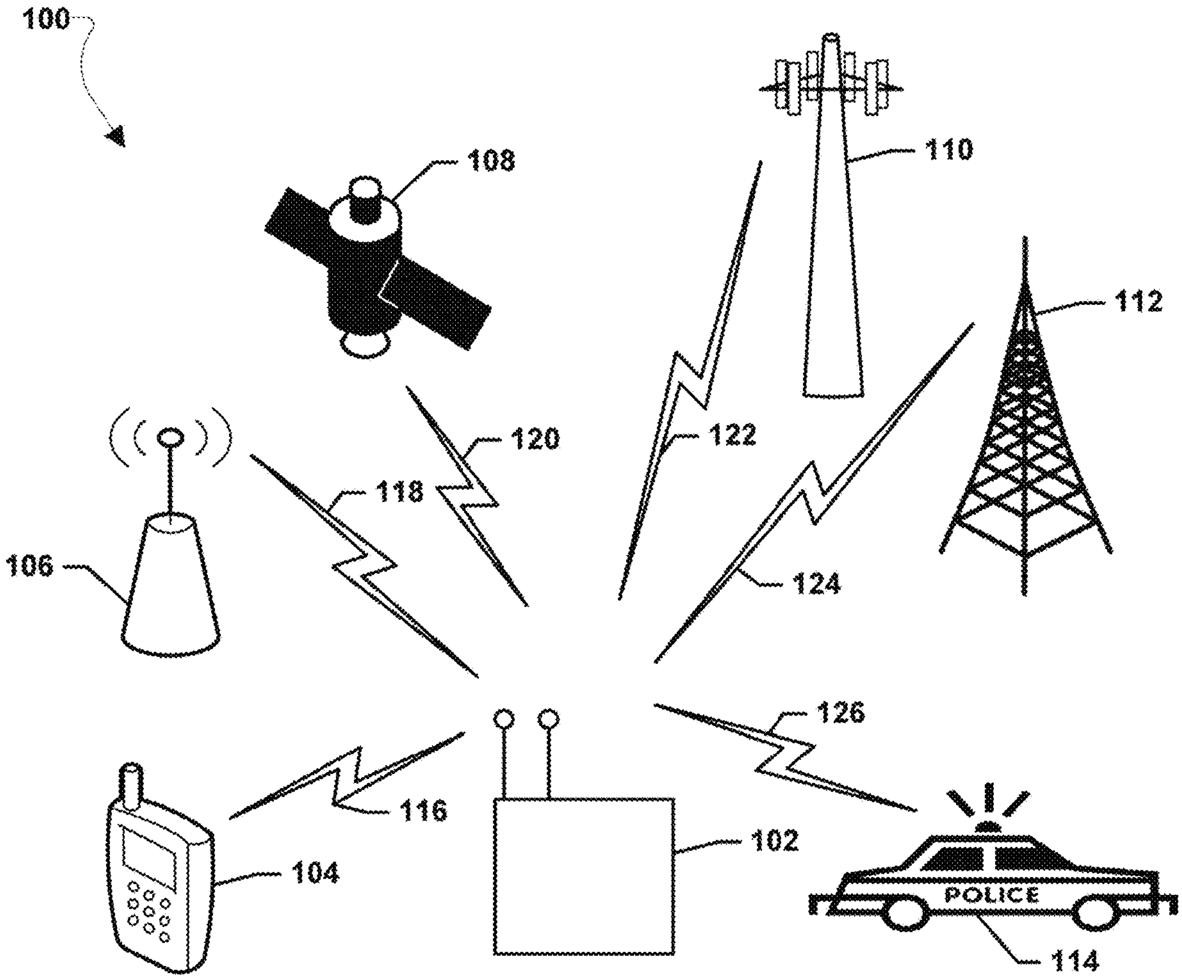
FIG. 1 is a system block diagram of a wireless environment suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

The systems, methods, and devices of the various embodiments enable spectrum management by identifying, classifying, and cataloging signals of interest based on radio frequency measurements. In an embodiment, signals and the parameters of the signals may be identified and indications of available frequencies may be presented to a user. In another embodiment, the protocols of signals may also be identified. In a further embodiment, the modulation of signals, data types carried by the signals, and estimated signal origins may be identified.

Embodiments are directed to a spectrum management device that may be configurable to obtain spectrum data over a wide range of wireless communication protocols. Embodiments may also provide for the ability to acquire data from and sending data to database depositories that may be used by a plurality of spectrum management customers.

In one embodiment, a spectrum management device may include a signal spectrum analyzer that may be coupled with a database system and spectrum management interface. The device may be portable or may be a stationary installation and may be updated with data to allow the device to manage different spectrum information based on frequency, bandwidth, signal power, time, and location of signal propagation, as well as modulation type and format and to provide signal identification, classification, and geo-location. A processor may enable the device to process spectrum power density data as received and to process raw I/Q complex data that may be used for further signal processing, signal identification, and data extraction.

In an embodiment, a spectrum management device may comprise a low noise amplifier that receives a radio frequency (RF) energy from an antenna. The antenna may be any antenna structure that is capable of receiving RF energy in a spectrum of interest. The low noise amplifier may filter and amplify the RF energy. The RF energy may be provided to an RF translator. The RF translator may perform a fast Fourier transform (FFT) and either a square magnitude or a fast convolution spectral periodogram function to convert the RF measurements into a spectral representation. In an embodiment, the RF translator may also store a timestamp to facilitate calculation of a time of arrival and an angle of arrival. The In-Phase and Quadrature (I/Q) data may be provided to a spectral analysis receiver or it may be provided to a sample data store where it may be stored without being processed by a spectral analysis receiver. The input RF energy may also be directly digital down-converted and sampled by an analog to digital converter (ADC) to generate complex I/Q data. The complex I/Q data may be equalized to remove multipath, fading, white noise and interference from other signaling systems by fast parallel adaptive filter processes. This data may then be used to calculate modulation type and baud rate. Complex sampled I/Q data may also be used to measure the signal angle of arrival and time of arrival. Such information as angle of arrival and time of arrival may be used to compute more complex and precise direction finding. In addition, they may be used to apply geo-location techniques. Data may be collected from known signals or unknown signals and time spaced in order to provide expedient information. I/Q sampled data may contain raw signal data that may be used to demodulate and translate signals by streaming them to a signal analyzer or to a real-time demodulator software defined radio that may have the newly identified signal parameters for the signal of interest. The inherent nature of the input RF allows for any type of signal to be analyzed and demodulated based on the reconfiguration of the software defined radio interfaces.

A spectral analysis receiver may be configured to read raw In-Phase (I) and Quadrature (Q) data and either translate directly to spectral data or down convert to an intermediate frequency (IF) up to half the Nyquist sampling rate to analyze the incoming bandwidth of a signal. The translated spectral data may include measured values of signal energy, frequency, and time. The measured values provide attributes of the signal under review that may confirm the detection of a particular signal of interest within a spectrum of interest. In an embodiment, a spectral analysis receiver may have a referenced spectrum input of 0 Hz to 12.4 GHz with capability of fiber optic input for spectrum input up to 60 GHz.

In an embodiment, the spectral analysis receiver may be configured to sample the input RF data by fast analog down-conversion of the RF signal. The down-converted signal may then be digitally converted and processed by fast convolution filters to obtain a power spectrum. This process may also provide spectrum measurements including the signal power, the bandwidth, the center frequency of the signal as well as a Time of Arrival (TOA) measurement. The TOA measurement may be used to create a timestamp of the detected signal and/or to generate a time difference of arrival iterative process for direction finding and fast triangulation of signals. In an embodiment, the sample data may be provided to a spectrum analysis module. In an embodiment, the spectrum analysis module may evaluate the sample data to obtain the spectral components of the signal.

In an embodiment, the spectral components of the signal may be obtained by the spectrum analysis module from the raw I/Q data as provided by an RF translator. The I/Q data analysis performed by the spectrum analysis module may operate to extract more detailed information about the signal, including by way of example, modulation type (e.g., FM, AM, QPSK, 16QAM, etc.) and/or protocol (e.g., GSM, CDMA, OFDM, LTE, etc.). In an embodiment, the spectrum analysis module may be configured by a user to obtain specific information about a signal of interest. In an alternate embodiment, the spectral components of the signal may be obtained from power spectral component data produced by the spectral analysis receiver.

In an embodiment, the spectrum analysis module may provide the spectral components of the signal to a data extraction module. The data extraction module may provide the classification and categorization of signals detected in the RF spectrum. The data extraction module may also acquire additional information regarding the signal from the spectral components of the signal. For example, the data extraction module may provide modulation type, bandwidth, and possible system in use information. In another embodiment, the data extraction module may select and organize the extracted spectral components in a format selected by a user.

The information from the data extraction module may be provided to a spectrum management module. The spectrum management module may generate a query to a static database to classify a signal based on its components. For example, the information stored in static database may be used to determine the spectral density, center frequency, bandwidth, baud rate, modulation type, protocol (e.g., GSM, CDMA, OFDM, LTE, etc.), system or carrier using licensed spectrum, location of the signal source, and a timestamp of the signal of interest. These data points may be provided to a data store for export. In an embodiment and as more fully described below, the data store may be configured to access mapping software to provide the user with information on the location of the transmission source of the signal of interest. In an embodiment, the static database includes frequency information gathered from various sources including, but not limited to, the Federal Communication Commission (FCC), the International Telecommunication Union, and data from users. As an example, the static database may be an SQL database. The data store may be updated, downloaded or merged with other devices or with its main relational database. Software API applications may be included to allow database merging with third-party spectrum databases that may only be accessed securely.

In the various embodiments, the spectrum management device may be configured in different ways. In an embodiment, the front end of system may comprise various hardware receivers that may provide In-Phase and Quadrature complex data. The front end receiver may include API set commands via which the system software may be configured to interface (i.e., communicate) with a third party receiver. In an embodiment, the front end receiver may perform the spectral computations using FFT (Fast Fourier Transform) and other DSP (Digital Signal Processing) to generate a fast convolution periodogram that may be re-sampled and averaged to quickly compute the spectral density of the RF environment.

In an embodiment, cyclic processes may be used to average and correlate signal information by extracting the changes inside the signal to better identify the signal of interest that is present in the RF space. A combination of amplitude and frequency changes may be measured and averaged over the bandwidth time to compute the modulation type and other internal changes, such as changes in frequency offsets, orthogonal frequency division modulation, changes in time (e.g., Time Division Multiplexing), and/or changes in I/Q phase rotation used to compute the baud rate and the modulation type. In an embodiment, the spectrum management device may have the ability to compute several processes in parallel by use of a multi-core processor and along with several embedded field programmable gate arrays (FPGA). Such multi-core processing may allow the system to quickly analyze several signal parameters in the RF environment at one time in order to reduce the amount of time it takes to process the signals. The amount of signals computed at once may be determined by their bandwidth requirements. Thus, the capability of the system may be based on a maximum frequency Fs/2. The number of signals to be processed may be allocated based on their respective bandwidths. In another embodiment, the signal spectrum may be measured to determine its power density, center frequency, bandwidth and location from which the signal is emanating and a best match may be determined based on the signal parameters based on information criteria of the frequency.

In another embodiment, a GPS and direction finding location (DF) system may be incorporated into the spectrum management device and/or available to the spectrum management device. Adding GPS and DF ability may enable the user to provide a location vector using the National Marine Electronics Association's (NMEA) standard form. In an embodiment, location functionality is incorporated into a specific type of GPS unit, such as a U.S. government issued receiver. The information may be derived from the location presented by the database internal to the device, a database imported into the device, or by the user inputting geo-location parameters of longitude and latitude which may be derived as degrees, minutes and seconds, decimal minutes, or decimal form and translated to the necessary format with the default being 'decimal' form. This functionality may be incorporated into a GPS unit. The signal information and the signal classification may then be used to locate the signaling device as well as to provide a direction finding capability.

A type of triangulation using three units as a group antenna configuration performs direction finding by using multilateration. Commonly used in civil and military surveillance applications, multilateration is able to accurately locate an aircraft, vehicle, or stationary emitter by measuring the "Time Difference of Arrival" (TDOA) of a signal from the emitter at three or more receiver sites. If a pulse is emitted from a platform, it will arrive at slightly different times at two spatially separated receiver sites, the TDOA being due to the different distances of each receiver from the platform. This location information may then be supplied to a mapping process that utilizes a database of mapping images that are extracted from the database based on the latitude and longitude provided by the geo-location or direction finding device. The mapping images may be scanned in to show the points of interest where a signal is either expected to be emanating from based on the database information or from an average taken from the database information and the geo-location calculation performed prior to the mapping software being called. The user can control the map to maximize or minimize the mapping screen to get a better view which is more fit to provide information of the signal transmissions. In an embodiment, the mapping process does not rely on outside mapping software. The mapping capability has the ability to generate the map image and to populate a mapping database that may include information from third party maps to meet specific user requirements.

In an embodiment, triangulation and multilateration may utilize a Bayesian type filter that may predict possible movement and future location and operation of devices based on input collected from the TDOA and geolocation processes and the variables from the static database pertaining to the specified signal of interest. The Bayesian filter takes the input changes in time difference and its inverse function (i.e., frequency difference) and takes an average change in signal variation to detect and predict the movement of the signals. The signal changes are measured within 1 ns time difference and the filter may also adapt its gradient error calculation to remove unwanted signals that may cause errors due to signal multipath, inter-symbol interference, and other signal noise.

In an embodiment the changes within a 1 ns time difference for each sample for each unique signal may be recorded. The spectrum management device may then perform the inverse and compute and record the frequency difference and phase difference between each sample for each unique signal. The spectrum management device may take the same signal and calculates an error based on other input signals coming in within the 1 ns time and may average and filter out the computed error to equalize the signal. The spectrum management device may determine the time difference and frequency difference of arrival for that signal and compute the odds of where the signal is emanating from based on the frequency band parameters presented from the spectral analysis and processor computations, and determines the best position from which the signal is transmitted (i.e., origin of the signal).

FIG. 1 illustrates a wireless environment 100 suitable for use with the various embodiments. The wireless environment 100 may include various sources 104, 106, 108, 110, 112, and 114 generating various radio frequency (RF) signals 116, 118, 120, 122, 124, 126. As an example, mobile devices 104 may generate cellular RF signals 116, such as CDMA, GSM, 3G signals, etc. As another example, wireless access devices 106, such as Wi-Fi® routers, may generate RF signals 118, such as Wi-Fi® signals. As a further example, satellites 108, such as communication satellites or GPS satellites, may generate RF signals 120, such as satellite radio, television, or GPS signals. As a still further example, base stations 110, such as a cellular base station, may generate RF signals 122, such as CDMA, GSM, 3G signals, etc. As another example, radio towers 112, such as local AM or FM radio stations, may generate RF signals 124, such as AM or FM radio signals. As another example, government service provides 114, such as police units, fire fighters, military units, air traffic control towers, etc. may generate RF signals 126, such as radio communications, tracking signals, etc. The various RF signals 116, 118, 120, 122, 124, 126 may be generated at different frequencies, power levels, in different protocols, with different modulations, and at different times. The various sources 104, 106, 108, 110, 112, and 114 may be assigned frequency bands, power limitations, or other restrictions, requirements, and/or licenses by a government spectrum control entity, such as the FCC. However, with so many different sources 104, 106, 108, 110, 112, and 114 generating so many different RF signals 116, 118, 120, 122, 124, 126, overlaps, interference, and/or other problems may occur. A spectrum management device 102 in the wireless environment 100 may measure the RF energy in the wireless environment 100 across a wide spectrum and identify the different RF signals 116, 118, 120, 122, 124, 126 which may be present in the wireless environment 100. The identification and cataloging of the different RF signals 116, 118, 120, 122, 124, 126 which may be present in the wireless environment 100 may enable the spectrum management device 102 to determine available frequencies for use in the wireless environment 100. In addition, the spectrum management device 102 may be able to determine if there are available frequencies for use in the wireless environment 100 under certain conditions (i.e., day of week, time of day, power level, frequency band, etc.). In this manner, the RF spectrum in the wireless environment 100 may be managed.

Figure 2A:
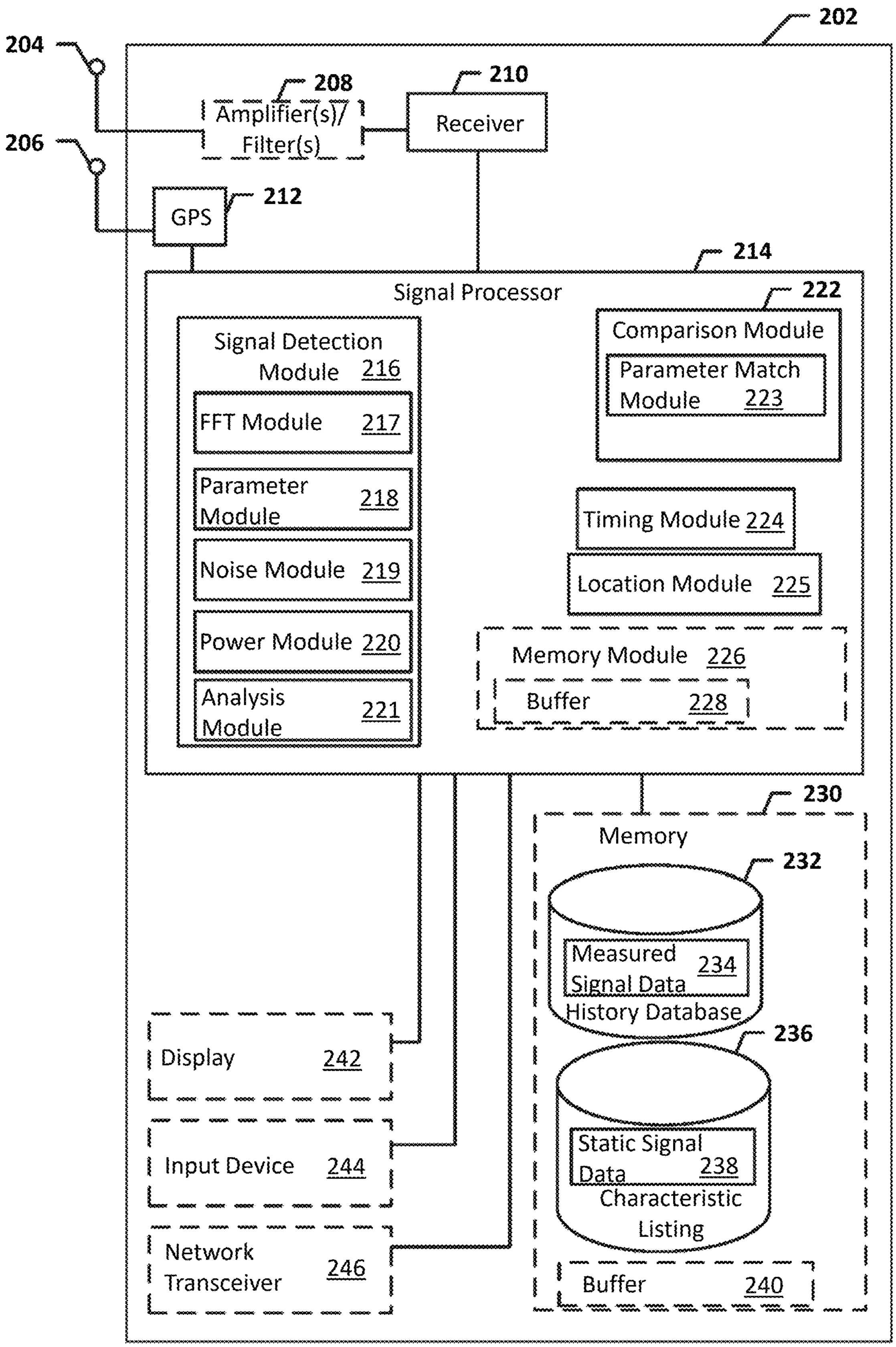
FIG. 2A is a block diagram of a spectrum management device according to an embodiment.

FIG. 2A is a block diagram of a spectrum management device 202 according to an embodiment. The spectrum management device 202 may include an antenna structure 204 configured to receive RF energy expressed in a wireless environment. The antenna structure 204 may be any type of antenna, and may be configured to optimize the receipt of RF energy across a wide frequency spectrum. The antenna structure 204 may be connected to one or more optional amplifiers and/or filters 208 which may boost, smooth, and/or filter the RF energy received by antenna structure 204 before the RF energy is passed to an RF receiver 210 connected to the antenna structure 204. In an embodiment, the RF receiver 210 may be configured to measure the RF energy received from the antenna structure 204 and/or optional amplifiers and/or filters 208. In an embodiment, the RF receiver 210 may be configured to measure RF energy in the time domain and may convert the RF energy measurements to the frequency domain. In an embodiment, the RF receiver 210 may be configured to generate spectral representation data of the received RF energy. The RF receiver 210 may be any type RF receiver, and may be configured to generate RF energy measurements over a range of frequencies, such as 0 kHz to 24 GHz, 9 kHz to 6 GHz, etc. In an embodiment, the frequency scanned by the RF receiver 210 may be user selectable. In an embodiment, the RF receiver 210 may be connected to a signal processor 214 and may be configured to output RF energy measurements to the signal processor 214. As an example, the RF receiver 210 may output raw In-Phase (I) and Quadrature (Q) data to the signal processor 214. As another example, the RF receiver 210 may apply signals processing techniques to output complex In-Phase (I) and Quadrature (Q) data to the signal processor 214. In an embodiment, the spectrum management device may also include an antenna 206 connected to a location receiver 212, such as a GPS receiver, which may be connected to the signal processor 214. The location receiver 212 may provide location inputs to the signal processor 214.

The signal processor 214 may include a signal detection module 216, a comparison module 222, a timing module 224, and a location module 225. Additionally, the signal processor 214 may include an optional memory module 226 which may include one or more optional buffers 228 for storing data generated by the other modules of the signal processor 214.

In an embodiment, the signal detection module 216 may operate to identify signals based on the RF energy measurements received from the RF receiver 210. The signal detection module 216 may include a Fast Fourier Transform (FFT) module 217 which may convert the received RF energy measurements into spectral representation data. The signal detection module 216 may include an analysis module 221 which may analyze the spectral representation data to identify one or more signals above a power threshold. A power module 220 of the signal detection module 216 may control the power threshold at which signals may be identified. In an embodiment, the power threshold may be a default power setting or may be a user selectable power setting. A noise module 219 of the signal detection module 216 may control a signal threshold, such as a noise threshold, at or above which signals may be identified. The signal detection module 216 may include a parameter module 218 which may determine one or more signal parameters for any identified signals, such as center frequency, bandwidth, power, number of detected signals, frequency peak, peak power, average power, signal duration, etc. In an embodiment, the signal processor 214 may include a timing module 224 which may record time information and provide the time information to the signal detection module 216. Additionally, the signal processor 214 may include a location module 225 which may receive location inputs from the location receiver 212 and determine a location of the spectrum management device 202. The location of the spectrum management device 202 may be provided to the signal detection module 216.

In an embodiment, the signal processor 214 may be connected to one or more memory 230. The memory 230 may include multiple databases, such as a history or historical database 232 and characteristics listing 236, and one or more buffers 240 storing data generated by signal processor 214. While illustrated as connected to the signal processor 214 the memory 230 may also be on chip memory residing on the signal processor 214 itself. In an embodiment, the history or historical database 232 may include measured signal data 234 for signals that have been previously identified by the spectrum management device 202. The measured signal data 234 may include the raw RF energy measurements, time stamps, location information, one or more signal parameters for any identified signals, such as center frequency, bandwidth, power, number of detected signals, frequency peak, peak power, average power, signal duration, etc., and identifying information determined from the characteristics listing 236. In an embodiment, the history or historical database 232 may be updated as signals are identified by the spectrum management device 202. In an embodiment, the characteristic listing 236 may be a database of static signal data 238. The static signal data 238 may include data gathered from various sources including by way of example and not by way of limitation the Federal Communication Commission, the International Telecommunication Union, telecom providers, manufacture data, and data from spectrum management device users. Static signal data 238 may include known signal parameters of transmitting devices, such as center frequency, bandwidth, power, number of detected signals, frequency peak, peak power, average power, signal duration, geographic information for transmitting devices, and any other data that may be useful in identifying a signal. In an embodiment, the static signal data 238 and the characteristic listing 236 may correlate signal parameters and signal identifications. As an example, the static signal data 238 and characteristic listing 236 may list the parameters of the local fire and emergency communication channel correlated with a signal identification indicating that signal is the local fire and emergency communication channel.

In an embodiment, the signal processor 214 may include a comparison module 222 which may match data generated by the signal detection module 216 with data in the history or historical database 232 and/or characteristic listing 236. In an embodiment the comparison module 222 may receive signal parameters from the signal detection module 216, such as center frequency, bandwidth, power, number of detected signals, frequency peak, peak power, average power, signal duration, and/or receive parameter from the timing module 224 and/or location module 225. The parameter match module 223 may retrieve data from the history or historical database 232 and/or the characteristic listing 236 and compare the retrieved data to any received parameters to identify matches. Based on the matches the comparison module may identify the signal. In an embodiment, the signal processor 214 may be optionally connected to a display 242, an input device 244, and/or network transceiver 246. The display 242 may be controlled by the signal processor 214 to output spectral representations of received signals, signal characteristic information, and/or indications of signal identifications on the display 242. In an embodiment, the input device 244 may be any input device, such as a keyboard and/or knob, mouse, virtual keyboard or even voice recognition, enabling the user of the spectrum management device 202 to input information for use by the signal processor 214. In an embodiment, the network transceiver 246 may enable the spectrum management device 202 to exchange data with wired and/or wireless networks, such as to update the characteristic listing 236 and/or upload information from the history or historical database 232.

Figure 2B:
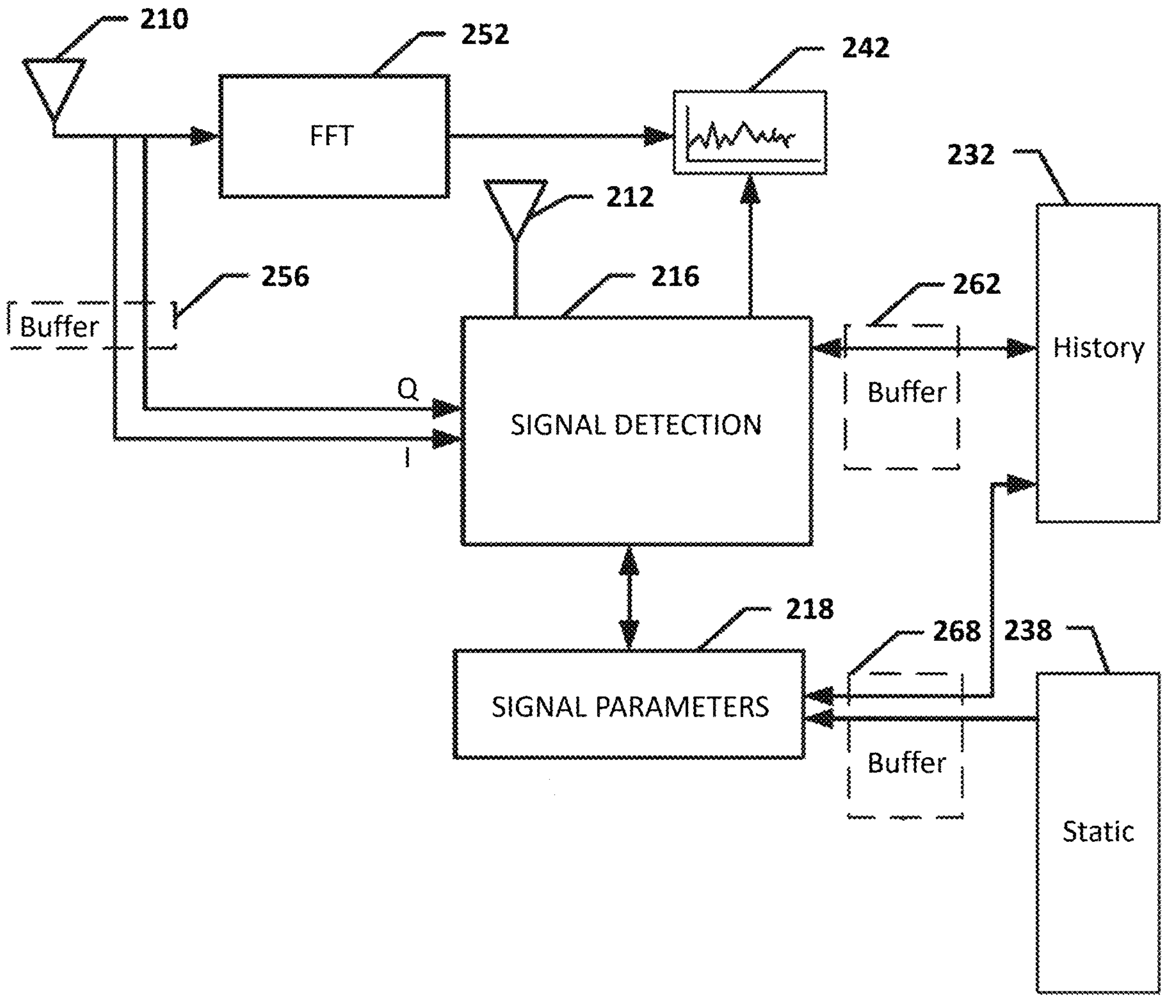
FIG. 2B is a schematic logic flow block diagram illustrating logical operations which may be performed by a spectrum management device according to an embodiment.

FIG. 2B is a schematic logic flow block diagram illustrating logical operations which may be performed by a spectrum management device 202 according to an embodiment. A receiver 210 may output RF energy measurements, such as I and Q data to a FFT module 252 which may generate a spectral representation of the RF energy measurements which may be output on a display 242. The I and Q data may also be buffered in a buffer 256 and sent to a signal detection module 216. The signal detection module 216 may receive location inputs from a location receiver 212 and use the received I and Q data to detect signals. Data from the signal detection module 216 may be buffered through a buffer 262 and written into a history or historical database 232. Additionally, data from the historical database may be used to aid in the detection of signals by the signal detection module 216. The signal parameters of the detected signals may be determined by a signal parameters module 218 using information from the history or historical database 232 and/or a static database 238 listing signal characteristics through a buffer 268. Data from the signal parameters module 218 may be stored in the history or historical database 232 and/or sent to the signal detection module 216 and/or display 242. In this manner, signals may be detected and indications of the signal identification may be displayed to a user of the spectrum management device.

Figure 3:
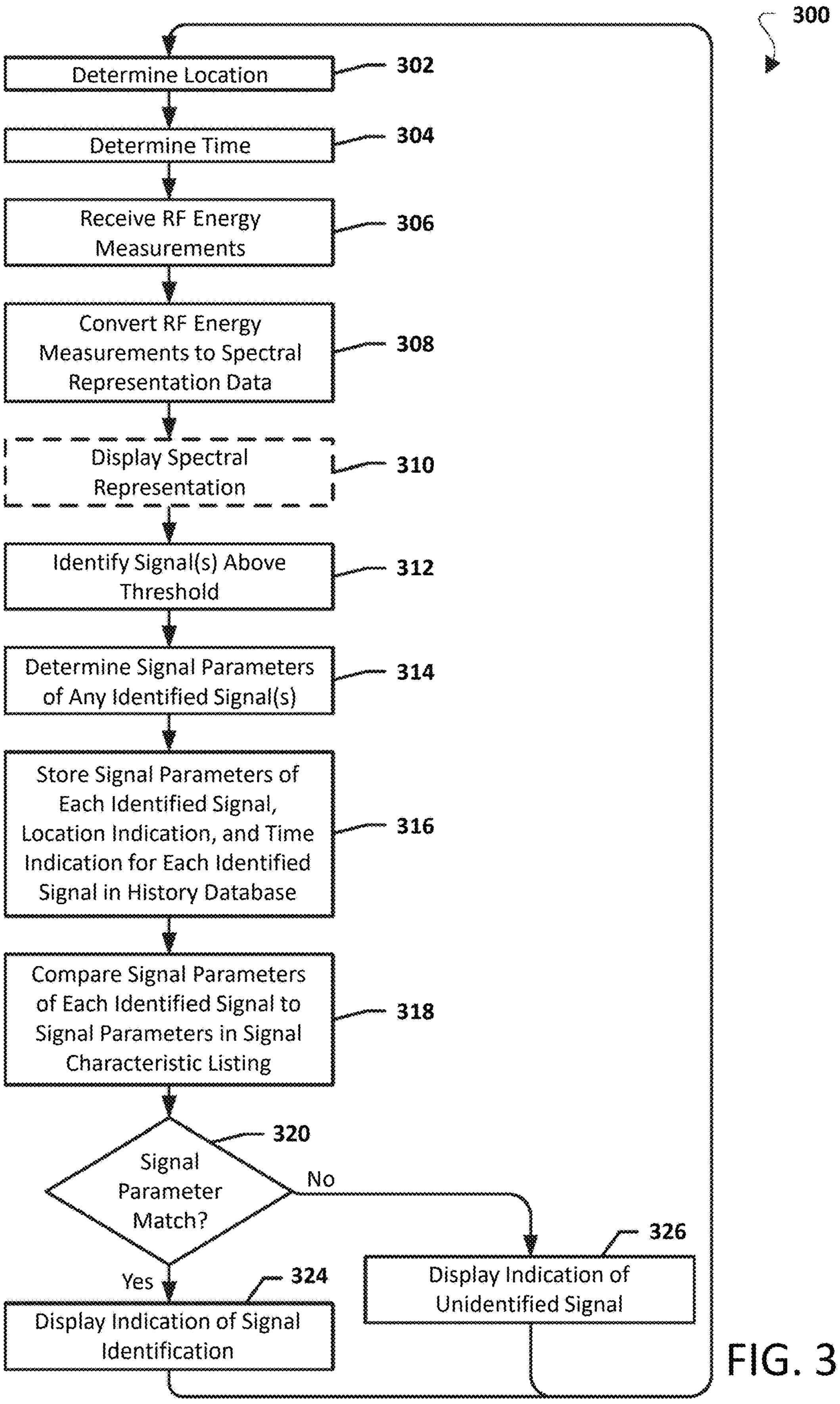
FIG. 3 is a process flow diagram illustrating an embodiment method for identifying a signal.

FIG. 3 illustrates a process flow of an embodiment method 300 for identifying a signal. In an embodiment the operations of method 300 may be performed by the processor 214 of a spectrum management device 202. In block 302 the processor 214 may determine the location of the spectrum management device 202. In an embodiment, the processor 214 may determine the location of the spectrum management device 202 based on a location input, such as GPS coordinates, received from a location receiver, such as a GPS receiver 212. In block 304 the processor 214 may determine the time. As an example, the time may be the current clock time as determined by the processor 214 and may be a time associated with receiving RF measurements. In block 306 the processor 214 may receive RF energy measurements. In an embodiment, the processor 214 may receive RF energy measurements from an RF receiver 210. In block 308 the processor 214 may convert the RF energy measurements to spectral representation data. As an example, the processor may apply a Fast Fourier Transform (FFT) to the RF energy measurements to convert them to spectral representation data. In optional block 310 the processor 214 may display the spectral representation data on a display 242 of the spectrum management device 202, such as in a graph illustrating amplitudes across a frequency spectrum.

In block 312 the processor 214 may identify one or more signal above a threshold. In an embodiment, the processor 214 may analyze the spectral representation data to identify a signal above a power threshold. A power threshold may be an amplitude measure selected to distinguish RF energies associated with actual signals from noise. In an embodiment, the power threshold may be a default value. In another embodiment, the power threshold may be a user selectable value. In block 314 the processor 214 may determine signal parameters of any identified signal or signals of interest. As examples, the processor 214 may determine signal parameters such as center frequency, bandwidth, power, number of detected signals, frequency peak, peak power, average power, signal duration for the identified signals. In block 316 the processor 214 may store the signal parameters of each identified signal, a location indication, and time indication for each identified signal in a history database 232. In an embodiment, a history database 232 may be a database resident in a memory 230 of the spectrum management device 202 which may include data associated with signals actually identified by the spectrum management device.

In block 318 the processor 214 may compare the signal parameters of each identified signal to signal parameters in a signal characteristic listing. In an embodiment, the signal characteristic listing may be a static database 238 stored in the memory 230 of the spectrum management device 202 which may correlate signal parameters and signal identifications. In determination block 320 the processor 214 may determine whether the signal parameters of the identified signal or signals match signal parameters in the characteristic listing 236. In an embodiment, a match may be determined based on the signal parameters being within a specified tolerance of one another. As an example, a center frequency match may be determined when the center frequencies are within plus or minus 1 kHz of each other. In this manner, differences between real world measured conditions of an identified signal and ideal conditions listed in a characteristics listing may be accounted for in identifying matches. If the signal parameters do not match (i.e., determination block 320="No"), in block 326 the processor 214 may display an indication that the signal is unidentified on a display 242 of the spectrum management device 202. In this manner, the user of the spectrum management device may be notified that a signal is detected, but has not been positively identified. If the signal parameters do match (i.e., determination block 320="Yes"), in block 324 the processor 214 may display an indication of the signal identification on the display 242. In an embodiment, the signal identification displayed may be the signal identification correlated to the signal parameter in the signal characteristic listing which matched the signal parameter for the identified signal. Upon displaying the indications in blocks 324 or 326 the processor 214 may return to block 302 and cyclically measure and identify further signals of interest.

Figure 4:
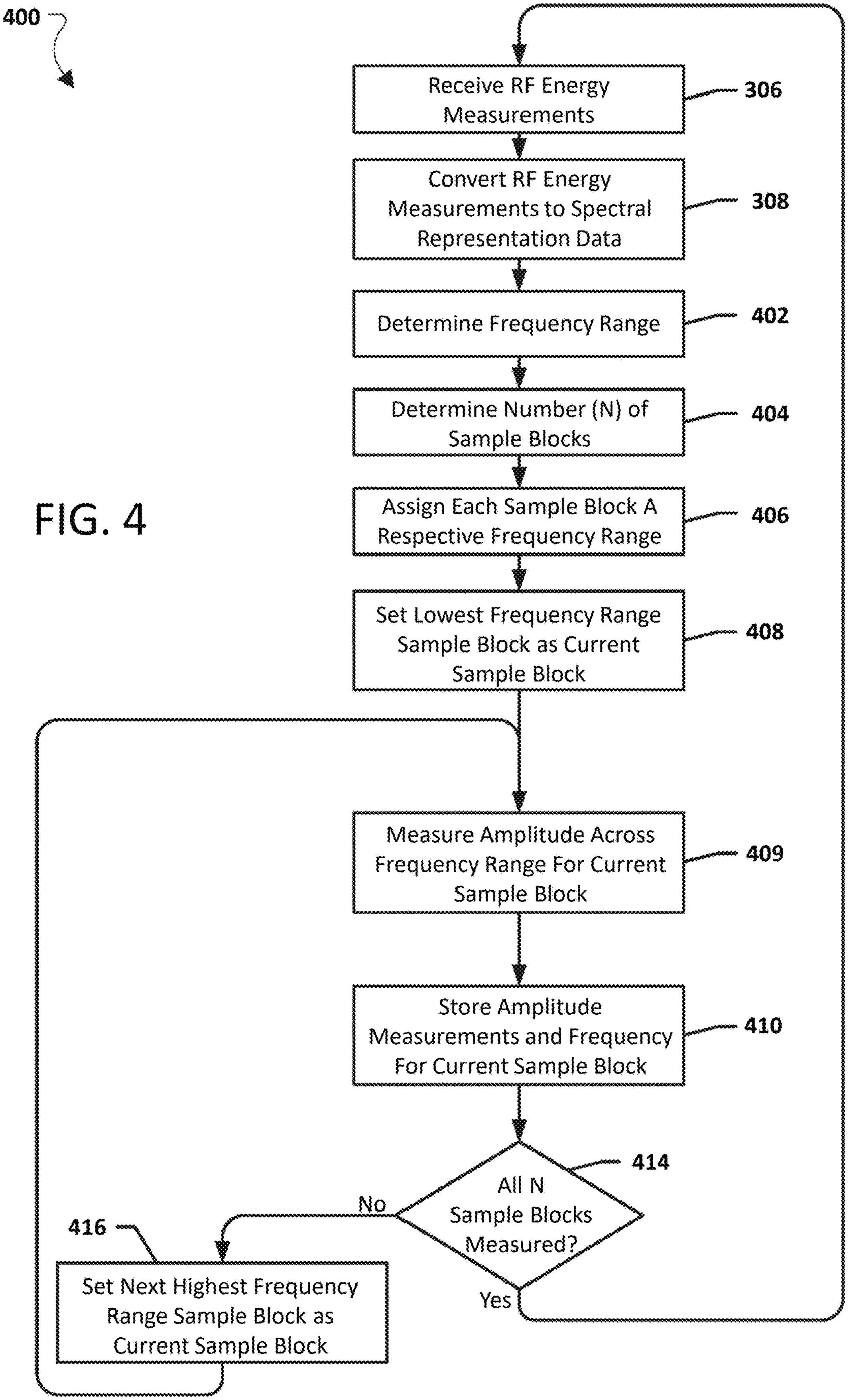
FIG. 4 is a process flow diagram illustrating an embodiment method for measuring sample blocks of a radio frequency scan.

FIG. 4 illustrates an embodiment method 400 for measuring sample blocks of a radio frequency scan. In an embodiment the operations of method 400 may be performed by the processor 214 of a spectrum management device 202. As discussed above, in blocks 306 and 308 the processor 214 may receive RF energy measurements and convert the RF energy measurements to spectral representation data. In block 402 the processor 214 may determine a frequency range at which to sample the RF spectrum for signals of interest. In an embodiment, a frequency range may be a frequency range of each sample block to be analyzed for potential signals. As an example, the frequency range may be 240 kHz. In an embodiment, the frequency range may be a default value. In another embodiment, the frequency range may be a user selectable value. In block 404 the processor 214 may determine a number (N) of sample blocks to measure. In an embodiment, each sample block may be sized to the determined of default frequency range, and the number of sample blocks may be determined by dividing the spectrum of the measured RF energy by the frequency range. In block 406 the processor 214 may assign each sample block a respective frequency range. As an example, if the determined frequency range is 240 kHz, the first sample block may be assigned a frequency range from 0 kHz to 240 kHz, the second sample block may be assigned a frequency range from 240 kHz to 480 kHz, etc. In block 408 the processor 214 may set the lowest frequency range sample block as the current sample block. In block 409 the processor 214 may measure the amplitude across the set frequency range for the current sample block. As an example, at each frequency interval (such as 1 Hz) within the frequency range of the sample block the processor 214 may measure the received signal amplitude. In block 410 the processor 214 may store the amplitude measurements and corresponding frequencies for the current sample block. In determination block 414 the processor 214 may determine if all sample blocks have been measured. If all sample blocks have not been measured (i.e., determination block 414="No"), in block 416 the processor 214 may set the next highest frequency range sample block as the current sample block. As discussed above, in blocks 409, 410, and 414 the processor 214 may measure and store amplitudes and determine whether all blocks are sampled. If all blocks have been sampled (i.e., determination block 414="Yes"), the processor 214 may return to block 306 and cyclically measure further sample blocks.

Figure 5A:
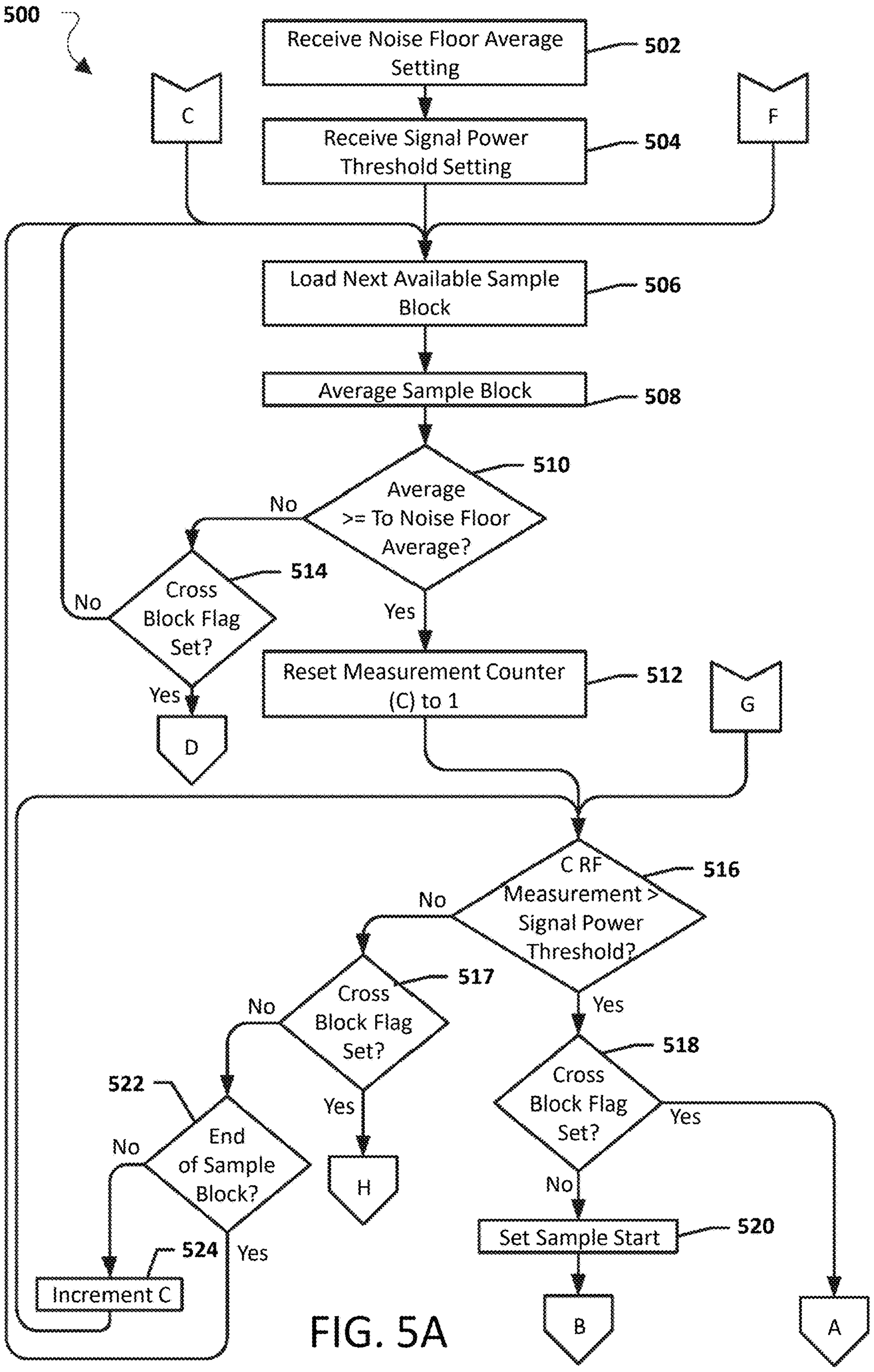
FIG. 5A is a process flow diagram illustrating an embodiment method for determining signal parameters.
Figure 5B:
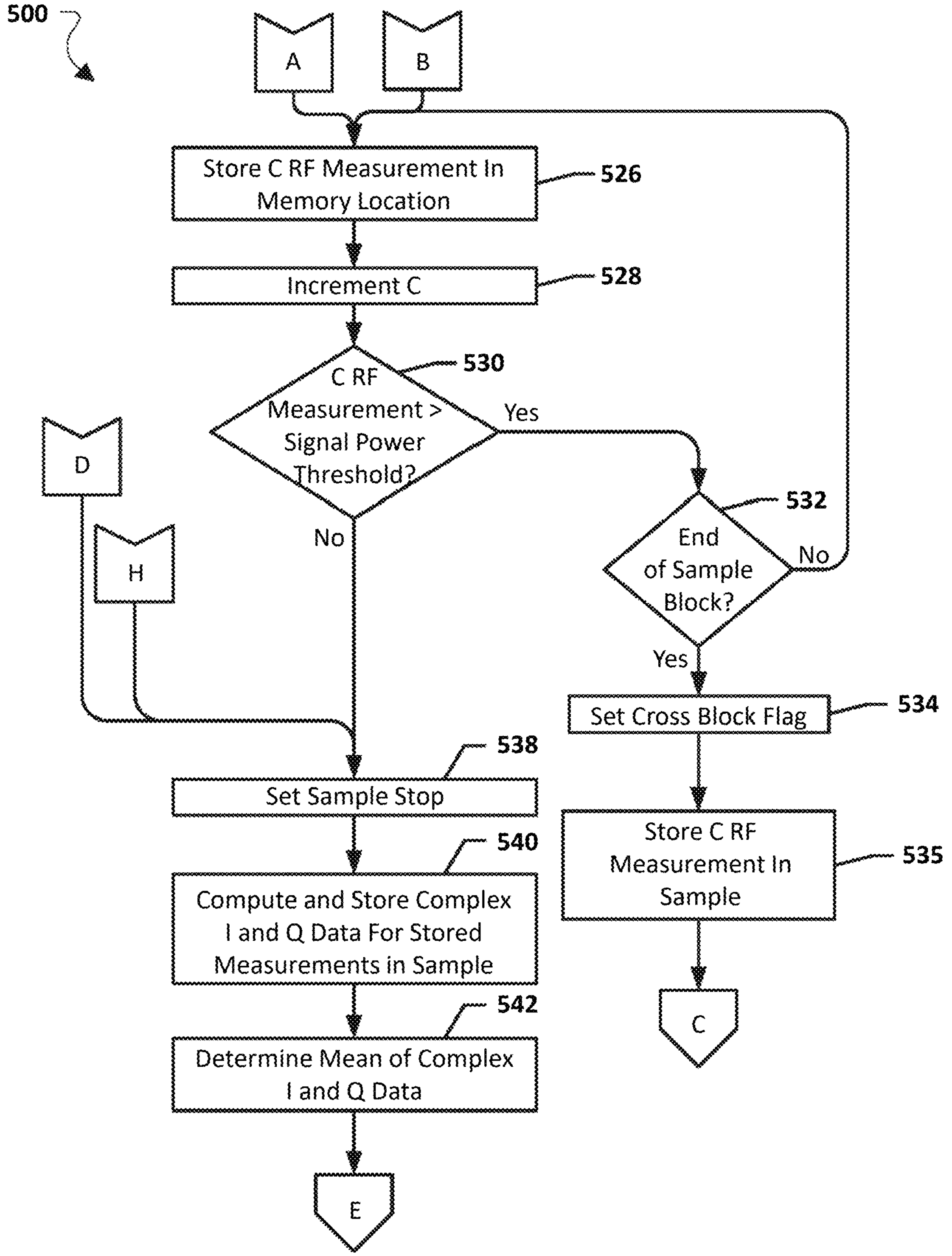
FIG. 5B is a process flow diagram illustrating an embodiment method for determining signal parameters continued from FIG. 5A.
Figure 5C:
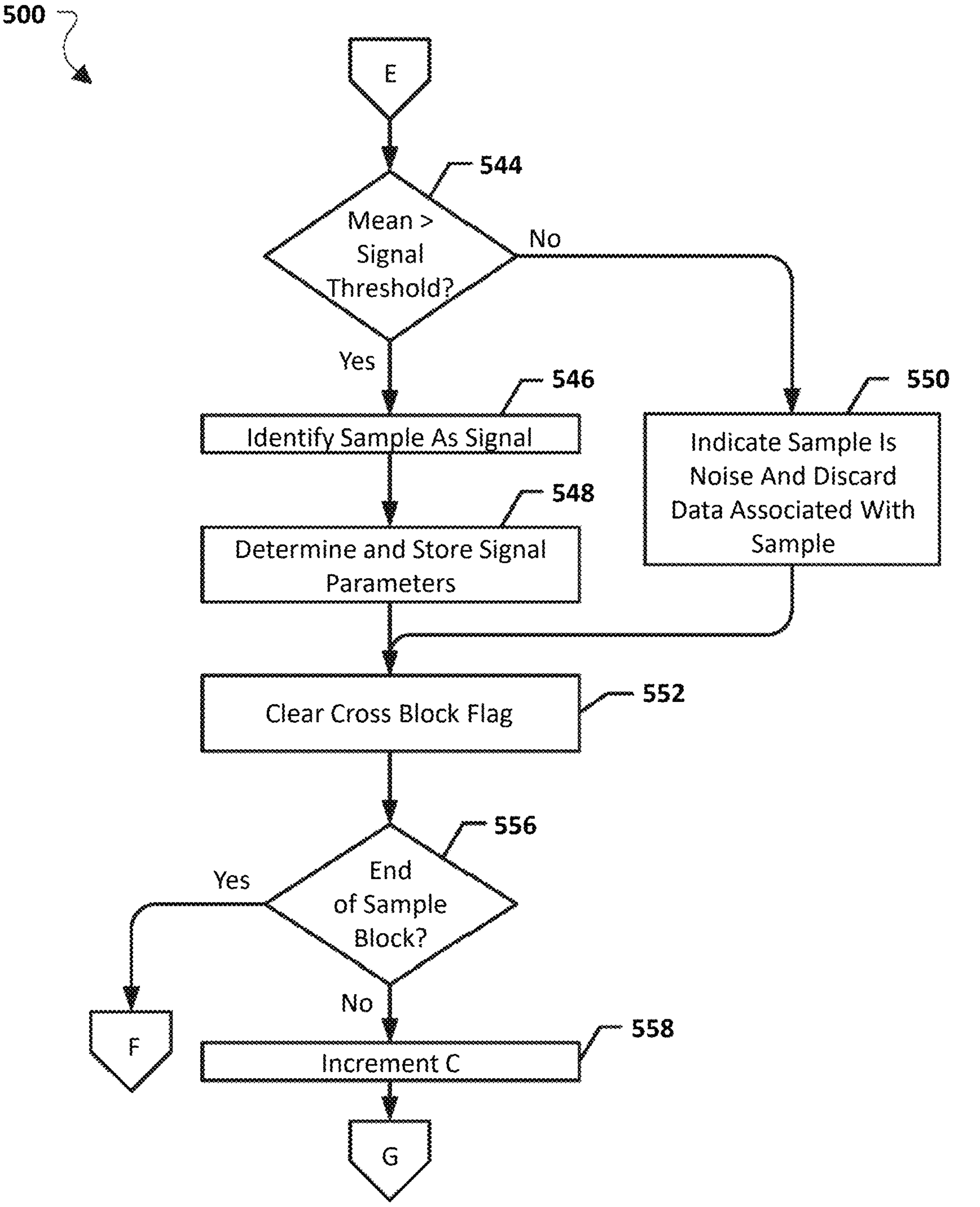
FIG. 5C is a process flow diagram illustrating an embodiment method for determining signal parameters continued from FIGS. 5A-5B.

FIGS. 5A, 5B, and 5C illustrate the process flow for an embodiment method 500 for determining signal parameters. In an embodiment the operations of method 500 may be performed by the processor 214 of a spectrum management device 202. Referring to FIG. 5A, in block 502 the processor 214 may receive a noise floor average setting. In an embodiment, the noise floor average setting may be an average noise level for the environment in which the spectrum management device 202 is operating. In an embodiment, the noise floor average setting may be a default setting and/or may be user selectable setting. In block 504 the processor 214 may receive the signal power threshold setting. In an embodiment, the signal power threshold setting may be an amplitude measure selected to distinguish RF energies associated with actual signals from noise. In an embodiment the signal power threshold may be a default value and/or may be a user selectable setting. In block 506 the processor 214 may load the next available sample block. In an embodiment, the sample blocks may be assembled according to the operations of method 400 described above with reference to FIG. 4. In an embodiment, the next available sample block may be an oldest in time sample block which has not been analyzed to determine whether signals of interest are present in the sample block. In block 508 the processor 214 may average the amplitude measurements in the sample block. In determination block 510 the processor 214 may determine whether the average for the sample block is greater than or equal to the noise floor average set in block 502. In this manner, sample blocks including potential signals may be quickly distinguished from sample blocks which may not include potential signals reducing processing time by enabling sample blocks without potential signals to be identified and ignored. If the average for the sample block is lower than the noise floor average (i.e., determination block 510="No"), no signals of interest may be present in the current sample block. In determination block 514 the processor 214 may determine whether a cross block flag is set. If the cross block flag is not set (i.e., determination block 514="No"), in block 506 the processor 214 may load the next available sample block and in block 508 average the sample block 508.

If the average of the sample block is equal to or greater than the noise floor average (i.e., determination block 510="Yes"), the sample block may potentially include a signal of interest and in block 512 the processor 214 may reset a measurement counter (C) to 1. The measurement counter value indicating which sample within a sample block is under analysis. In determination block 516 the processor 214 may determine whether the RF measurement of the next frequency sample (C) is greater than the signal power threshold. In this manner, the value of the measurement counter (C) may be used to control which sample RF measurement in the sample block is compared to the signal power threshold. As an example, when the counter (C) equals 1, the first RF measurement may be checked against the signal power threshold and when the counter (C) equals 2 the second RF measurement in the sample block may be checked, etc. If the C RF measurement is less than or equal to the signal power threshold (i.e., determination block 516="No"), in determination block 517 the processor 214 may determine whether the cross block flag is set. If the cross block flag is not set (i.e., determination block 517="No"), in determination block 522 the processor 214 may determine whether the end of the sample block is reached. If the end of the sample block is reached (i.e., determination block 522="Yes"), in block 506 the processor 214 may load the next available sample block and proceed in blocks 508, 510, 514, and 512 as discussed above. If the end of the sample block is not reached (i.e., determination block 522="No"), in block 524 the processor 214 may increment the measurement counter (C) so that the next sample in the sample block is analyzed.

If the C RF measurement is greater than the signal power threshold (i.e., determination block 516="Yes"), in block 518 the processor 214 may check the status of the cross block flag to determine whether the cross block flag is set. If the cross block flag is not set (i.e., determination block 518="No"), in block 520 the processor 214 may set a sample start. As an example, the processor 214 may set a sample start by indicating a potential signal of interest may be discovered in a memory by assigning a memory location for RF measurements associated with the sample start. Referring to FIG. 5B, in block 526 the processor 214 may store the C RF measurement in a memory location for the sample currently under analysis. In block 528 the processor 214 may increment the measurement counter (C) value.

In determination block 530 the processor 214 may determine whether the C RF measurement (e.g., the next RF measurement because the value of the RF measurement counter was incremented) is greater than the signal power threshold. If the C RF measurement is greater than the signal power threshold (i.e., determination block 530="Yes"), in determination block 532 the processor 214 may determine whether the end of the sample block is reached. If the end of the sample block is not reached (i.e., determination block 532="No"), there may be further RF measurements available in the sample block and in block 526 the processor 214 may store the C RF measurement in the memory location for the sample. In block 528 the processor may increment the measurement counter (C) and in determination block 530 determine whether the C RF measurement is above the signal power threshold and in block 532 determine whether the end of the sample block is reached. In this manner, successive sample RF measurements may be checked against the signal power threshold and stored until the end of the sample block is reached and/or until a sample RF measurement falls below the signal power threshold. If the end of the sample block is reached (i.e., determination block 532="Yes"), in block 534 the processor 214 may set the cross block flag. In an embodiment, the cross block flag may be a flag in a memory available to the processor 214 indicating the signal potential spans across two or more sample blocks. In a further embodiment, prior to setting the cross block flag in block 534, the slope of a line drawn between the last two RF measurement samples may be used to determine whether the next sample block likely contains further potential signal samples. A negative slope may indicate that the signal of interest is fading and may indicate the last sample was the final sample of the signal of interest. In another embodiment, the slope may not be computed and the next sample block may be analyzed regardless of the slope.

If the end of the sample block is reached (i.e., determination block 532="Yes") and in block 534 the cross block flag is set, referring to FIG. 5A, in block 506 the processor 214 may load the next available sample block, in block 508 may average the sample block, and in block 510 determine whether the average of the sample block is greater than or equal to the noise floor average. If the average is equal to or greater than the noise floor average (i.e., determination block 510="Yes"), in block 512 the processor 214 may reset the measurement counter (C) to 1. In determination block 516 the processor 214 may determine whether the C RF measurement for the current sample block is greater than the signal power threshold. If the C RF measurement is greater than the signal power threshold (i.e., determination block 516="Yes"), in determination block 518 the processor 214 may determine whether the cross block flag is set. If the cross block flag is set (i.e., determination block 518="Yes"), referring to FIG. 5B, in block 526 the processor 214 may store the C RF measurement in the memory location for the sample and in block 528 the processor may increment the measurement counter (C). As discussed above, in blocks 530 and 532 the processor 214 may perform operations to determine whether the C RF measurement is greater than the signal power threshold and whether the end of the sample block is reached until the C RF measurement is less than or equal to the signal power threshold (i.e., determination block 530="No") or the end of the sample block is reached (i.e., determination block 532="Yes"). If the end of the sample block is reached (i.e., determination block 532="Yes"), as discussed above in block 534 the cross block flag may be set (or verified and remain set if already set) and in block 535 the C RF measurement may be stored in the sample.

If the end of the sample block is reached (i.e., determination block 532="Yes") and in block 534 the cross block flag is set, referring to FIG. 5A, the processor may perform operations of blocks 506, 508, 510, 512, 516, and 518 as discussed above. If the average of the sample block is less than the noise floor average (i.e., determination block 510="No") and the cross block flag is set (i.e., determination block 514="Yes"), the C RF measurement is less than or equal to the signal power threshold (i.e., determination block 516="No") and the cross block flag is set (i.e., determination block 517="Yes"), or the C RF measurement is less than or equal to the signal power threshold (i.e., determination block 516="No"), referring to FIG. 5B, in block 538 the processor 214 may set the sample stop. As an example, the processor 214 may indicate that a sample end is reached in a memory and/or that a sample is complete in a memory. In block 540 the processor 214 may compute and store complex I and Q data for the stored measurements in the sample. In block 542 the processor 214 may determine a mean of the complex I and Q data. Referring to FIG. 5C, in determination block 544 the processor 214 may determine whether the mean of the complex I and Q data is greater than a signal threshold. If the mean of the complex I and Q data is less than or equal to the signal threshold (i.e., determination block 544="No"), in block 550 the processor 214 may indicate the sample is noise and discard data associated with the sample from memory.

If the mean is greater than the signal threshold (i.e., determination block 544="Yes"), in block 546 the processor 214 may identify the sample as a signal of interest. In an embodiment, the processor 214 may identify the sample as a signal of interest by assigning a signal identifier to the signal, such as a signal number or sample number. In block 548 the processor 214 may determine and store signal parameters for the signal. As an example, the processor 214 may determine and store a frequency peak of the identified signal, a peak power of the identified signal, an average power of the identified signal, a signal bandwidth of the identified signal, and/or a signal duration of the identified signal. In block 552 the processor 214 may clear the cross block flag (or verify that the cross block flag is unset). In block 556 the processor 214 may determine whether the end of the sample block is reached. If the end of the sample block is not reached (i.e., determination block 556="No") in block 558 the processor 214 may increment the measurement counter (C), and referring to FIG. 5A in determination block 516 may determine whether the C RF measurement is greater than the signal power threshold. Referring to FIG. 5C, if the end of the sample block is reached (i.e., determination block 556="Yes"), referring to FIG. 5A, in block 506 the processor 214 may load the next available sample block.

Figure 6:
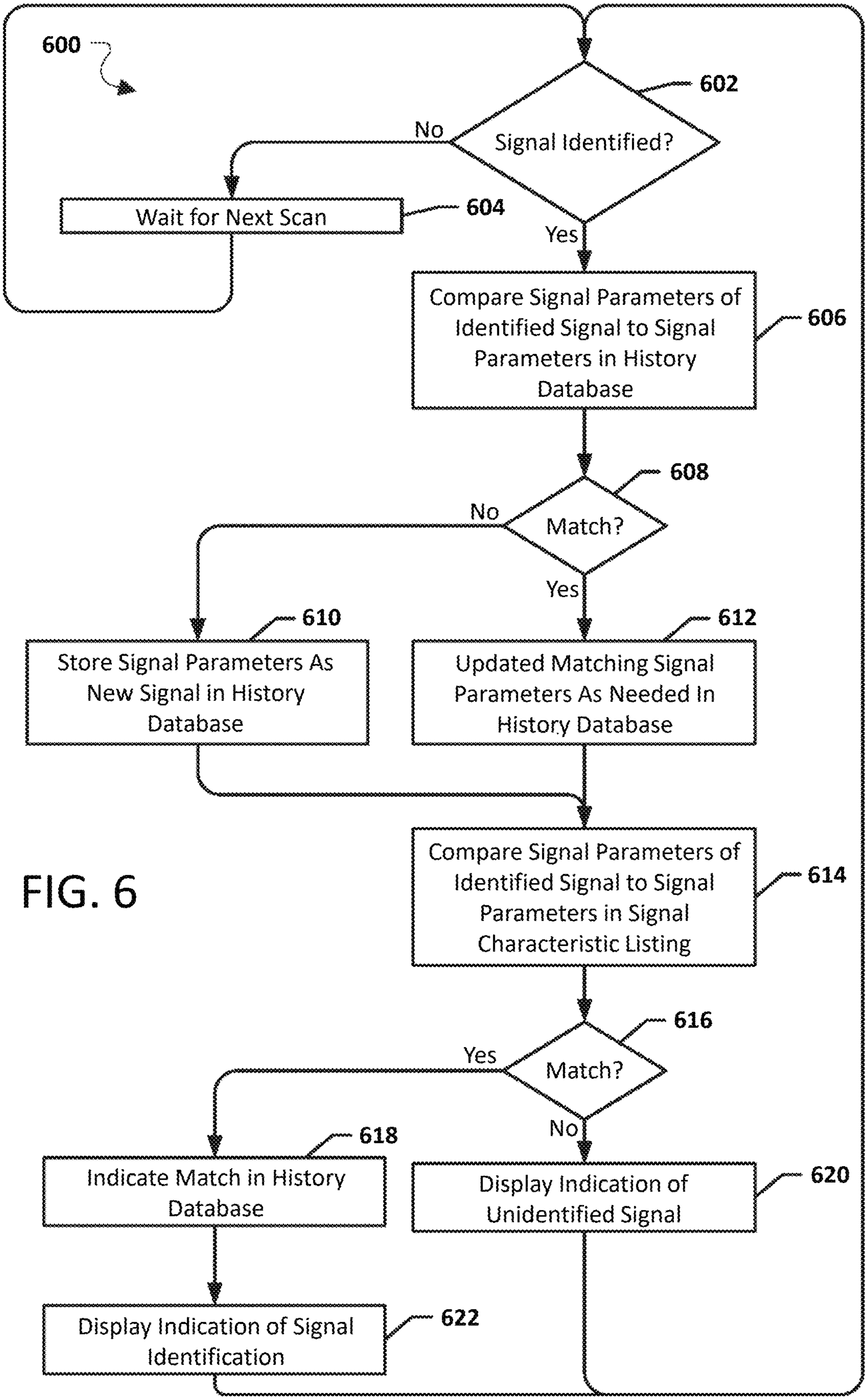
FIG. 6 is a process flow diagram illustrating an embodiment method for displaying signal identifications.

FIG. 6 illustrates a process flow for an embodiment method 600 for displaying signal identifications. In an embodiment, the operations of method 600 may be performed by a processor 214 of a spectrum management device 202. In determination block 602 the processor 214 may determine whether a signal is identified. If a signal is not identified (i.e., determination block 602="No"), in block 604 the processor 214 may wait for the next scan. If a signal is identified (i.e., determination block 602="Yes"), in block 606 the processor 214 may compare the signal parameters of an identified signal to signal parameters in a history database 232. In determination block 608 the processor 214 may determine whether signal parameters of the identified signal match signal parameters in the history database 232. If there is no match (i.e., determination block 608="No"), in block 610 the processor 214 may store the signal parameters as a new signal in the history database 232. If there is a match (i.e., determination block 608="Yes"), in block 612 the processor 214 may update the matching signal parameters as needed in the history database 232.

In block 614 the processor 214 may compare the signal parameters of the identified signal to signal parameters in a signal characteristic listing 236. In an embodiment, the characteristic listing 236 may be a static database separate from the history database 232, and the characteristic listing 236 may correlate signal parameters with signal identifications. In determination block 616 the processor 214 may determine whether the signal parameters of the identified signal match any signal parameters in the signal characteristic listing 236. In an embodiment, the match in determination 616 may be a match based on a tolerance between the signal parameters of the identified signal and the parameters in the characteristic listing 236. If there is a match (i.e., determination block 616="Yes"), in block 618 the processor 214 may indicate a match in the history database 232 and in block 622 may display an indication of the signal identification on a display 242. As an example, the indication of the signal identification may be a display of the radio call sign of an identified FM radio station signal. If there is not a match (i.e., determination block 616="No"), in block 620 the processor 214 may display an indication that the signal is an unidentified signal. In this manner, the user may be notified a signal is present in the environment, but that the signal does not match to a signal in the characteristic listing.

Figure 7:
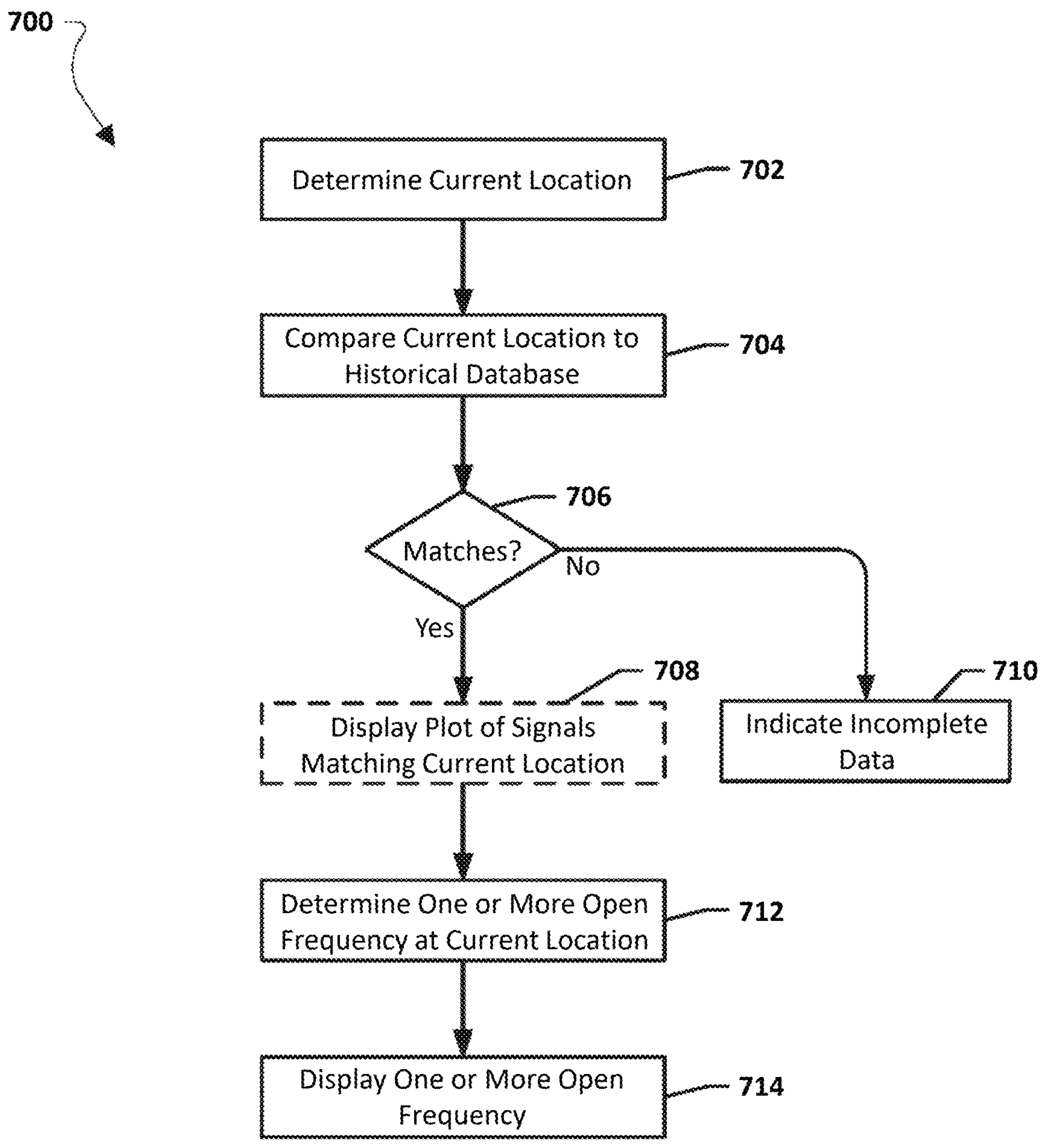
FIG. 7 is a process flow diagram illustrating an embodiment method for displaying one or more open frequency.

FIG. 7 illustrates a process flow of an embodiment method 700 for displaying one or more open frequency. In an embodiment, the operations of method 700 may be performed by the processor 214 of a spectrum management device 202. In block 702 the processor 214 may determine a current location of the spectrum management device 202. In an embodiment, the processor 214 may determine the current location of the spectrum management device 202 based on location inputs received from a location receiver 212, such as GPS coordinates received from a GPS receiver 212. In block 704 the processor 214 may compare the current location to the stored location value in the historical database 232. As discussed above, the historical or history database 232 may be a database storing information about signals previously actually identified by the spectrum management device 202. In determination block 706 the processor 214 may determine whether there are any matches between the location information in the historical database 232 and the current location. If there are no matches (i.e., determination block 706="No"), in block 710 the processor 214 may indicate incomplete data is available. In other words, the spectrum data for the current location has not previously been recorded.

If there are matches (i.e., determination block 706="Yes"), in optional block 708 the processor 214 may display a plot of one or more of the signals matching the current location. As an example, the processor 214 may compute the average frequency over frequency intervals across a given spectrum and may display a plot of the average frequency over each interval. In block 712 the processor 214 may determine one or more open frequencies at the current location. As an example, the processor 214 may determine one or more open frequencies by determining frequency ranges in which no signals fall or at which the average is below a threshold. In block 714 the processor 214 may display an indication of one or more open frequency on a display 242 of the spectrum management device 202.

Figure 8A:
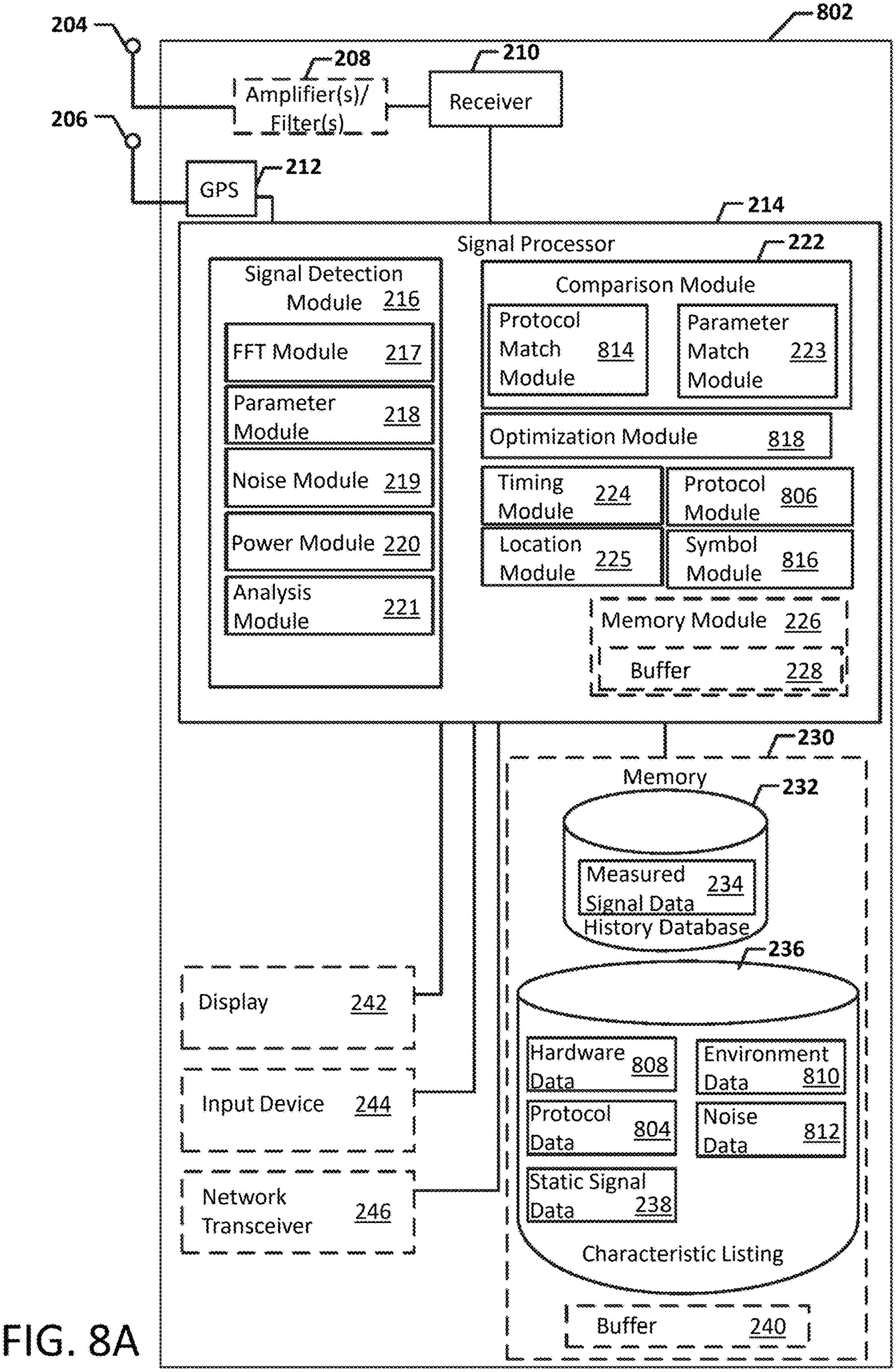
FIG. 8A is a block diagram of a spectrum management device according to another embodiment.

FIG. 8A is a block diagram of a spectrum management device 802 according to an embodiment. Spectrum management device 802 is similar to spectrum management device 202 described above with reference to FIG. 2A, except that spectrum management device 802 may include symbol module 816 and protocol module 806 enabling the spectrum management device 802 to identify the protocol and symbol information associated with an identified signal as well as protocol match module 814 to match protocol information. Additionally, the characteristic listing 236 of spectrum management device 802 may include protocol data 804, hardware data 808, environment data 810, and noise data 812 and an optimization module 818 may enable the signal processor 214 to provide signal optimization parameters.

The protocol module 806 may identify the communication protocol (e.g., LTE, CDMA, etc.) associated with a signal of interest. In an embodiment, the protocol module 806 may use data retrieved from the characteristic listing, such as protocol data 804 to help identify the communication protocol. The symbol detector module 816 may determine symbol timing information, such as a symbol rate for a signal of interest. The protocol module 806 and/or symbol module 816 may provide data to the comparison module 222. The comparison module 222 may include a protocol match module 814 which may attempt to match protocol information for a signal of interest to protocol data 804 in the characteristic listing to identify a signal of interest. Additionally, the protocol module 806 and/or symbol module 816 may store data in the memory module 226 and/or history database 232. In an embodiment, the protocol module 806 and/or symbol module 816 may use protocol data 804 and/or other data from the characteristic listing 236 to help identify protocols and/or symbol information in signals of interest.

The optimization module 818 may gather information from the characteristic listing, such as noise figure parameters, antenna hardware parameters, and environmental parameters correlated with an identified signal of interest to calculate a degradation value for the identified signal of interest. The optimization module 818 may further control the display 242 to output degradation data enabling a user of the spectrum management device 802 to optimize a signal of interest.

Figure 8B:
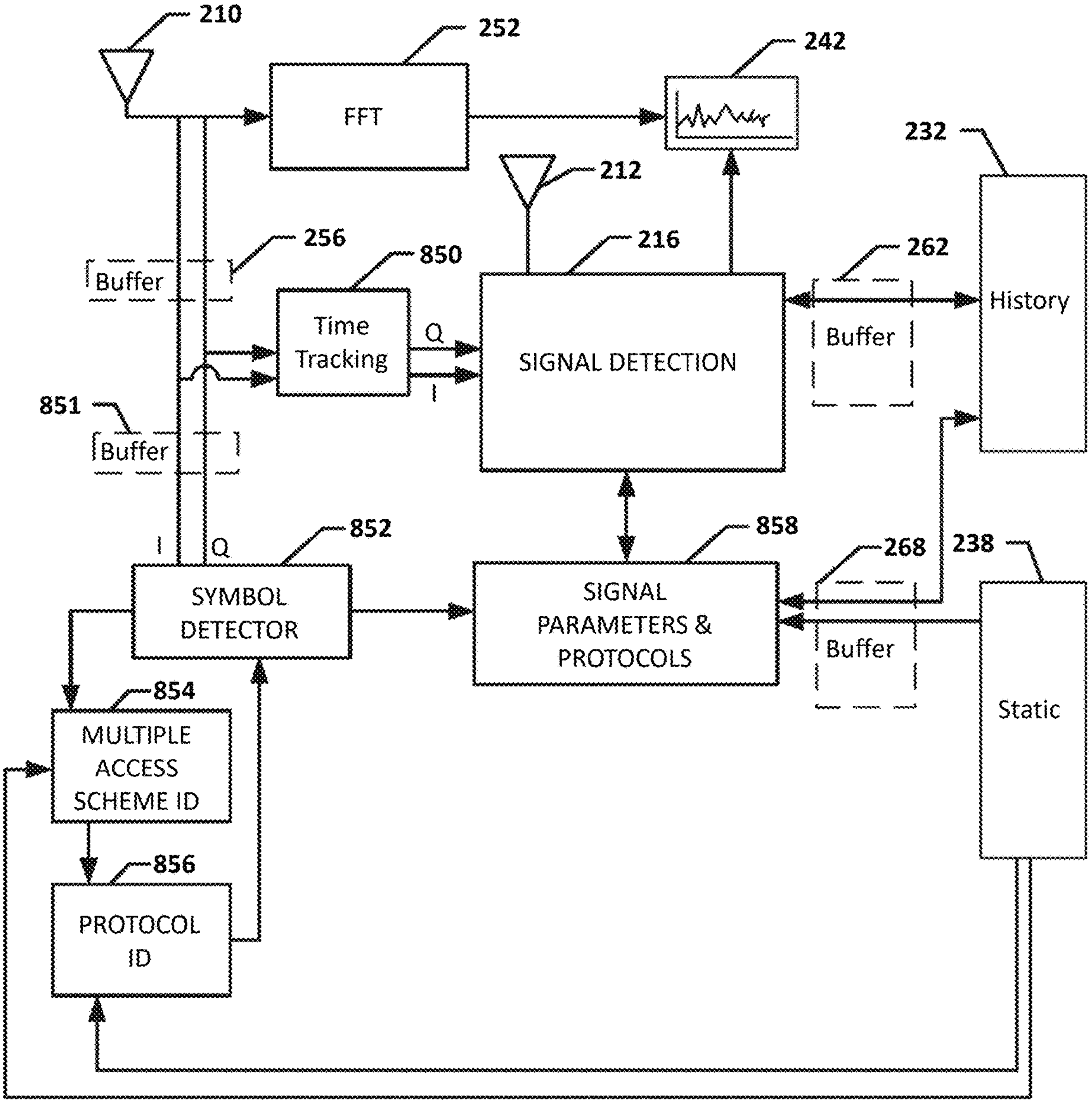
FIG. 8B is a schematic logic flow block diagram illustrating logical operations which may be performed by a spectrum management device according to another embodiment.

FIG. 8B is a schematic logic flow block diagram illustrating logical operations which may be performed by a spectrum management device according to an embodiment. Only those logical operations illustrated in FIG. 8B different from those described above with reference to FIG. 2B will be discussed. As illustrated in FIG. 8B, as received time tracking 850 may be applied to the I and Q data from the receiver 210. An additional buffer 851 may further store the I and Q data received and a symbol detector 852 may identify the symbols of a signal of interest and determine the symbol rate. A multiple access scheme identifier module 854 may identify whether the signal is part of a multiple access scheme (e.g., CDMA), and a protocol identifier module 856 may attempt to identify the protocol the signal of interested is associated with. The multiple access scheme identifier module 854 and protocol identifier module 856 may retrieve data from the static database 238 to aid in the identification of the access scheme and/or protocol. The symbol detector module 852 may pass data to the signal parameter and protocol module 858 which may store protocol and symbol information in addition to signal parameter information for signals of interest.

Figure 9:
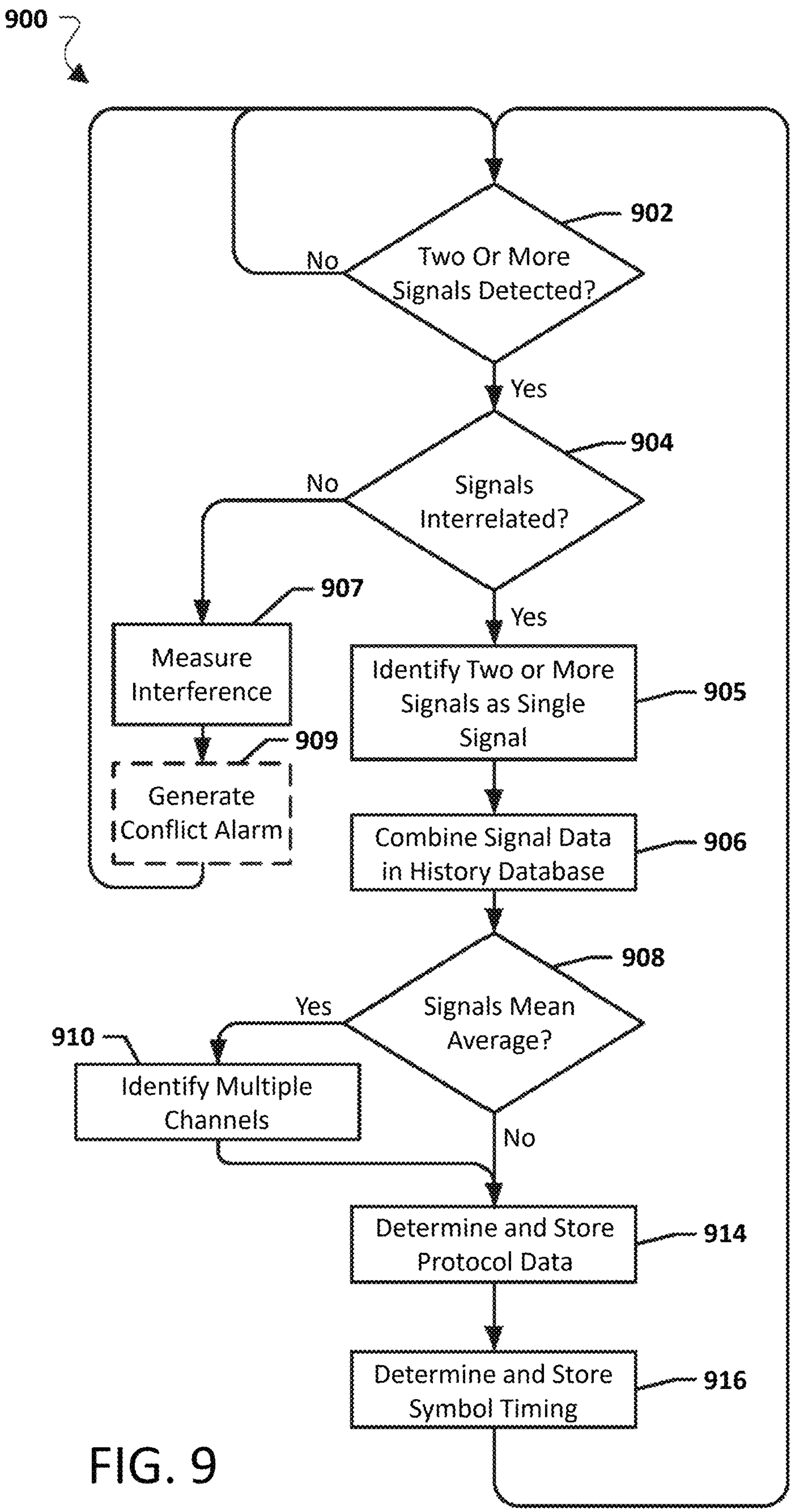
FIG. 9 is a process flow diagram illustrating an embodiment method for determining protocol data and symbol timing data.

FIG. 9 illustrates a process flow of an embodiment method 900 for determining protocol data and symbol timing data. In an embodiment, the operations of method 900 may be performed by the processor 214 of a spectrum management device 802. In determination block 902 the processor 214 may determine whether two or more signals are detected. If two or more signals are not detected (i.e., determination block 902="No"), in determination block 902 the processor 214 may continue to determine whether two or more signals are detected. If two or more signals are detected (i.e., determination block 902="Yes"), in determination block 904 the processor 214 may determine whether the two or more signals are interrelated. In an embodiment, a mean correlation value of the spectral decomposition of each signal may indicate the two or more signals are interrelated. As an example, a mean correlation of each signal may generate a value between 0.0 and 1, and the processor 214 may compare the mean correlation value to a threshold, such as a threshold of 0.75. In such an example, a mean correlation value at or above the threshold may indicate the signals are interrelated while a mean correlation value below the threshold may indicate the signals are not interrelated and may be different signals. In an embodiment, the mean correlation value may be generated by running a full energy bandwidth correlation of each signal, measuring the values of signal transition for each signal, and for each signal transition running a spectral correlation between signals to generate the mean correlation value. If the signals are not interrelated (i.e., determination block 904="No"), the signals may be two or more different signals, and in block 907 processor 214 may measure the interference between the two or more signals. In an optional embodiment, in optional block 909 the processor 214 may generate a conflict alarm indicating the two or more different signals interfere. In an embodiment, the conflict alarm may be sent to the history database and/or a display. In determination block 902 the processor 214 may continue to determine whether two or more signals are detected. If the two signals are interrelated (i.e., determination block 904="Yes"), in block 905 the processor 214 may identify the two or more signals as a single signal. In block 906 the processor 214 may combine signal data for the two or more signals into a signal single entry in the history database. In determination block 908 the processor 214 may determine whether the signals mean averages. If the mean averages (i.e., determination block 908="Yes"), the processor 214 may identify the signal as having multiple channels in determination block 910. If the mean does not average (i.e., determination block 908="No") or after identifying the signal as having multiple channels in determination block 910, in block 914 the processor 214 may determine and store protocol data for the signal. In block 916 the processor 214 may determine and store symbol timing data for the signal, and the method 900 may return to block 902.

Figure 10:
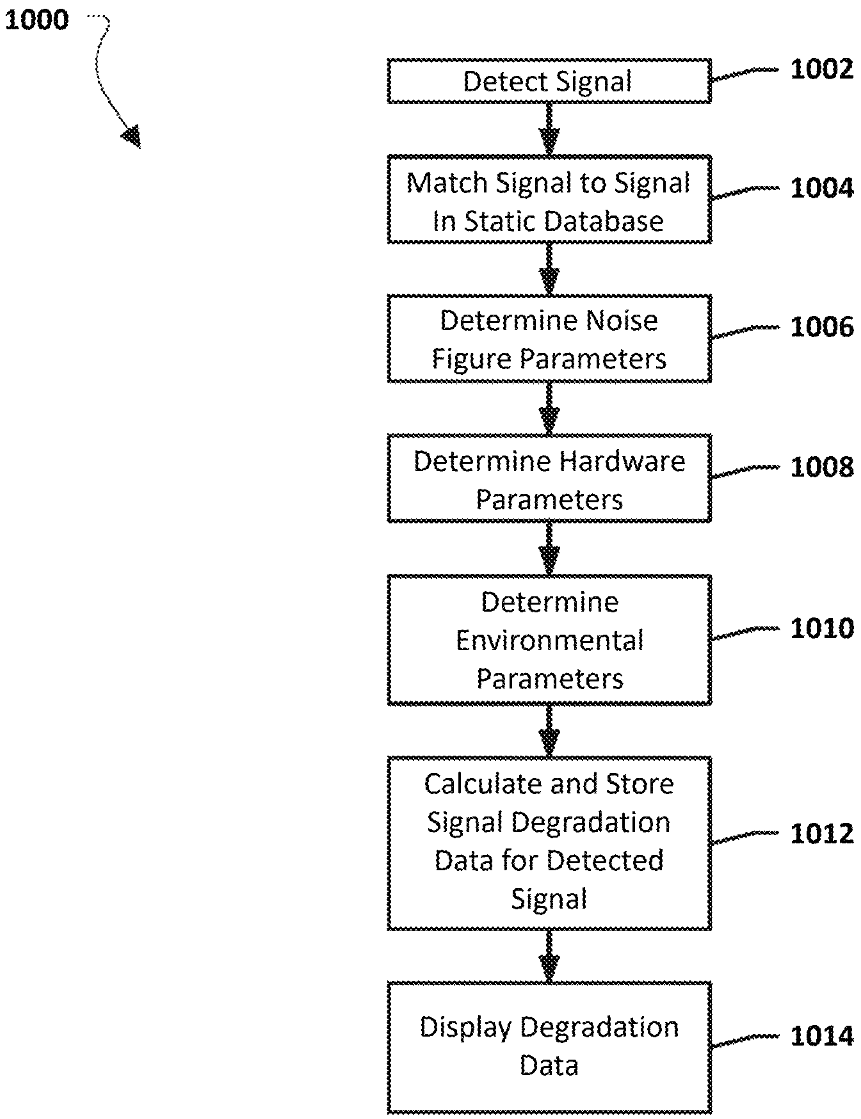
FIG. 10 is a process flow diagram illustrating an embodiment method for calculating signal degradation data.

FIG. 10 illustrates a process flow of an embodiment method 1000 for calculating signal degradation data. In an embodiment, the operations of method 1000 may be performed by the processor 214 of a spectrum management device 202. In block 1002 the processor may detect a signal. In block 1004 the processor 214 may match the signal to a signal in a static database. In block 1006 the processor 214 may determine noise figure parameters based on data in the static database 236 associated with the signal. As an example, the processor 214 may determine the noise figure of the signal based on parameters of a transmitter outputting the signal according to the static database 236. In block 1008 the processor 214 may determine hardware parameters associated with the signal in the static database 236. As an example, the processor 214 may determine hardware parameters such as antenna position, power settings, antenna type, orientation, azimuth, location, gain, and equivalent isotropically radiated power (EIRP) for the transmitter associated with the signal from the static database 236. In block 1010 processor 214 may determine environment parameters associated with the signal in the static database 236. As an example, the processor 214 may determine environment parameters such as rain, fog, and/or haze based on a delta correction factor table stored in the static database and a provided precipitation rate (e.g., mm/hr). In block 1012 the processor 214 may calculate and store signal degradation data for the detected signal based at least in part on the noise figure parameters, hardware parameters, and environmental parameters. As an example, based on the noise figure parameters, hardware parameters, and environmental parameters free space losses of the signal may be determined. In block 1014 the processor 214 may display the degradation data on a display 242 of the spectrum management device 202. In a further embodiment, the degradation data may be used with measured terrain data of geographic locations stored in the static database to perform pattern distortion, generate propagation and/or next neighbor interference models, determine interference variables, and perform best fit modeling to aide in signal and/or system optimization.

Figure 11:
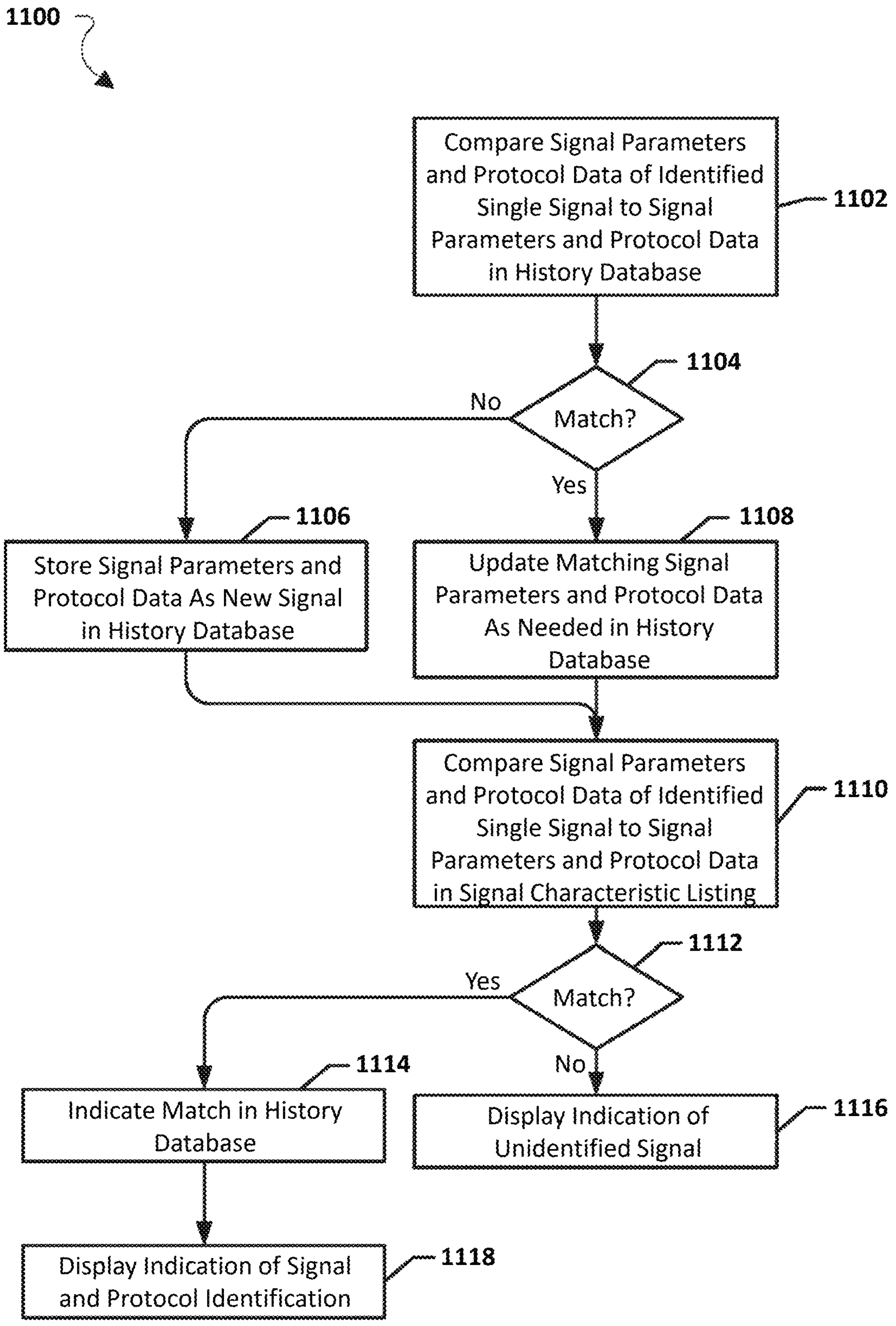
FIG. 11 is a process flow diagram illustrating an embodiment method for displaying signal and protocol identification information.

FIG. 11 illustrates a process flow of an embodiment method 1100 for displaying signal and protocol identification information. In an embodiment, the operations of method 1100 may be performed by a processor 214 of a spectrum management device 202. In block 1102 the processor 214 may compare the signal parameters and protocol data of an identified signal to signal parameters and protocol data in a history database 232. In an embodiment, a history database 232 may be a database storing signal parameters and protocol data for previously identified signals. In block 1104 the processor 214 may determine whether there is a match between the signal parameters and protocol data of the identified signal and the signal parameters and protocol data in the history database 232. If there is not a match (i.e., determination block 1104="No"), in block 1106 the processor 214 may store the signal parameters and protocol data as a new signal in the history database 232. If there is a match (i.e., determination block 1104="Yes"), in block 1108 the processor 214 may update the matching signal parameters and protocol data as needed in the history database 232.

In block 1110 the processor 214 may compare the signal parameters and protocol data of the identified signal to signal parameters and protocol data in the signal characteristic listing 236. In determination block 1112 the processor 214 may determine whether the signal parameters and protocol data of the identified signal match any signal parameters and protocol data in the signal characteristic listing 236. If there is a match (i.e., determination block 1112="Yes"), in block 1114 the processor 214 may indicate a match in the history database and in block 1118 may display an indication of the signal identification and protocol on a display. If there is not a match (i.e., determination block 1112="No"), in block 1116 the processor 214 may display an indication that the signal is an unidentified signal. In this manner, the user may be notified a signal is present in the environment, but that the signal does not match to a signal in the characteristic listing.

Figure 12A:
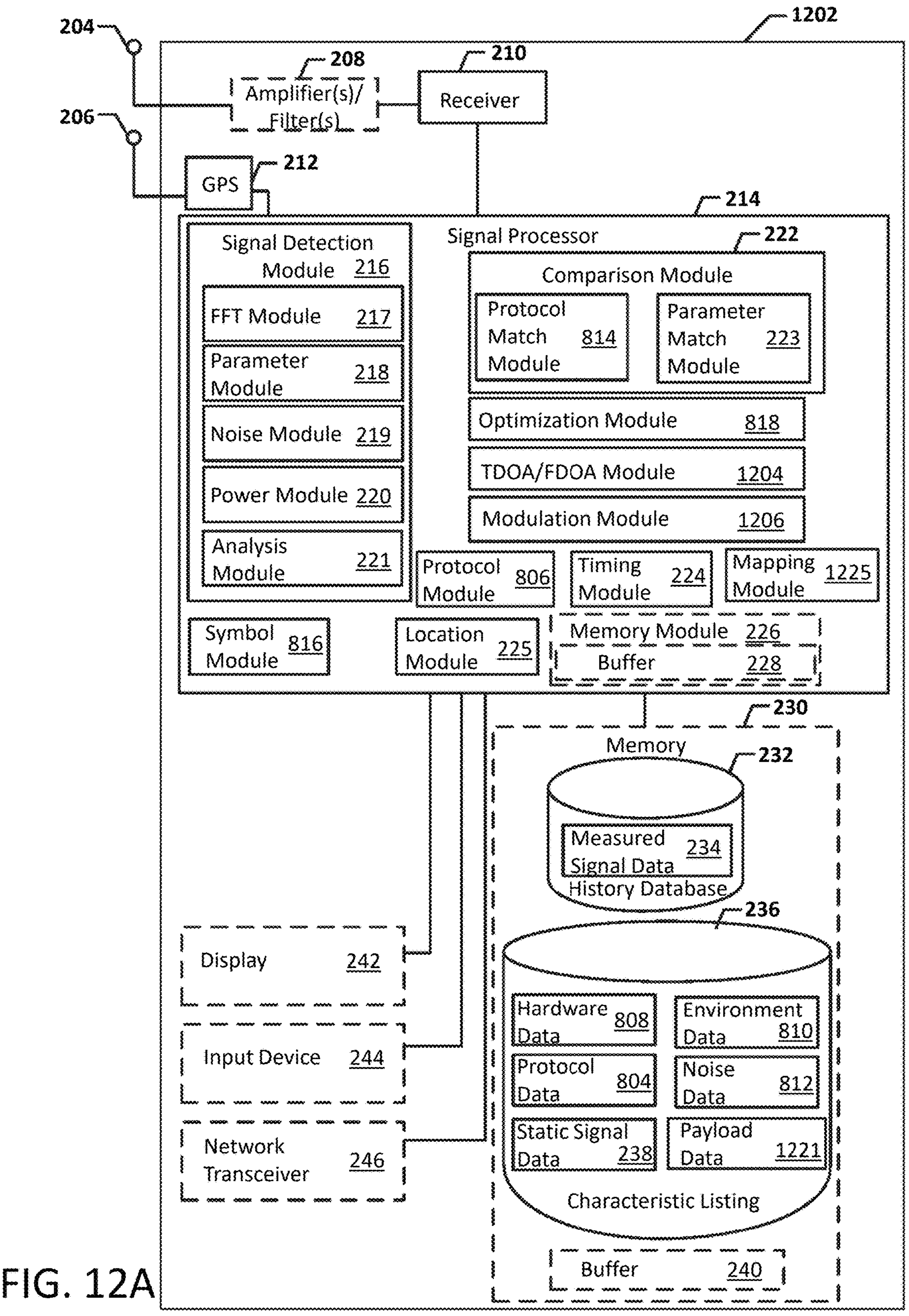
FIG. 12A is a block diagram of a spectrum management device according to a further embodiment.

FIG. 12A is a block diagram of a spectrum management device 1202 according to an embodiment. Spectrum management device 1202 is similar to spectrum management device 802 described above with reference to FIG. 8A, except that spectrum management device 1202 may include TDOA/FDOA module 1204 and modulation module 1206 enabling the spectrum management device 1202 to identify the modulation type employed by a signal of interest and calculate signal origins. The modulation module 1206 may enable the signal processor to determine the modulation applied to signal, such as frequency modulation (e.g., FSK, MSK, etc.) or phase modulation (e.g., BPSK, QPSK, QAM, etc.) as well as to demodulate the signal to identify payload data carried in the signal. The modulation module 1206 may use payload data 1221 from the characteristic listing to identify the data types carried in a signal. As examples, upon demodulating a portion of the signal the payload data may enable the processor 214 to determine whether voice data, video data, and/or text based data is present in the signal. The TDOA/FDOA module 1204 may enable the signal processor 214 to determine time difference of arrival for signals or interest and/or frequency difference of arrival for signals of interest. Using the TDOA/FDOA information estimates of the origin of a signal may be made and passed to a mapping module 1225 which may control the display 242 to output estimates of a position and/or direction of movement of a signal.

Figure 12B:
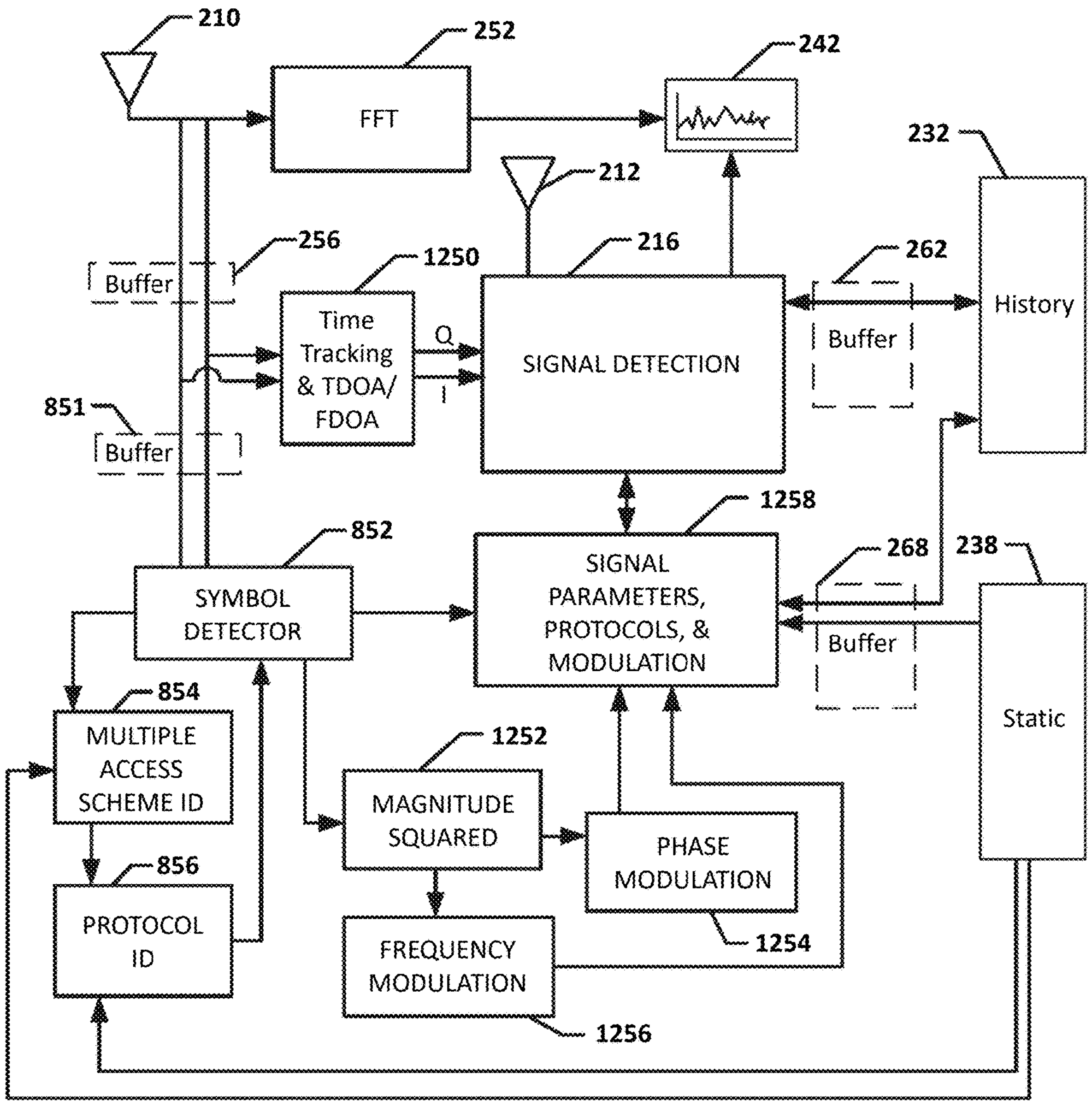
FIG. 12B is a schematic logic flow block diagram illustrating logical operations which may be performed by a spectrum management device according to a further embodiment.

FIG. 12B is a schematic logic flow block diagram illustrating logical operations which may be performed by a spectrum management device according to an embodiment. Only those logical operations illustrated in FIG. 12B different from those described above with reference to FIG. 8B will be discussed. A magnitude squared 1252 operation may be performed on data from the symbol detector 852 to identify whether frequency or phase modulation is present in the signal. Phase modulated signals may be identified by the phase modulation 1254 processes and frequency modulated signals may be identified by the frequency modulation 1256 processes. The modulation information may be passed to a signal parameters, protocols, and modulation module 1258.

Figure 13:
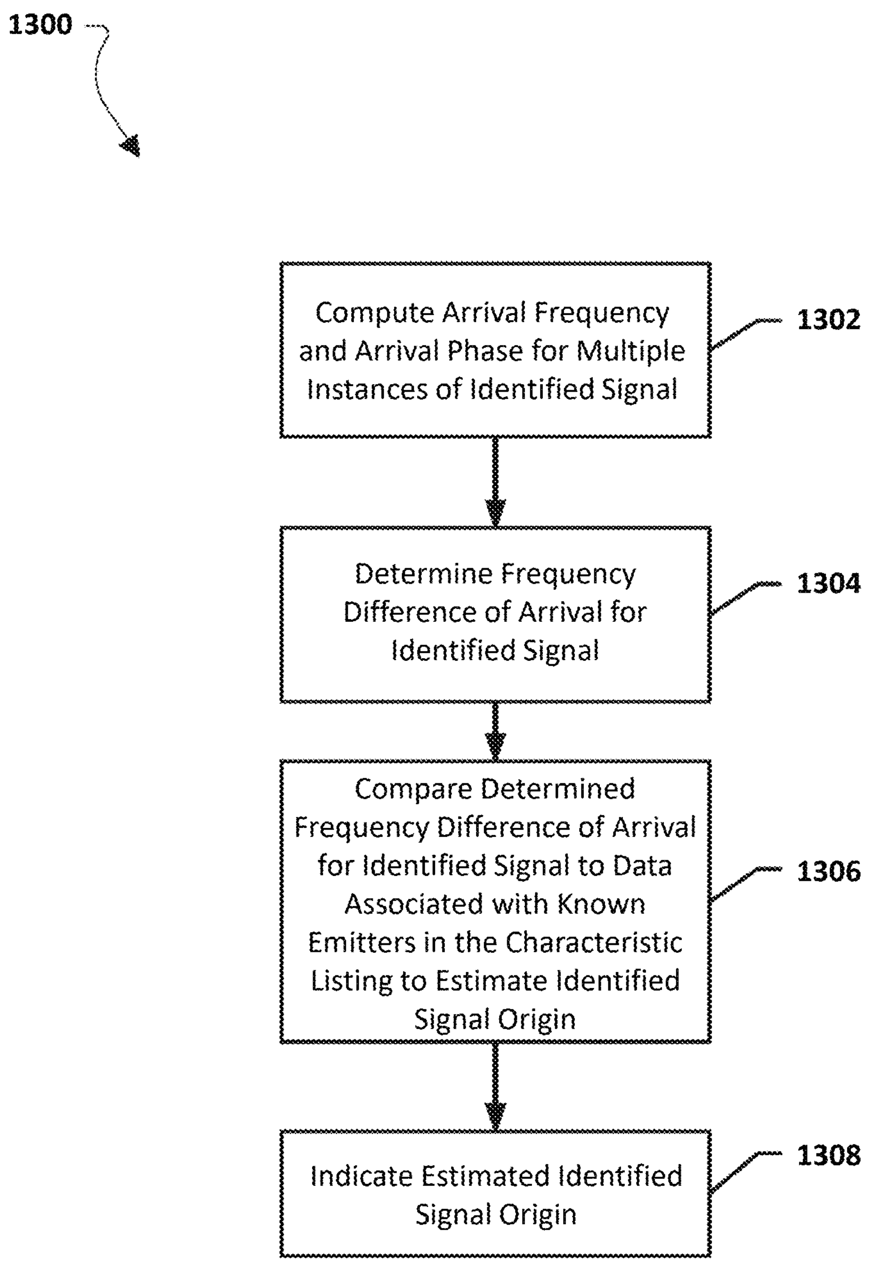
FIG. 13 is a process flow diagram illustrating an embodiment method for estimating a signal origin based on a frequency difference of arrival.

FIG. 13 illustrates a process flow of an embodiment method 1300 for estimating a signal origin based on a frequency difference of arrival. In an embodiment, the operations of method 1300 may be performed by a processor 214 of a spectrum management device 1202. In block 1302 the processor 214 may compute frequency arrivals and phase arrivals for multiple instances of an identified signal. In block 1304 the processor 214 may determine frequency difference of arrival for the identified signal based on the computed frequency difference and phase difference. In block 1306 the processor may compare the determined frequency difference of arrival for the identified signal to data associated with known emitters in the characteristic listing to estimate an identified signal origin. In block 1308 the processor 214 may indicate the estimated identified signal origin on a display of the spectrum management device. As an example, the processor 214 may overlay the estimated origin on a map displayed by the spectrum management device.

Figure 14:
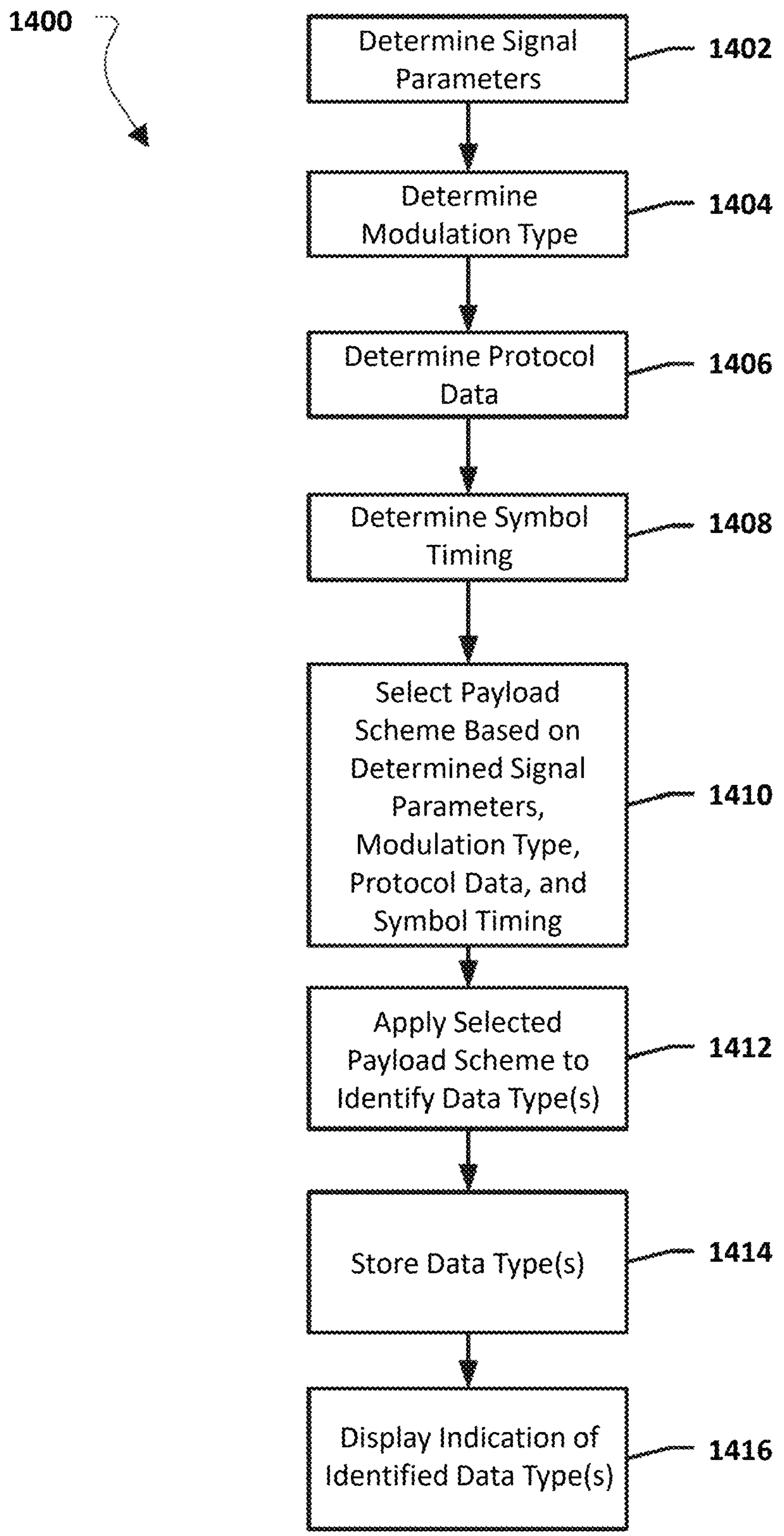
FIG. 14 is a process flow diagram illustrating an embodiment method for displaying an indication of an identified data type within a signal.

FIG. 14 illustrates a process flow of an embodiment method for displaying an indication of an identified data type within a signal. In an embodiment, the operations of method 1400 may be performed by a processor 214 of a spectrum management device 1202. In block 1402 the processor 214 may determine the signal parameters for an identified signal of interest. In block 1404 the processor 214 may determine the modulation type for the signal of interest. In block 1406 the processor 214 may determine the protocol data for the signal of interest. In block 1408 the processor 214 may determine the symbol timing for the signal of interest. In block 1410 the processor 214 may select a payload scheme based on the determined signal parameters, modulation type, protocol data, and symbol timing. As an example, the payload scheme may indicate how data is transported in a signal. For example, data in over the air television broadcasts may be transported differently than data in cellular communications and the signal parameters, modulation type, protocol data, and symbol timing may identify the applicable payload scheme to apply to the signal. In block 1412 the processor 214 may apply the selected payload scheme to identify the data type or types within the signal of interest. In this manner, the processor 214 may determine what type of data is being transported in the signal, such as voice data, video data, and/or text based data. In block 1414 the processor may store the data type or types. In block 1416 the processor 214 may display an indication of the identified data types.

Figure 15:
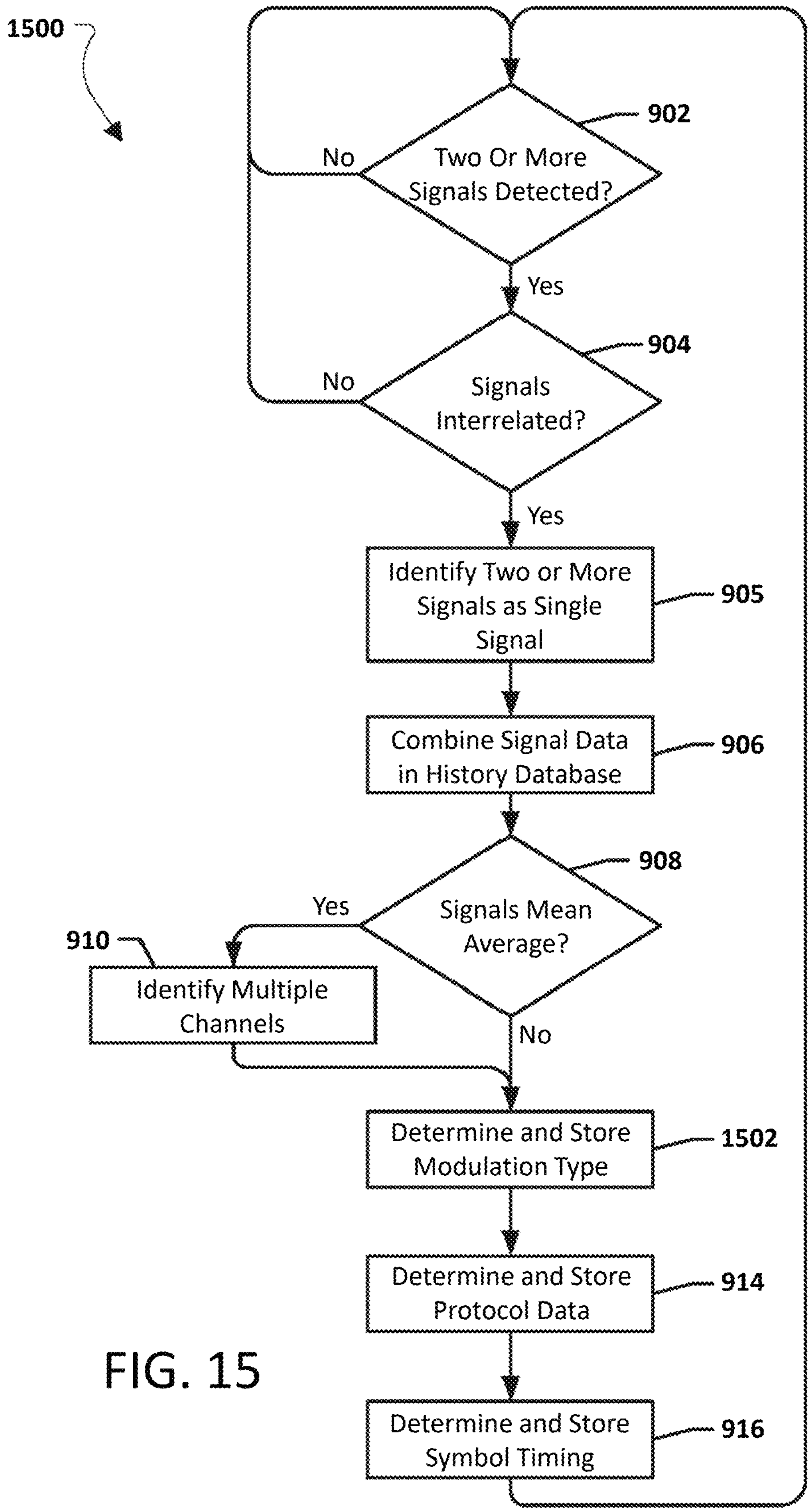
FIG. 15 is a process flow diagram illustrating an embodiment method for determining modulation type, protocol data, and symbol timing data.

FIG. 15 illustrates a process flow of an embodiment method 1500 for determining modulation type, protocol data, and symbol timing data. Method 1500 is similar to method 900 described above with reference to FIG. 9, except that modulation type may also be determined. In an embodiment, the operations of method 1500 may be performed by a processor 214 of a spectrum management device 1202. In blocks 902, 904, 905, 906, 908, and 910 the processor 214 may perform operations of like numbered blocks of method 900 described above with reference to FIG. 9. In block 1502 the processor may determine and store a modulation type. As an example, a modulation type may be an indication that the signal is frequency modulated (e.g., FSK, MSK, etc.) or phase modulated (e.g., BPSK, QPSK, QAM, etc.). As discussed above, in block 914 the processor may determine and store protocol data and in block 916 the processor may determine and store timing data.

In an embodiment, based on signal detection, a time tracking module, such as a TDOA/FDOA module 1204, may track the frequency repetition interval at which the signal is changing. The frequency repetition interval may also be tracked for a burst signal. In an embodiment, the spectrum management device may measure the signal environment and set anchors based on information stored in the historic or static database about known transmitter sources and locations. In an embodiment, the phase information about a signal be extracted using a spectral decomposition correlation equation to measure the angle of arrival ("AOA") of the signal. In an embodiment, the processor of the spectrum management device may determine the received power as the Received Signal Strength ("RSS") and based on the AOA and RSS may measure the frequency difference of arrival. In an embodiment, the frequency shift of the received signal may be measured and aggregated over time. In an embodiment, after an initial sample of a signal, known transmitted signals may be measured and compared to the RSS to determine frequency shift error. In an embodiment, the processor of the spectrum management device may compute a cross ambiguity function of aggregated changes in arrival time and frequency of arrival. In an additional embodiment, the processor of the spectrum management device may retrieve FFT data for a measured signal and aggregate the data to determine changes in time of arrival and frequency of arrival. In an embodiment, the signal components of change in frequency of arrival may be averaged through a Kalman filter with a weighted tap filter from 2 to 256 weights to remove measurement error such as noise, multipath interference, etc. In an embodiment, frequency difference of arrival techniques may be applied when either the emitter of the signal or the spectrum management device is moving or when then emitter of the signal and the spectrum management device are both stationary. When the emitter of the signal and the spectrum management device are both stationary the determination of the position of the emitter may be made when at least four known other known signal emitters positions are known and signal characteristics may be available. In an embodiment, a user may provide the four other known emitters and/or may use already in place known emitters, and may use the frequency, bandwidth, power, and distance values of the known emitters and their respective signals. In an embodiment, where the emitter of the signal or spectrum management device may be moving, frequency difference of arrival techniques may be performed using two known emitters.

Figure 16:
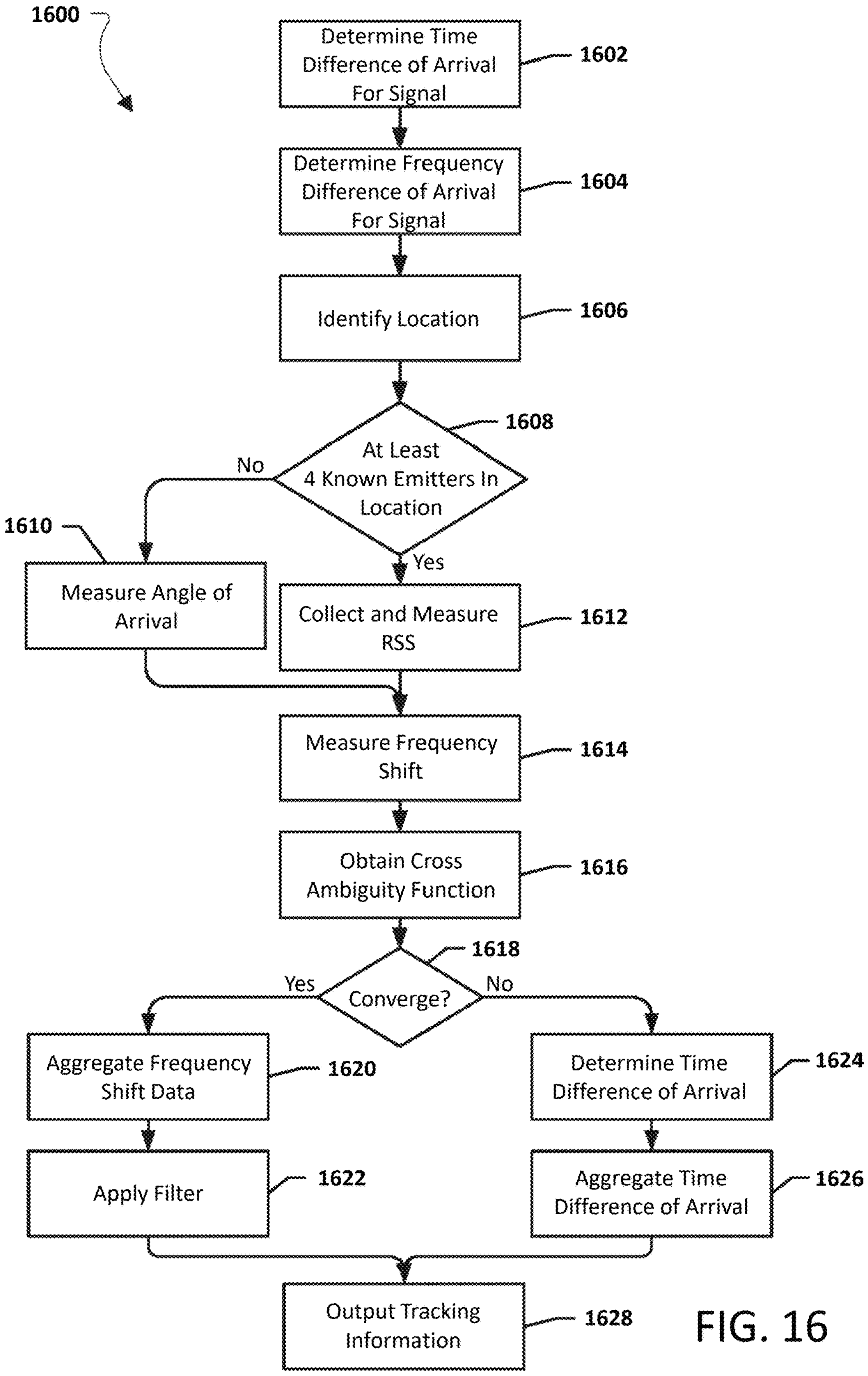
FIG. 16 is a process flow diagram illustrating an embodiment method for tracking a signal origin.

FIG. 16 illustrates an embodiment method for tracking a signal origin. In an embodiment, the operations of method 1600 may be performed by a processor 214 of a spectrum management device 1202. In block 1602 the processor 214 may determine a time difference of arrival for a signal of interest. In block 1604 the processor 214 may determine a frequency difference of arrival for the signal interest. As an example, the processor 214 may take the inverse of the time difference of arrival to determine the frequency difference of arrival of the signal of interest. In block 1606 the processor 214 may identify the location. As an example, the processor 214 may determine the location based on coordinates provided from a GPS receiver. In determination block 1608 the processor 214 may determine whether there are at least four known emitters present in the identified location. As an example, the processor 214 may compare the geographic coordinates for the identified location to a static database and/or historical database to determine whether at least four known signals are within an area associated with the geographic coordinates. If at least four known emitters are present (i.e., determination block 1608="Yes"), in block 1612 the processor 214 may collect and measure the RSS of the known emitters and the signal of interest. As an example, the processor 214 may use the frequency, bandwidth, power, and distance values of the known emitters and their respective signals and the signal of interest. If less than four known emitters are present (i.e., determination block 1608="No"), in block 1610 the processor 214 may measure the angle of arrival for the signal of interest and the known emitter. Using the RSS or angle of arrival, in block 1614 the processor 214 may measure the frequency shift and in block 1616 the processor 214 may obtain the cross ambiguity function. In determination block 1618 the processor 214 may determine whether the cross ambiguity function converges to a solution. If the cross ambiguity function does converge to a solution (i.e., determination block 1618="Yes"), in block 1620 the processor 214 may aggregate the frequency shift data. In block 1622 the processor 214 may apply one or more filter to the aggregated data, such as a Kalman filter. Additionally, the processor 214 may apply equations, such as weighted least squares equations and maximum likelihood equations, and additional filters, such as a non-line-of-sight ("NLOS") filters to the aggregated data. In an embodiment, the cross ambiguity function may resolve the position of the emitter of the signal of interest to within 3 meters. If the cross ambiguity function does not converge to a solution (i.e., determination block 1618="No"), in block 1624 the processor 214 may determine the time difference of arrival for the signal and in block 1626 the processor 214 may aggregate the time shift data. Additionally, the processor may filter the data to reduce interference. Whether based on frequency difference of arrival or time difference of arrival, the aggregated and filtered data may indicate a position of the emitter of the signal of interest, and in block 1628 the processor 214 may output the tracking information for the position of the emitter of the signal of interest to a display of the spectrum management device and/or the historical database. In an additional embodiment, location of emitters, time and duration of transmission at a location may be stored in the history database such that historical information may be used to perform and predict movement of signal transmission. In a further embodiment, the environmental factors may be considered to further reduce the measured error and generate a more accurate measurement of the location of the emitter of the signal of interest.

The processor 214 of spectrum management devices 202, 802 and 1202 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 226 or 230 before they are accessed and loaded into the processor 214. The processor 214 may include internal memory sufficient to store the application software instructions. In many devices the internal memory may be a volatile or nonvolatile memory, such as flash memory, or a mixture of both. For the purposes of this description, a general reference to memory refers to memory accessible by the processor 214 including internal memory or removable memory plugged into the device and memory within the processor 214 itself.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored as one or more instructions or code on a non-transitory computer-readable medium or non-transitory processor-readable medium. The steps of a method or algorithm disclosed herein may be embodied in a processor-executable software module which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable media may include RAM, ROM, EEPROM, FLASH memory, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

The invention claimed is:

1. A spectrum analysis system comprising:

at least one device including a processor and a memory configured to receive and analyze radiofrequency (RF) data including data relating to at least one signal; and a data extraction module configured to receive spectral components of the at least one signal;

wherein the data extraction module is configured to determine a modulation type and/or a protocol based on the spectral components;

wherein the data extraction module is further configured to determine a location of a source of the at least one signal by determining a time of arrival and/or an angle of arrival of the at least one signal; and wherein the at least one device is configured to determine signal degradation data for the at least one signal and the at least one device is further configured to perform pattern distortion, generate propagation models, and generate next neighbor interference models using the signal degradation data and measured terrain data of geographic locations.

2. The system of claim 1, wherein the signal degradation data includes values for free space losses of the at least one signal.

3. The system of claim 1, further comprising an optimization module operable to provide signal optimization parameters.

4. The system of claim 3, wherein the optimization module is configured to provide the signal optimization parameters for center frequency, bandwidth, and/or power.

5. The system of claim 1, wherein the at least one device is configured to compare data relating to the at least one signal with stored data.

6. The system of claim 1, wherein the at least one device is configured to identify the at least one signal in real-time or near real-time.

7. The system of claim 1, wherein the data extraction module is further configured to compare the spectral components of the at least one signal to previously stored signals in a database.

8. A spectrum analysis apparatus comprising:

at least one device including a processor and a memory configured to receive and analyze radiofrequency (RF) data of at least one signal; and a data extraction module configured to compare spectral components of the at least one signal to previously stored signals in a database;

wherein the data extraction module is further configured to determine a modulation type and/or a protocol based on the spectral components;

wherein the data extraction module is further configured to determine a location of a source of the at least one signal by determining a time of arrival and/or an angle of arrival of the at least one signal;

wherein the at least one device is configured to determine signal degradation data for the at least one signal based on environmental parameters, including rain, fog, and/or haze, and/or hardware parameters of at least one second device emitting the at least one signal, including antenna type, orientation, azimuth, gain, and/or effective isotropic radiated power (EIRP); and wherein the at least one device is configured to perform pattern distortion, generate propagation models, and generate next neighbor interference models using the signal degradation data and measured terrain data of geographic locations.

9. The apparatus of claim 8, wherein the signal degradation data includes values for free space losses of the at least one signal.

10. The apparatus of claim 8, further comprising an optimization module configured to provide signal optimization parameters.

11. The apparatus of claim 10, wherein the optimization module is configured to provide the signal optimization parameters for center frequency, bandwidth, and/or power.

12. The apparatus of claim 8, wherein the at least one device is operable to identify the at least one signal in real-time or near real-time.

13. A method for spectrum analysis, comprising:

analyzing, by at least one device including a processor and a memory, radio frequency (RF) data to identify at least one signal;

receiving, by a data extraction module, spectral components of the at least one signal;

determining, by the data extraction module, a modulation type and/or a protocol based on the spectral components;

determining, wherein the data extraction module is further configured to determine a location of a source of the at least one signal by determining a time of arrival and/or an angle of arrival of the at least one signal;

determining, by the at least one device, signal degradation data for the at least one signal;

performing pattern distortion, generating propagation models, and generating next neighbor interference models using the signal degradation data and measured terrain data of geographic locations; and comparing, by the data extraction module, the spectral components of the at least one signal to previously stored signals in a database.

14. The method of claim 13, wherein the signal degradation data includes values for free space losses of the at least one signal.

15. The method of claim 13, further comprising providing, by an optimization module, signal optimization parameters.

16. The method of claim 15, further comprising providing, by the optimization module, the signal optimization parameters for center frequency, bandwidth, and/or power.

17. The method of claim 13, wherein the signal degradation data is further based on hardware parameters comprising antenna type, orientation, azimuth, gain, and/or effective isotropic radiated power (EIRP).

18. The method of claim 13, wherein the RF data includes a location from which the at least one signal is emitted.

* * * * *